US008700192B2

(12) United States Patent
Heller et al.

(10) Patent No.: US 8,700,192 B2
(45) Date of Patent: Apr. 15, 2014

(54) DYNAMIC VIEWS IN A MODELING OF AN AUTOMATION SYSTEM

(75) Inventors: Rainer Heller, Eckental (DE); Venkata Prasad Mukka, Plainsboro, NJ (US); Oswin Noetzelmann, Monmouth Junction, NJ (US); Prithvi Raju, Franklin Park, NJ (US); Dirk Schaumburg, Bad Nauheim (DE); Edward Slavin, Ewing, NJ (US)

(73) Assignee: Siemens Aktiengesellschaft, Munich (DE)

(*) Notice: Subject to any disclaimer, the term of this patent is extended or adjusted under 35 U.S.C. 154(b) by 203 days.

(21) Appl. No.: 13/059,716

(22) PCT Filed: Apr. 16, 2010

(86) PCT No.: PCT/US2010/031346
§ 371 (c)(1),
(2), (4) Date: Apr. 29, 2011

(87) PCT Pub. No.: WO2010/121099
PCT Pub. Date: Oct. 21, 2010

(65) Prior Publication Data

US 2012/0022673 A1 Jan. 26, 2012

Related U.S. Application Data

(60) Provisional application No. 61/170,212, filed on Apr. 17, 2009, provisional application No. 61/170,208, filed on Apr. 17, 2009, provisional application No. 61/170,200, filed on Apr. 17, 2009, provisional application No. 61/170,192, filed on Apr. 17, 2009, provisional application No. 61/170,156, filed on Apr. 17, 2009, provisional application No. 61/170,219, filed on Apr. 17, 2009, provisional application No. 61/281,609, filed on Nov. 19, 2009.

(51) Int. Cl.

| | |
|---|---|
| ***G05B 15/00*** | (2006.01) |
| ***G05B 11/01*** | (2006.01) |
| ***G05B 13/02*** | (2006.01) |
| ***G06F 19/00*** | (2011.01) |
| ***G06F 17/00*** | (2006.01) |
| ***G06F 3/00*** | (2006.01) |
| ***G06F 3/048*** | (2013.01) |
| ***G09G 5/00*** | (2006.01) |

(52) U.S. Cl.
USPC ................ 700/83; 700/17; 700/29; 700/100; 715/215; 715/751; 715/771; 345/418; 345/619; 345/661

(58) Field of Classification Search
CPC .................................................... G05B 19/056
USPC ............ 700/17–19, 23, 29–30, 100–101, 83; 345/418, 619, 661; 715/215, 751, 763, 715/771; 717/100, 113, 116, 125, 127, 132, 717/156
See application file for complete search history.

(56) References Cited

U.S. PATENT DOCUMENTS 5,177,420 A * 1/1993 Wada et al. .............. 318/568.11
6,556,950 B1 * 4/2003 Schwenke et al. ............ 702/183

(Continued)

*Primary Examiner* — Darrin Dunn

(57) ABSTRACT

The present disclosure provides a dynamic view in a modeling of an automation system. A first portion of the model may be described in a first sequence description and a second portion of the model may be described in a second sequence description. The sequence descriptions are linked together. In one embodiment, the links are visually provided.

18 Claims, 65 Drawing Sheets

(56) References Cited

U.S. PATENT DOCUMENTS 6,701,325 B2 3/2004 Becker et al.
7,068,267 B2 * 6/2006 Meanor et al. ................ 345/418
2002/0054099 A1 * 5/2002 Schmitt et al. ................ 345/762
2002/0188597 A1 * 12/2002 Kern et al. ........................ 707/1
2004/0032412 A1 * 2/2004 Odom ........................... 345/440
2004/0254653 A1 * 12/2004 Eichhorn et al. ................ 700/18
2006/0031715 A1 * 2/2006 Klein et al. ..................... 714/23
2006/0036662 A1 * 2/2006 Cornell ......................... 707/205
2008/0120532 A1 * 5/2008 Lange et al. .................. 715/215
2009/0088875 A1 4/2009 Baier et al.
2009/0144647 A1 * 6/2009 Chandhoke ................... 715/772

* cited by examiner

DYNAMIC VIEWS IN A MODELING OF AN AUTOMATION SYSTEM

CROSS REFERENCE TO RELATED APPLICATIONS

This application is the US National Stage of International Application No. PCT/US2010/031346, filed Apr. 16, 2010 and claims the benefit thereof. The International Application claims the benefits of U.S. provisional application 61/170,156 filed Apr. 17, 2009, U.S. provisional application 61/170,212 filed Apr. 17, 2009, U.S. provisional application 61/170,192 filed Apr. 17, 2009, U.S. provisional application 61/170,208 filed Apr. 17, 2009, U.S. provisional application 61/170,200 filed Apr. 17, 2009, U.S. provisional application 61/170,219 filed Apr. 17, 2009, U.S. provisional application 61/281,609 filed Nov. 19, 2009. All applications are incorporated by reference herein in their entirety.

BACKGROUND

In the automation field, and more specifically during operational machine planning for a plant, an engineer traditionally creates a model that describes the operation a machine or system which will later be involved in the plant operation phase. For Example a mechanical model of a lifting apparatus is illustrated in FIGS. 1A-1H.

Referring to FIG. 1A, the lifting apparatus 100 has securing ends 110, rollers 120, a surface 115, and a lifter 130. The securing ends 110 may move up and down and are shown in an up position in FIG. 1A. The lifter 130 may raise or lower the surface 115 and is shown in a lower level position in FIG. 1A. Referring to FIG. 1B, the securing ends 110 are moved down into a down position. Referring now to FIG. 1C, the rollers 120 rotate to convey a parcel 140 onto the surface 115 of the lifting apparatus 100. As shown in FIG. 1D, at a time after the parcel 140 is located on the surface 115 of the lifting apparatus 100, the securing ends 110 are moved up. In particular, the securing ends 110 move from the down position to the up position in order to secure the parcel 140 onto the lifting apparatus 100. As shown in FIG. 1E, the lifter 130 raises the surface 115 from the lower level position to upper level position. Referring now to FIG. 1F the securing ends 110 move from the up position to the down position in FIG. 1G, the rollers 120 rotate to convey parcel 140 off the surface 115 of the lifting apparatus 100. Referring to FIG. 1H, the securing ends 110 are moved up from the down position to the up position. The lifter 130 lowers the surface 115 from the upper level to the lower level as shown in FIG. 1A.

Gantt Charts are commonly used to illustrate a project flow for project management purposes and to illustrate automation control. In FIG. 2, a Gantt chart provides a mechanical model which illustrates a sequence flow of the mechanical operation of the lifting apparatus of FIGS. 1A-1H.

In order to program digital controllers to operate the machines of an automation system, the mechanical model is traditionally given to an engineer that is familiar with programmable logic controller (PLC) programming. This engineer abstracts the mechanical model and creates the PLC runtime software that realizes the requirements described in the mechanical model.

The abstraction of the mechanical model depends on the programming method the engineer chooses. Examples of methods for programming a PLC include Statement List (STL), Ladder Logic, and Step Chain. Programming. In each of these cases, the programming requires a manual abstraction. A manual abstraction is time consuming and tends to be error-prone.

SUMMARY OF THE INVENTION

An output signal behavior in a modeling of an automation system is defined in the present disclosure. An electrical sequence flow of the automation system is displayed, for example, on an electronic display device. The electrical sequence flow includes a plurality of electrical steps from which an electrical step is identified. In addition, a signal line produced from the electrical step is identified. The identified electrical step and signal line are coupled to indicate that the electrical step produces the signal line and the display of the electrical sequence flow include a visual representation of the coupling. For example, the visual representation of the coupling includes a line drawn from the identified first electrical step to the signal line.

A user interface effective to receive input from a user and to graphically display the electrical sequence flow on the electronic display device may be provided. Thus, an input may be received via the user interface as a result of the user identifying the electrical step. Likewise an input may be received from the user interface as a result of the user identifying the signal line. The user interface may include a mouse such that a user places a mouse cursor over the step and/or signal line and subsequently clicks the mouse in order to identify the respective step and/or signal line. The user interface may include a keyboard having predefined keys assigned to identify the step and/or signal line.

In one embodiment, the signal line may be altered by the user to set and/or reset at least a portion of the signal line. For example, the reset may be at: the beginning of the identified electrical step, the end of the identified electrical step, the beginning of a further electrical step, or end of the further electrical step. Likewise the set may be at: the beginning of the identified electrical step, the end of the identified electrical step, the beginning of a further electrical step, or end of the further electrical step.

The present disclosure further provides for altering a modeling of an automation system to insert a proxy step. At least one valid position in an electrical sequence flow of the automation system in which a proxy step could be inserted into an electrical sequence flow is determined. The electrical sequence flow is displayed, for example, on an electronic display device. The electrical sequence flow pertains to a plurality of resources and includes a plurality of electrical sequence elements which may be, for example, an electrical step or an electrical transition. The plurality of electrical sequence elements includes a first electrical step. The electrical sequence flow further includes an icon for each of the determined at least one valid position. An icon to be replaced by a new proxy step is identified and subsequently replaced with the new proxy step. Transitions effective for the new proxy step to be parallel to the first electrical step are added and the electrical sequence flow is displayed after the replacing the icon and the adding electrical transitions.

A user interface effective to receive input from a user and to graphically display the electrical sequence flow on the electronic display device may be provided. Thus, an input may be received via the user interface as a result of the user identifying the icon. The user interface may include a mouse so that a user places a mouse cursor over the icon and subsequently clicks the mouse in order to identify the respective icon. The user interface may include keyboard having predefined keys assigned to identify the icon.

The adding of the transitions may be achieved by different embodiments. For example the adding the transitions may be automatic or manually. In one embodiment, the adding the transitions includes adding a first electrical transition and an electrical second transition.

The first electrical transition visually connects a second electrical step to the new proxy step such that the first electrical transition is effective to transition from the second electrical step to the proxy step. Alternatively, the first electrical transition visually connects a global start step to the new proxy step such that the first electrical transition is effective to transition from the global start step to the proxy step.

The second electrical transition visually connects the proxy step to a third electrical step such the second electrical transition effective to transition from the new proxy step to the third electrical step. The second electrical transition may alternatively visually connects the proxy step to a global end step such that the second electrical transition effective to transition from the new proxy step to the global end step.

The second electrical step may be determined by only the time scale or by resource. In one embodiment, the second electrical step is immediately previous to the proxy step according to a time scale. In another embodiment, the second electrical step is immediately previous to the proxy step respective to the resource associated with the newly added proxy step. Likewise, the third electrical step may be determined by only the time scale or by resource. In one embodiment, the third electrical step is immediately after the proxy step according to a time scale. In another embodiment, the third electrical step is immediately after the proxy step respective to the resource associated with the newly added proxy step.

It is possible to alter a third transition from the first electrical step. In one embodiment the third transition is altered by changing the third transition to visually connect the first electrical step to the global end step. The third transition is effective to transition from the first step to the global end step.

In another embodiment, the third transition is altered from the first electrical step by changing the third transition to visually connect the first electrical step to a fourth electrical step related, the first electrical step and the fourth electrical step associated to a same resource. The third transition is effective to transition from the first step to the fourth electrical step.

The proxy step may be deleted after it has been added. In one embodiment the electric transitions that were added are deleted. Altered electrical transitions may be altered to be what they were prior to the adding of the proxy step. In a preferred embodiment, when the proxy step is deleted, the sequence flow is place back to how it was prior to the adding of the proxy step in regards to the electrical transitions added are altered for the adding of the proxy step The present disclosure further provides a method for replacing a mechanical sequence element in a modeling of an automation system. A mechanical sequence flow of the automation system is displayed, for example, on an electronic display device. The mechanical sequence flow includes a plurality of mechanical sequence elements which may be, for example, a mechanical step or a mechanical transition. The mechanical step is an action to be performed by a resource and the mechanical transition indicates a change of the mechanical sequence flow mechanical steps. A mechanical sequence element is identified from the plurality of mechanical sequence elements. The identified mechanical sequence element is removed from the plurality of mechanical sequence elements thereby removing the identified mechanical sequence element from the mechanical sequence flow. A new mechanical sequence element is received. The mechanical sequence flow is altered by adding the new mechanical sequence element to the mechanical sequence flow. After altering the mechanical sequence flow the mechanical model is displayed.

A user interface effective to receive input from a user may be provided. Thus, an input may be received via the user interface as a result of the user identifying the mechanical sequence element. The user interface may include a mouse such that the user places a mouse cursor over the mechanical sequence element and subsequently clicks the mouse in order to identify the respective mechanical sequence element. The user interface may include keyboard having predefined keys assigned to identify the mechanical sequence element.

A time scale may be included such that each of the plurality of mechanical sequence element including a starting time and ending time in respect to the time scale. In one embodiment the starting time and the ending time for the mechanical transition is the same.

After removing the identified mechanical sequence element and before receiving the input indicating a mechanical sequence element that is new, the mechanical sequence flow may be displayed. The display may include a gap in display of the mechanical sequence flow. The gap is relative to the time scale and formed starting at the starting time of the identified mechanical sequence element and ending at a time greater than the starting time of the gap. The adding the new element to the mechanical sequence flow may include adding the new element so that the start time of the new element is at a time corresponding to the beginning of the gap. The gap may then be altered in the display such that beginning of the gap is at an ending time of the added mechanical sequence element.

An input may be received via the user interface as a result of the user indicating to finish the mechanical sequence flow. Different types of finishing the mechanical sequence flow may be indicated. For example, the user may indicate to complete the replacing of the mechanical element in which case the gap is removed from the display of the mechanical sequence flow. Another example may that the user may indicate to cancel the replacing of the mechanical element in which case the mechanical sequence flow is restored to comprise the mechanical sequence elements that existed before the identifying the mechanical sequence element from the plurality of mechanical sequence elements and the mechanical sequence flow is displayed.

In one embodiment an electrical sequence flow is not displayable after the identifying of a mechanical sequence element from the plurality of mechanical sequence elements until the receiving input from the user effective to finish the replacing.

The present disclosure further provides a dynamic view definition in a modeling of an automation system. A first sequence description of a model of the automation system is displayed, for example, on an electronic display device. The first sequence description includes a first sequence flow and is contained in a first file. A first object is identified from the displayed first sequence flow.

A second sequence description of the model of the automation system is displayed for example, on the electronic display device. The second sequence description includes a second sequence flow of the automation system and is contained in a second file. The second object identified from the displayed second sequence flow.

The first sequence description is lined to the second sequence description via a first external link in the first file, the linking after the identifying the second object. Likewise, the second sequence description is linked to the first sequence description via a second external link in the second file, the linking after the identifying the first object.

In one embodiment, the first and second sequence flows are mechanical sequence flows each having a plurality of mechanical steps. The identified first object is a beginning of one of the plurality of mechanical steps in the first sequence flow or an ending of one of the plurality of mechanical steps in the first sequence flow. The identified second object is a beginning of one of the plurality of mechanical steps in the second sequence flow or an ending of one of the plurality of mechanical steps in the second sequence flow. The identified first object may be identified as an external transition in and the identified second object may be identified as an external transition out such that an external transition is added from the identified first object to the identified second object.

In another embodiment the first and second sequence flows are electrical sequence flows each having a plurality of electrical steps. The first object may be a beginning of one of the plurality of electrical steps in the first sequence flow or an ending of one of the plurality of electrical steps in the first sequence flow and the identified second object may be a beginning of one of the plurality of mechanical steps in the second sequence flow or an ending of one of the plurality of mechanical steps in the second sequence flow. The identified first object may be a one of the plurality of electrical steps, and the identified second object may be an electrical signal line. The first object may be an electrical transition starting from the first sequence flow and the identified second object may be an electrical signal line. The identified first object may be identified as an external transition in and the identified second object may be identified as an external transition out such that an external transition is added from the identified first object to the identified second object.

A visual representation of the external link may be provided. The visual representation may be based on the type of external link such as an external transition, condition, or a signal.

In one embodiment the displays are separate meaning not concurrent in the same display. In another embodiment the displays are together in the same display.

A user interface effective to receive input from a user may be provided. Thus, an input may be received via the user interface as a result of the user identifying the first and second objects. The user interface may include a mouse such that a user places a mouse cursor over the identified object and clicks the mouse in order to identify the respective object. The user interface may include a keyboard having predefined keys assigned to identify the respective object.

The present disclosure further provides a method for providing alternative paths. A mechanical sequence flow comprising a plurality of mechanical sequence elements is displayed, for example, on an electronic display device. An alternative section is identified from the plurality of mechanical sequence elements, the alternative section including an original path. The original path may be defined from mechanical sequence elements within the alternative section. An alternative path is created within the alternative section In one embodiment, the identifying of an alternative section includes identifying a starting point for an alternative section, and identifying an ending point for the alternative section. The alternative path is created starting, from the starting point and ending with the ending point. The starting point may be identified from a start or end of one of the plurality of mechanical sequence elements. Likewise the ending point may be identified from a start or end of one of the plurality of mechanical sequence elements, the ending point occurring after the starting point relative to a time scale. In one embodiment, the displaying of the mechanical sequence flow further comprises a plurality of symbols each of which represents a starting point. The starting point may then be identified from one of the plurality of symbols. In a further embodiment, the mechanical sequence flow is displayed after the starting point is identified, the mechanical sequence flow comprises a plurality of symbols each of which represent a ending point. The ending point may then be identified from one of the plurality of ending points. A user interface may be provided. The user interface effective to receive input indicating the identified starting point and input indicating the identified ending point. The receiving of the input may be as a result of a user placing a cursor over the respective identified point and clicking a mouse or the user pressing a predefined keyboard key.

Input to add one or more mechanical sequence elements the alternative path may be received.

The display of mechanical sequence flow in response to creating the alternative path may exclude the original path. The displaying of the mechanical sequence flow in response to creating the alternative path may include a gap in the mechanical sequence flow, the gap relative to the time scale, the gap formed starting at the starting point of the identified mechanical sequence element and ending at a time greater than the starting time of the gap.

The creating of the alternative path may be finished via input to cancel the alternative path or to complete the path. In one embodiment, an electrical sequence flow is not displayable after the creating the alternative path until receiving input from the user effective to finish the replacing. The electrical sequence flow differentiates the alternative path from the original path.

The present disclosure further provides for altering runtime software produced for at least one PLC in an automation system via a modeling tool. The altering by a split or a merge. A model of an automation system includes a mechanical sequence flow for a plurality of resources and an electrical sequence flow for the plurality of resources is provided. Displaying the plurality of resources are displayed, for example, on an electronic display device. Each of the plurality of resources is in a first sequence. A resource from the plurality of resources is identifying to be split from the first sequence. The identified resource is removed from the first sequence and added to a second sequence. Runtime software for the first and second sequence is generated after the removing and the adding. The runtime software for the first sequence controlling resources of the first sequence and the runtime software for the second sequence controlling the resources of the second sequence.

The present disclosure further provides a monitoring of an online automation system. The model of the automation system that was used to program a PLC in the automation system is displayed, for example, on the electronic display device. The model may be a mechanical model that includes a mechanical sequence flow for at least one resource, the mechanical flow comprising a plurality of mechanical elements. In contrast, the model may be an electrical model that includes an electrical sequence flow for at least one resource, the electrical sequence flow comprising a plurality of electrical elements.

Input, such as PLC step information, input signal and/or output signal, effective to indicate an execution PLC is received. A visual representation is provided on the display of the model which represents the execution of the PLC.

In one embodiment, the visual representation includes a line perpendicular to a time scale and which moves along the time scale during the execution. In another embodiment the visual representation includes color indications of the execution of the PLC. In a further embodiment, the visual representation includes a shading or brightness indication on the display which indicates the execution of the PLC.

In one embodiment input is received via a user interface effective to control the monitoring of the automation system. The input may be for example, to stop the monitoring of the automation system, to pause the monitoring of the automation system, to record the monitoring of the monitoring system, to playback a recorded monitoring, to resume monitoring of the automation system. In one embodiment, the control of the control of the automation system includes a control of the PLC.

In one embodiment, the monitoring is provided by an arrangement. The arrangement includes an automation system with a PLC that includes a PLC runtime software. The arrangement further includes a modeling system that includes a CPU, a memory, a program that executes on the CPU and which monitors the automation system, the created model stored in the memory and used to create PLC runtime, and a user interface effective to receive input from a user and to display the created model. Input is received effective to indicate an execution of the PLC. A visual representation based on the received input is provided on the display of the model which represents the execution of the PLC.

In one embodiment, a data adapter device is provided to convert information from the PLC to a format usable by the monitoring program. The data adapter may be coupled to the automation system and the modeling system. The data adapter translates a runtime information from the PLC to the information effective to indicate an execution of the PLC.

After the modeling is completed, runtime software for a programmable logic controller may be produced from the model. The created runtime software may then be downloaded to the PLC via the network.

BRIEF DESCRIPTION OF THE DRAWINGS

The above mentioned and other concepts of the present invention will now be described with reference to the drawings of the exemplary and preferred embodiments of the present invention. The illustrated embodiments are intended to illustrate, but not to limit, the invention. The drawings contain the following figures, in which like numbers refer to like parts throughout the description and drawings wherein:

FIGS. 10A-10I illustrate exemplary alternative paths in accordance with the presented disclosure.

DETAILED DESCRIPTION OF THE INVENTION

Figure 1A:
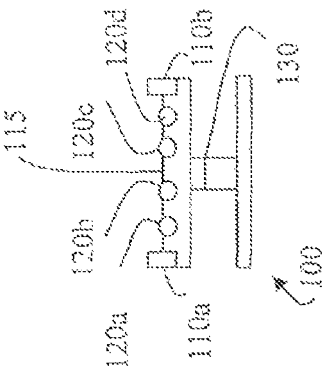
FIGS. 1A-1H illustrates a sequence flow of the mechanical operation for a lifting apparatus.

In one aspect of the present disclosure, an improved method of modeling an automation system is provided. Another aspect of the present disclosure is directed to an improved mechanical model of the automation system. Yet another aspect of the present disclosure is directed to an improved mechanical sequence flow of the automation system. Still another aspect of the present disclosure is directed to an improved electrical model of the automation system. A further aspect of the present disclosure is directed to an improved electrical sequence flow of the automation system. Yet a further aspect of the present disclosure is directed to an improved method to monitor an automation system.

The present disclosure is described in context of the automation system being a lifting apparatus. The principles of the present disclosure, however, are not limited to use within a lifting apparatus but may be applied to other machines and systems in an automation system.

The present disclosure is described in context of identifying or selecting an object by using a mouse as a user interface and placing a mouse cursor on an object displayed on the electronic device. However, it would be understood that other user interfaces to provide input could be used such as touchscreen, gesture recognition system, keyboard, joystick, and the like). The term "object" refers to GUI tool, signal line, condition, modeling data, mechanical transition, electrical transition, mechanical element and/or electrical element. The term "mouse cursor" refers to a visual icon on the display which is movable on the electronic display device by moving the mouse. The mouse cursor is commonly represented as an arrow or a hand but may be represented by any icon. It would be understood, that placing a mouse cursor "on" object would include directly on as well as an area surrounding the object in close enough proximity to the object that the object may be uniquely identified by proximity to the mouse cursor. It would also be understood that using a mouse cursor is merely an example and other means may be used to identify and/or alter the objects.

The present disclosure is described in terms of a time scale, a mechanical sequence flow and an electrical sequence flow being displayed in a horizontal fashion with the time scale increasing in the right direction. It would be understood that the time scale could increase in the left direction or that the electrical sequence flow could be in a vertical fashion with the time scale increasing in the up or down direction.

The present disclosure is described in terms of one or more XML files which include the modeling of the automation system. One skilled in the art would recognize that other means may be used. For example, any database format such as relational, hierarchical and network may be used. Furthermore, a flat file may be used. However, since XML is extensible and self describing database it is particularly useful in describing modeling data.

The present disclosure is described in terms of monitoring the automation system via the electrical sequence flow used to create the PLC runtime software for the automation system. It would be understood that the sequence view of mechanical sequence flow used to create the PLC runtime software for the automation system could be used to monitor the automation system.

Figure 3:
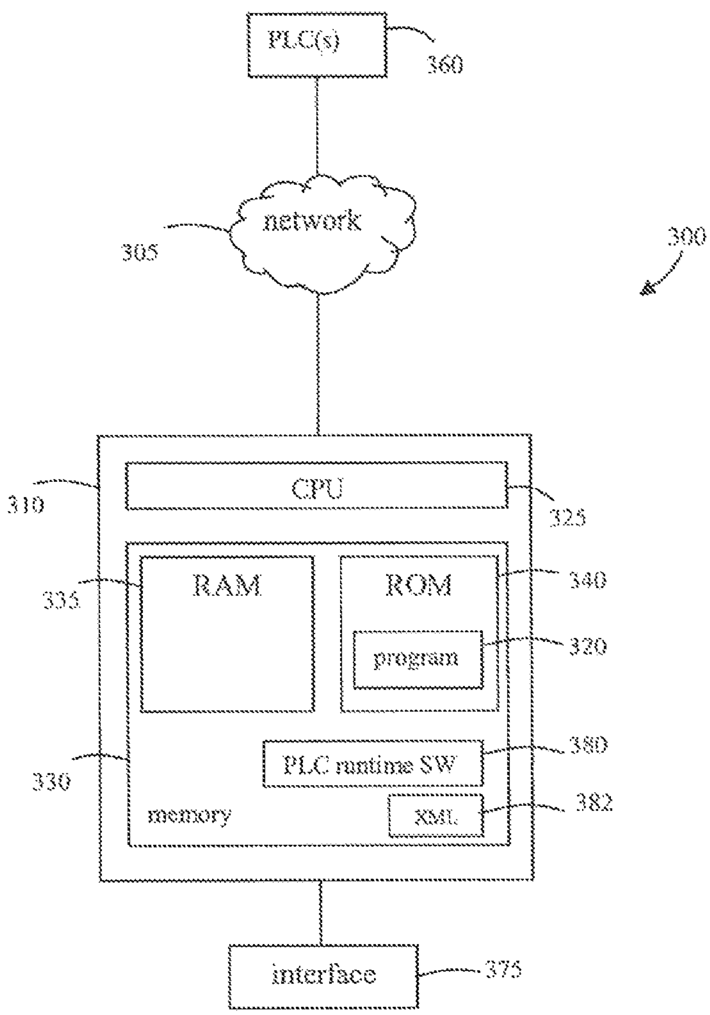
FIG. 3 illustrates an exemplary system according in accordance with the present disclosure.

FIG. 3 illustrates a system 300 according to an exemplary embodiment of the present disclosure. As shown in FIG. 3, the system 300 includes a computing device 310 that may be connected to one or more PLCs 360 over a wired or wireless network 305.

The computing device 310, which may be a portable or laptop computer or a mainframe or other computer configuration, includes a central processing unit (CPU) 325 and a memory 330

The CPU 325 executes a program 320 as a modeling tool and/or monitoring tool to facilitate the methods described herein. The memory 310 includes a random access memory (RAM) 335 and a read-only memory (ROM) 340. The memory 330 may also include a database, disk drive, tape drive, and the like or a combination thereof. The RAM 335 functions as a data memory that stores data used during execution of a program 320 in the CPU 325 and is used as a work area. The ROM 340 functions as a program memory for storing the program 320 executed in the CPU 325. The program 320 may reside on the ROM 340 or on any other computer-usable medium as computer readable instructions stored thereon for execution by the CPU 325 or other processor to perform the methods of the present disclosure.

A user interface 375 may be coupled to the computing device 310. The user interface 375 may include, for example, an electronic display device, and input interfaces such as the GUI tools, a mouse and a keyboard. An electronic display device is a device which renders a two or three dimension display. For example, the electronic display device may be a liquid crystal display (LCD), cathode ray tube (CRT) display, printer, and the like. One skilled in the art would recognize that other user interfaces may be used. For example, a touch screen display device.

The operation of the system 300 may be controlled via the user interface 375. For example, the user interface 375 may be part of an operator's console which communicates with the computing device 310 and through a network, a bus or other means.

In one embodiment, the program 320 automatically generates at least one XML file 382 to include the modeling information.

In one embodiment, the program 320 automatically generates PLC runtime software 380 for the PLC 360 from at least one of the models described below. The PLC runtime software 380 may then be stored in memory 330. The PLC(s) 360 may programmed with the PLC runtime software 380 via the network 305.

Mechanical Model

Figure 4A:
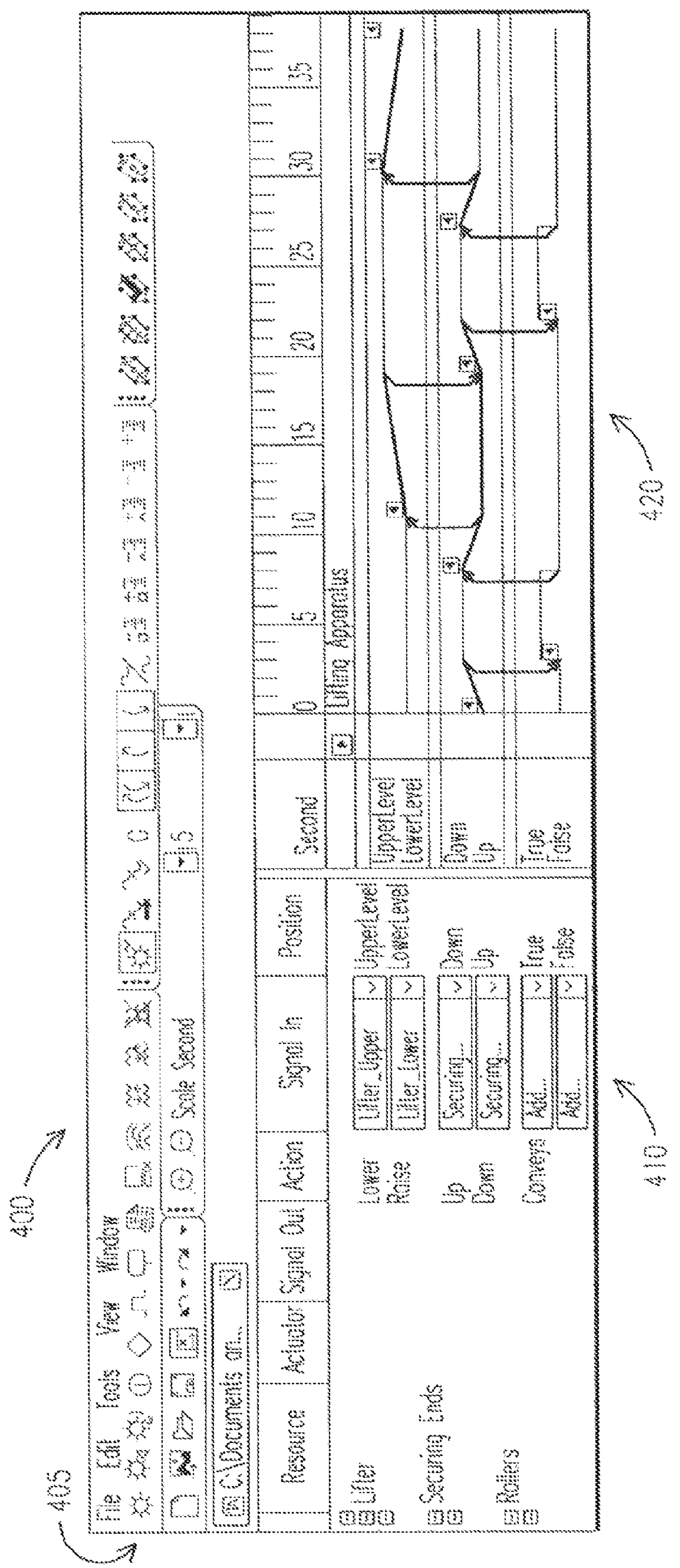
FIG. 4A-4E illustrate an exemplary mechanical model in accordance with the present disclosure.

FIGS. 4A-4E illustrates an exemplary modeling tool that facilitates modeling of an automation system. Referring to FIG. 4A, the modeling includes a mechanical model 400 which illustrates the sequence flow of the mechanical operation of the automation system. In FIG. 4A, the exemplary mechanical model 400 visually represents the sequences of FIGS. 1A-1H for the lifting apparatus. The mechanical model 400, which is displayed on an electronic display device, may include a graphical user interface (GUI) tools 405, a table view 410 and a sequence view 420 of the mechanical operation.

Figure 4B:
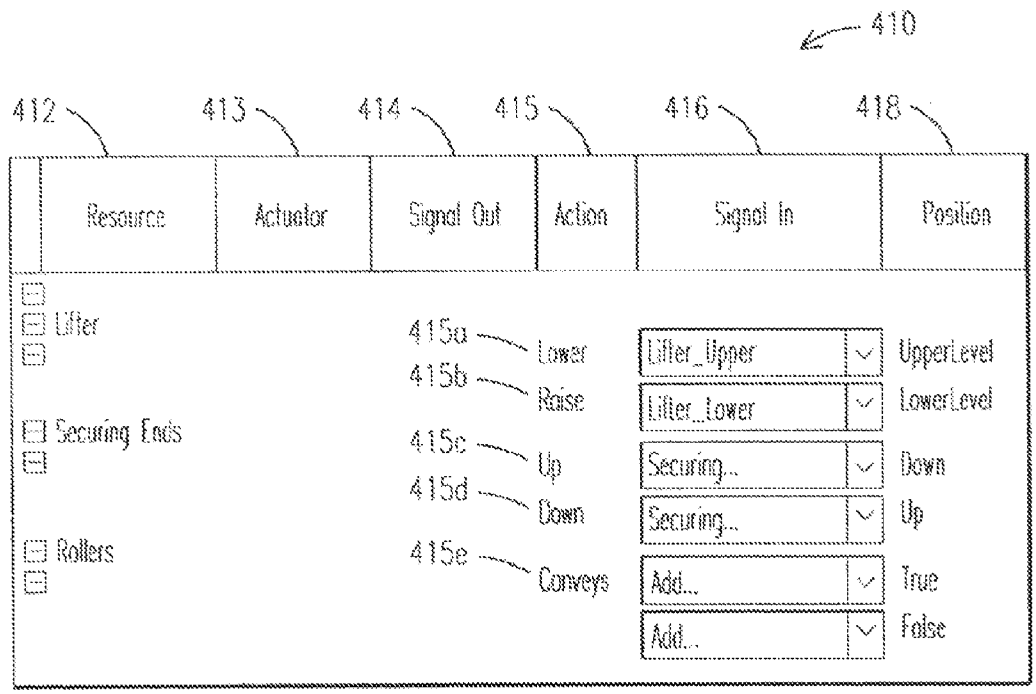

Referring to FIG. 4B, the table view 410 contains modeling data arranged in a tabular format. The modeling data may include resource 412, actuator 413, signal out 414, action 415, signal in 415, and position 418.

A resource 412 represents a specific hardware device of the automation system. In the exemplary embodiment illustrated in FIG. 4B, a plurality of resources 312 are provided which include a lifter, securing ends, and rollers.

An action 415 may be defined for each resource 412. An action 415 describes a possible behavior of the resource 412, which may be used to perform a mechanical operation in the mechanical model 400.

Each action 415 may be associated with a position 418, which may identify a physical start position for the action 400. As illustrated, the lifter has the actions raise and lower which describe the behavior of the lifter as a movement of the lifter. The raise action is associated with the lower level position since the lifter is raised starting from the lower level position to the upper level position. The lower action is then associated with the upper level position since the lifter is lowered starting from the upper level position to the lower level position. The securing ends have the actions up and down that describe the movement of the securing ends which may move up from a down position and down from an up position. The rollers have the action conveys to describe the behavior of the rollers. Unlike the lifter and the securing ends, the position of the rollers identifies a condition instead of a physical start position. The positions of the rollers are true and false. For the rollers to convey the parcel, the position is true. Additional actions may also be included for the roller in which the actions would also have a condition of true. It would be understood that true and false are merely used by way of an example and the names of the position may be altered. Furthermore, a time value which defines the duration of the action may be associated with an action. For example, the up action for the securing ends is associated with a time of 3 seconds.

In the simplest form, the mechanical model 400 only identifies the start and end positions or a condition defining a change in behavior. The exact physical behavior between the start and end positions, including intermediate positions, velocity and acceleration, is not described in the simplest case.

The actuator 413, signal out 414, signal in 416 are described in more detail with the Electrical Model.

Figure 5A:
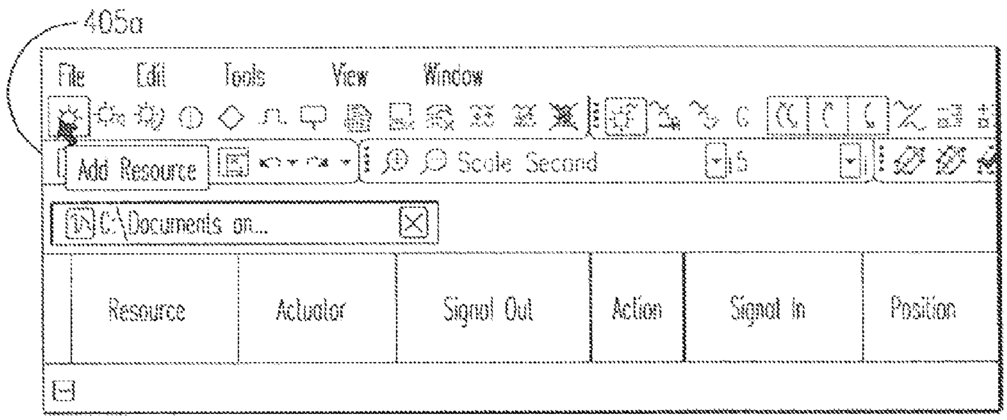
FIGS. 5A-5C illustrate an exemplary user interface using graphical tools in accordance with the present disclosure.
Figure 5B:
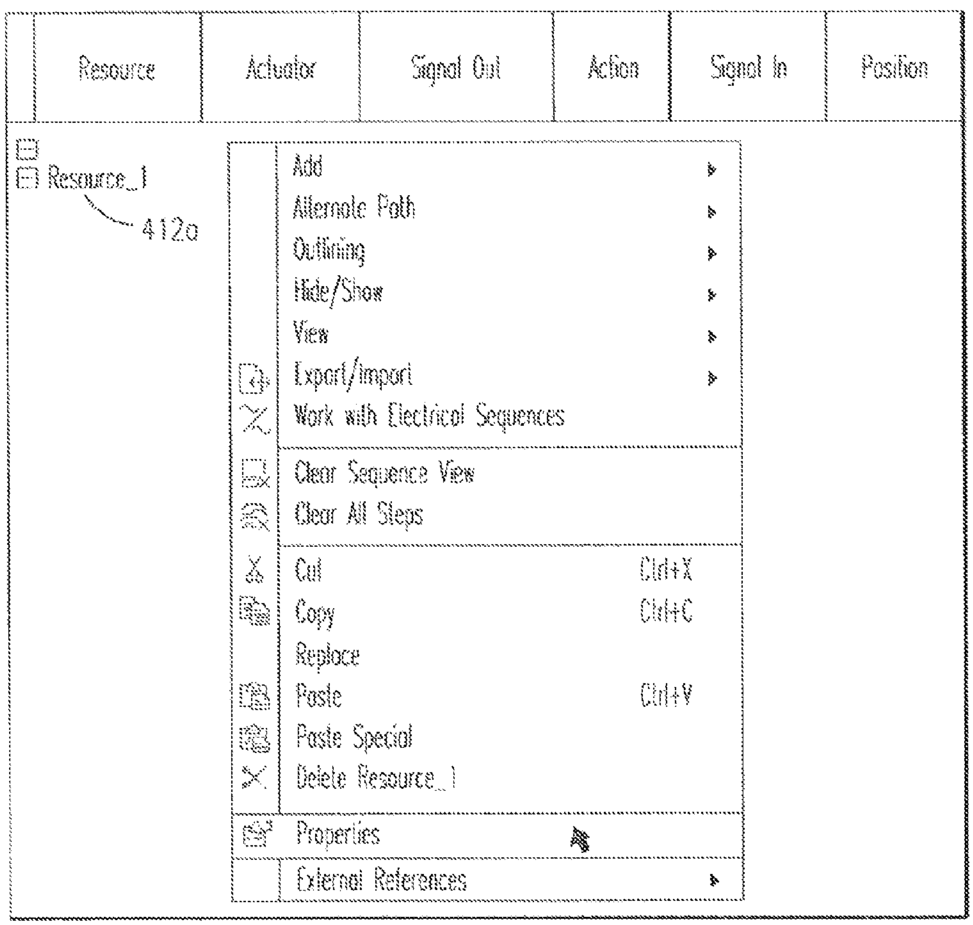
Figure 5C:
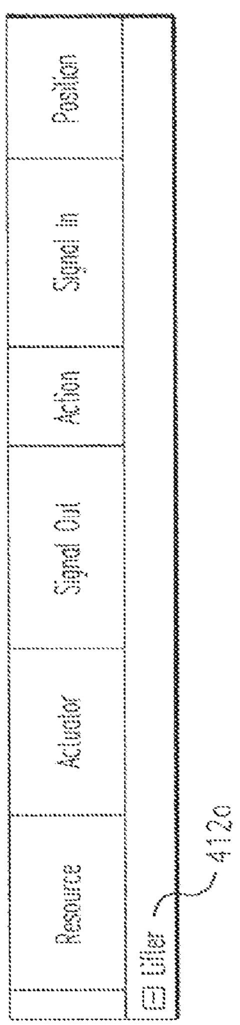

A designer may alter the modeling data in the table view 410 via the user interface 375. The term "alter" and its derivatives means add, change, and/or delete. A designer is a user of the modeling tool. An exemplary embodiment of altering the data in the table view 410 is described in FIGS. 5A-5C. Referring to FIG. 5A, a designer may add a resource 412 by placing the mouse cursor over the resource GUI tool 405(*a*) and clicking the mouse. Now referring to FIG. 5B, after the resource 412(*a*) has been added, a designer may then alter the attributes of the resource 412(*a*) via an input interface by placing the mouse cursor over the newly added resource 412(*a*) and clicking the mouse so that a GUI tool 405 is provided. As illustrated, a menu 405(*b*) is provided to alter the resource 412(*a*). Examples of resource attributes may be a name of the resource and a description of the resource. FIG. 5C shows resource 412(*a*) after having altered the name of to resource 412(*a*) to lifter.

The GUI tools 405 may be used to alter the mechanical model 400 example, such as the modeling data in the table view 410 and or the mechanical sequence flow of the mechanical operation in the graphical view 430. One skilled in the art would realize that other graphical user interfaces may be used to alter the mechanical model 400. Other GUI means such as drop down boxes, drop and drag may be used.

Figure 4D:
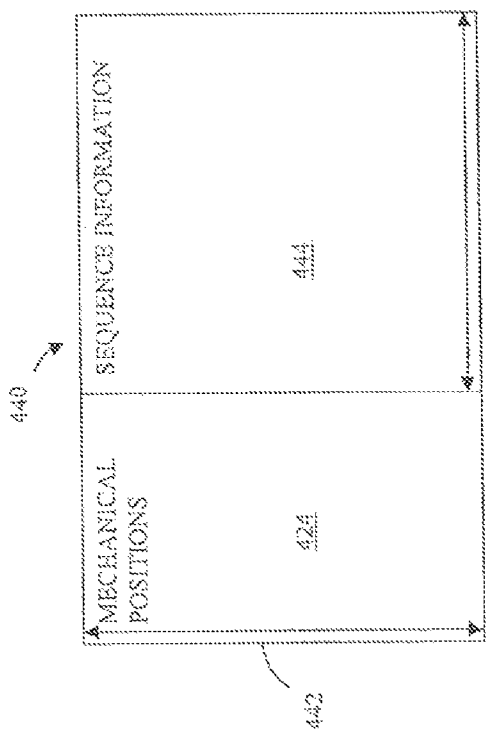
Figure 4C:
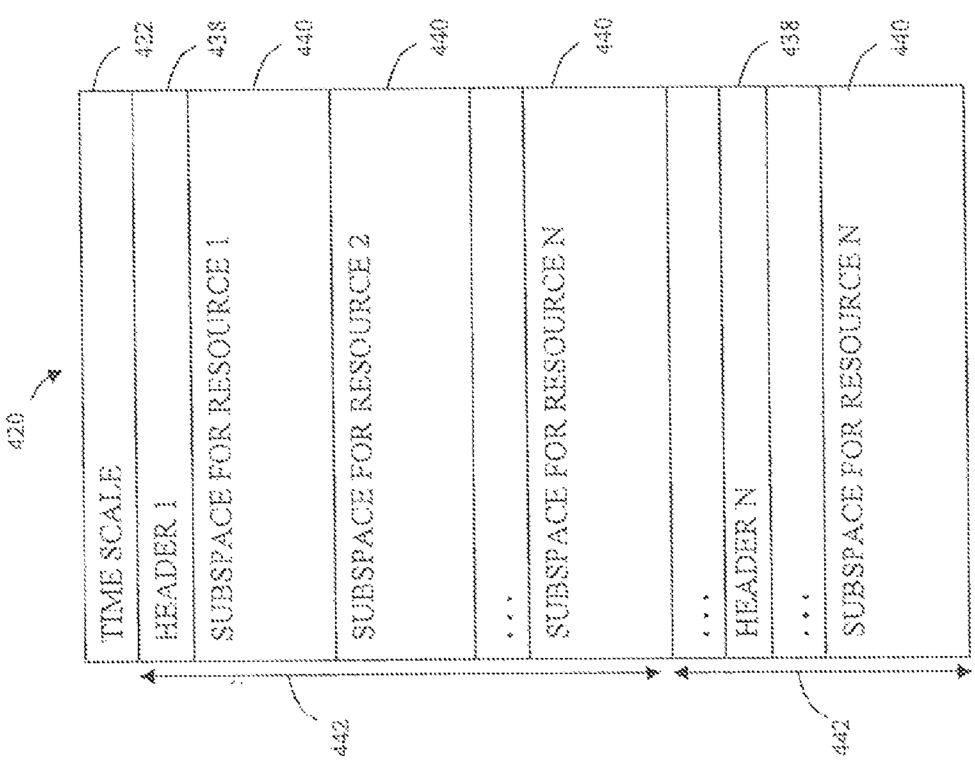

FIG. 4C illustrates an exemplary sequence view 420 of the mechanical operation. As illustrated in FIG. 4C, the sequence view 420 of the mechanical operation, may include a timescale 422 and at least on sequence description 442. Each sequence description 442 uses the single time scale 422

Each sequence description 442 includes one or more subspaces 440. Each subspace describes mechanical information for a resource. Furthermore, a sequence description 442 may include a sequence description header 438. Preferably the sequence header is numeric text but any delineation may be used. The sequence descriptions are described below in more detail.

FIG. 4D illustrates an exemplary subspace 440. Referring to FIG. 4D, the subspace 440, may include a subregion 424 for defining the mechanical positions of the resource as positions on a vertical axis and a subregion 444 for depicting the sequences information of the operation for the resource.

Figure 4E:
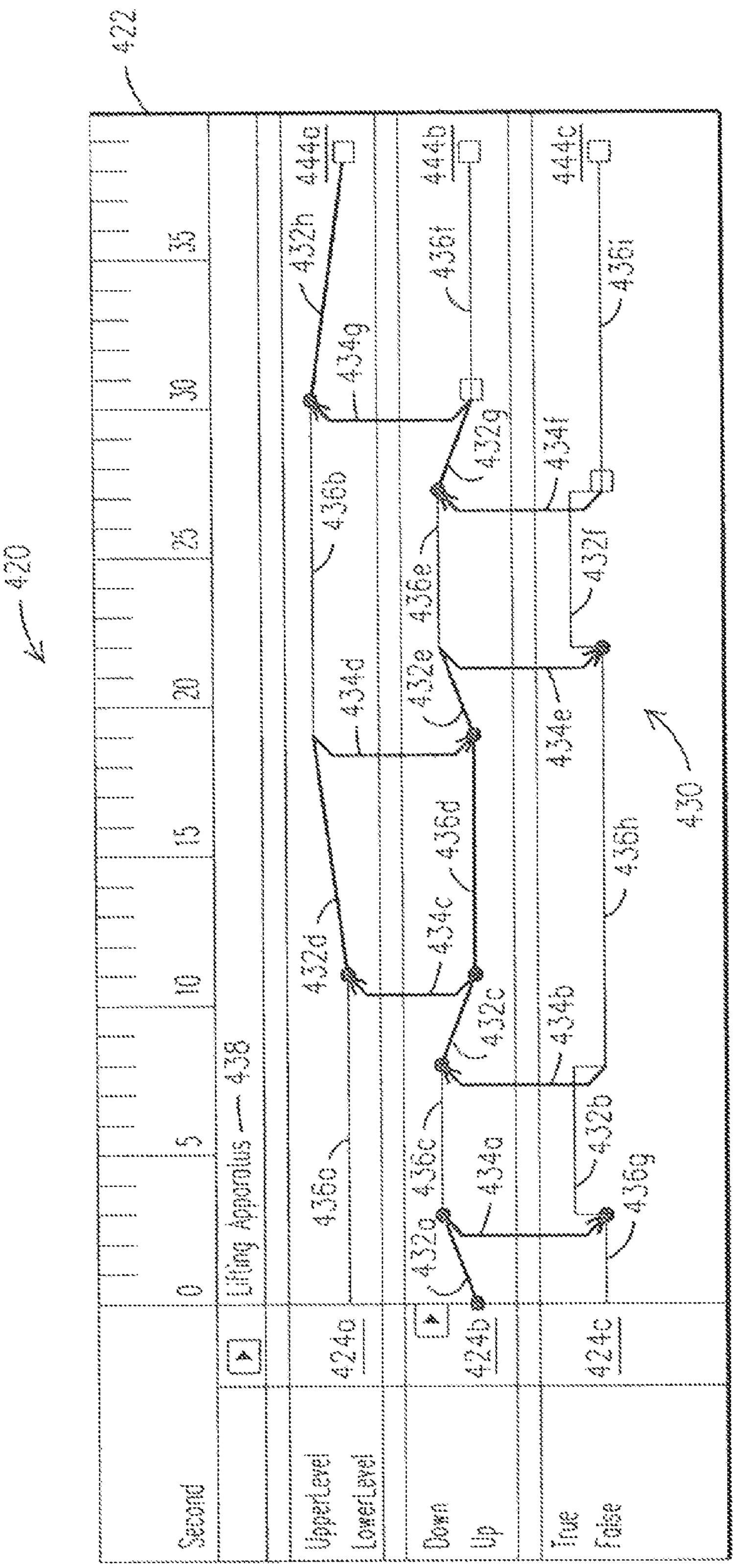

Now referring to FIG. 4E, the exemplary sequence view 420 of the mechanical operation, as shown in FIG. 4C, includes a time scale 422, a sequence description header 438, mechanical positions 424 and graphical view 430. In the present embodiment, the time scale 422 is shown in seconds. One skilled in the art would recognize that a time scale 422 using a unit other than seconds may be used, for example, minutes or microseconds. The exemplary sequence view 420 shows a single sequence description header 438 with the name "Lifting Apparatus". The positions 424 represent the positions 418 contained in the table view 410. In another embodiment, only a single representation of the positions is displayed in either the table view 410 or in the sequence view 420.

The graphical view 430 visually illustrates the sequence flow of the mechanical operation for the automation system. In order to describe the mechanical operation of the automation system, the graphical view 430 would include all of the sequence information 444 for each of the subspaces 440. However, the graphical view 430 may include a portion of the mechanical operation. The mechanical sequence flow is formed by mechanical elements such as mechanical steps 432 and mechanical transitions 434. The mechanical step 432, in the graphical view 430, is the performance of the action 415 from the table view. Each mechanical step 432 has a starting time and an ending time. Mechanical step 432(*a*) starts at time 0 and ends at 3 seconds and visually shows the securing ends being moved from a starting position of up to an ending position of down.

A designer may add mechanical steps 432 via the user interface. In one embodiment the designer may click at the start position of the mechanical step 432 and click again at the end position of the mechanical step 432. Accordingly, the mechanical step 432 is visually added based on the start and end positions. Furthermore, the mechanical step 432 may include attributes of the action associated with the mechanical step. For example, the time to perform the mechanical step may automatically be included and illustrated via the time scale. One skilled in the art would recognize other interfaces may be used. For example, the electronic display device may have a touch sensor so that the designer may draw the mechanical step 432.

Changing from a mechanical step 432 of one resource to a mechanical step 432 is called a mechanical transition 434. The starting time and the ending time for a mechanical transition between different resources is the same. At time 3 a mechanical transition 434(*a*) occurs from mechanical step 432(*a*) to mechanical step 432(*b*) which shows that the rollers convey the parcel at time 3.

A designer may alter mechanical transitions 434 via the user interface. In one embodiment, the designer may only alter a mechanical transition 434 that transitions between different resources. In one embodiment the designer may click at the end position of a first mechanical step 432 and click again at the end position of a second mechanical step 432. A mechanical transition 434(*b*) occurs from mechanical step 432(*b*) to mechanical step 432(*c*) which shows that the securing ends being moved up. A mechanical transition 434 (*c*) occurs from mechanical step 432(*c*) to mechanical step 432(*d*) which shows the lifter is raised to the upper position. A mechanical transition 434(*d*) occurs from mechanical step 432(*d*) to mechanical step 432(*e*) which shows the securing ends being moved down. A mechanical transit on 434(*e*) occurs from mechanical step 432(*e*) to mechanical step 432(*f*) which shows that the rollers convey the parcel. A mechanical transition 434(*f*) occurs from mechanical step 432(*f*) to mechanical step 432(*g*) which shows the securing ends being moved up. A mechanical transition 434(*g*) occurs from mechanical step 432(*g*) to mechanical step 432(*h*) which shows the lifter is lowered to the lower position. At the end of mechanical step 432(*g*), the lifting apparatus is in the original state of time 0.

Connecting the mechanical steps of a resource are mechanical waiting periods 436. The mechanical waiting periods 436 visually represent that an action is not being performed on the resource. The mechanical waiting periods are not necessary to visually illustrate the mechanical sequence flow and thus may be excluded.

Electrical Model

In addition to modeling the mechanical operations, the modeling tool facilitates the modeling of the electrical operations of the automation system. The electrical model facilitates defining the interactions between input signals and/or output signals and a resource.

Figure 6A:
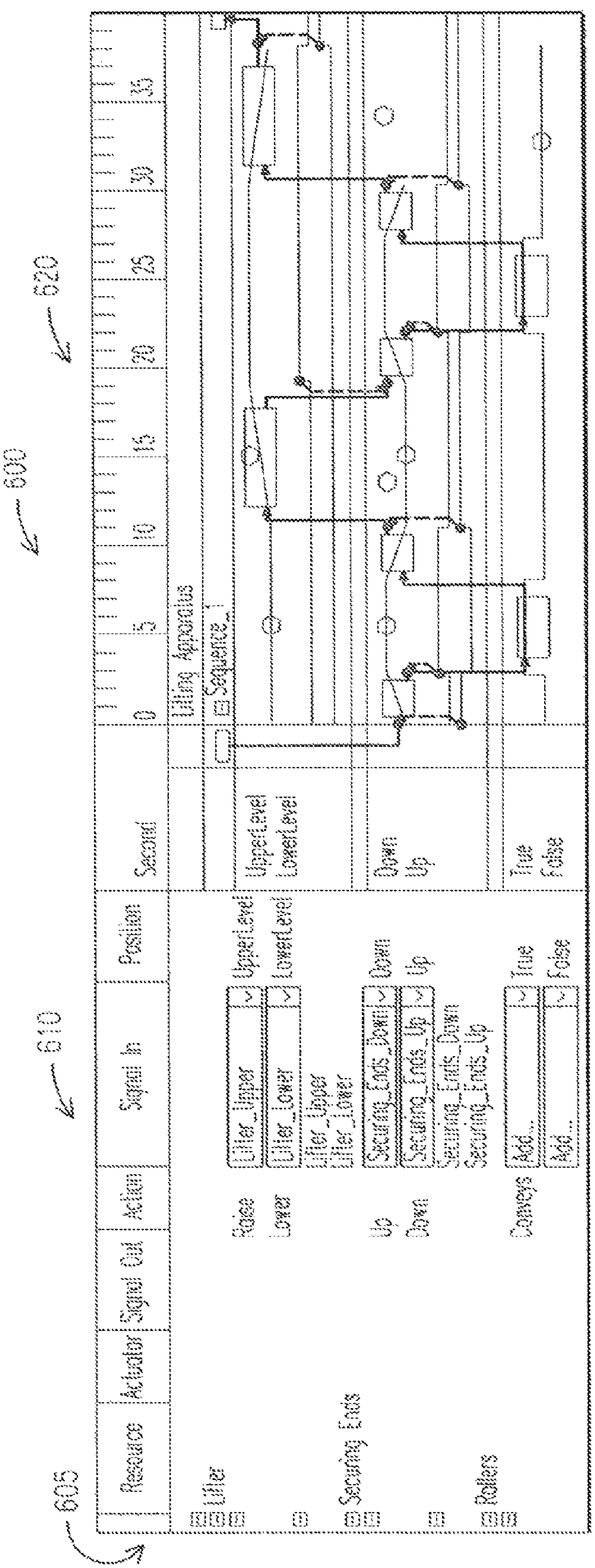
FIGS. 6A-6K illustrate an exemplary electrical model in accordance with the present disclosure.

Referring, to FIG. 6A, the exemplary electrical model 600 describes a sequence flow of the electrical operation. In FIG. 6A the exemplary electrical model 600 corresponds to the mechanical model of FIG. 4. The electrical model 600, which is displayed on the electronic display device, may include GUI tools 605, a table view 610 and a sequence view 620 of the electrical operation.

Figure 6B:
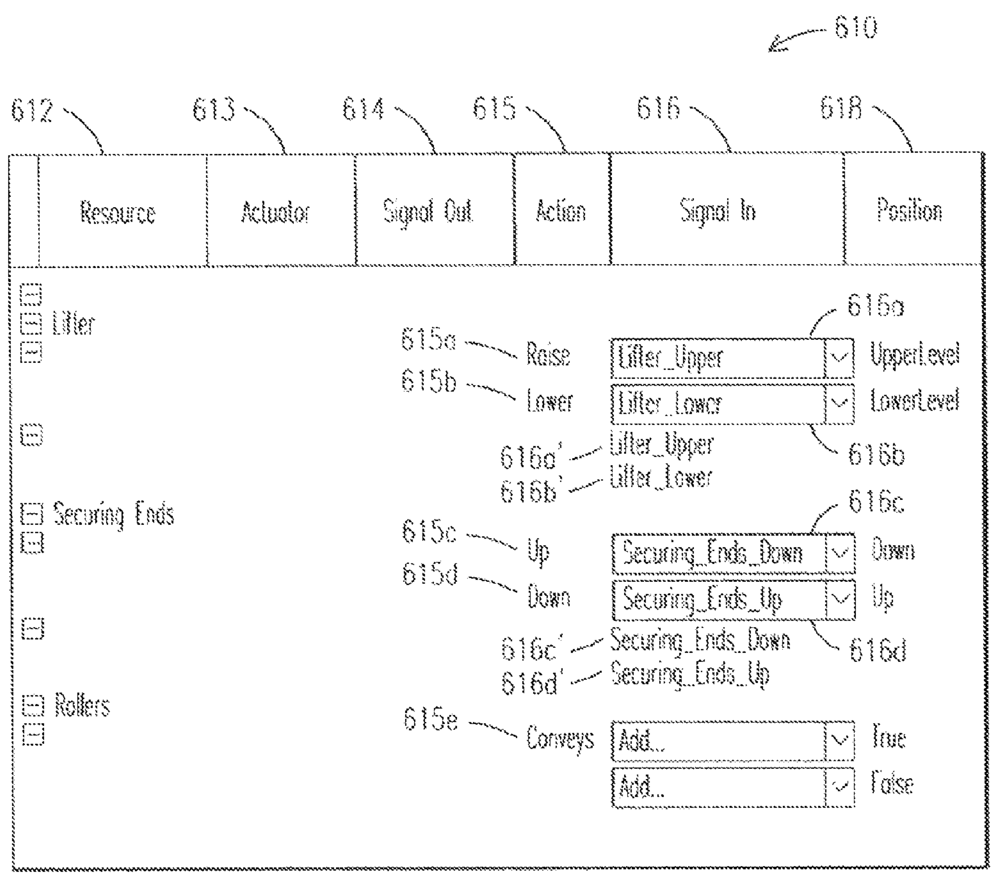

Referring to FIG. 6B, the table view 610 contains modeling data arranged in a tabular format. The modeling data may include resource 612, actuator 613, signal out 614, action 615, signal in 616, and position 618. In the exemplary illustration of FIG. 6B, the table view 610 includes the modeling data from the table view 410 of the mechanical model 400. For example, the actions 615(*a*), 615(*b*), 615(*c*) 615(*d*) and 615(*e*) correspond to the actions 415(*a*), 415(*b*), 415(*c*) 415 (*d*) and 415(*e*) respectively. It would be understood that modeling data altered in the table view 610 of the electrical model 600 may then be part of the table view 410 in the mechanical model 400. However, one skilled in the art would recognize that some modeling data may only apply to the mechanical view 400 and not the electrical view 600 and vice versa. Thus, it may be necessary and/or desirable that the table view 410 of the mechanical model 400 differ from the table view 610 of the electrical model 600.

The signal in 616 refers to an input signal to be delivered to the PLC. The input signal may be generated from a device such as a sensor. For example, a light barrier sensor may be used to detect if a resource has reached its end position. An input signal is associated with a resource 612. In the exemplary illustration of FIG. 6B, signal in 616(*a*) and signal in 616(*b*) are associated to the lifting apparatus and signal in 616(*c*) and signal in 616(*d*) are associated to the securing ends. It would be understood by those skilled in the art that a resource does not require an input signal. For example, in the exemplary embodiment, the rollers do not include a signal in 616.

Signal in 616(*a*'), 616(*b*'), 616(*c*') and 616(*d*') may be used as an additional representation or an alternative representation of signal in 616(*a*), 616(*b*), 616(*d*) and 616(*e*) respectively. In the exemplary illustration of FIG. 6B, signals 616(*a*')-616(*d*') are used in conjunction with the visual representation of the signal in the sequence view 620 of the electrical operation.

Figure 6D:
Figure 6C:
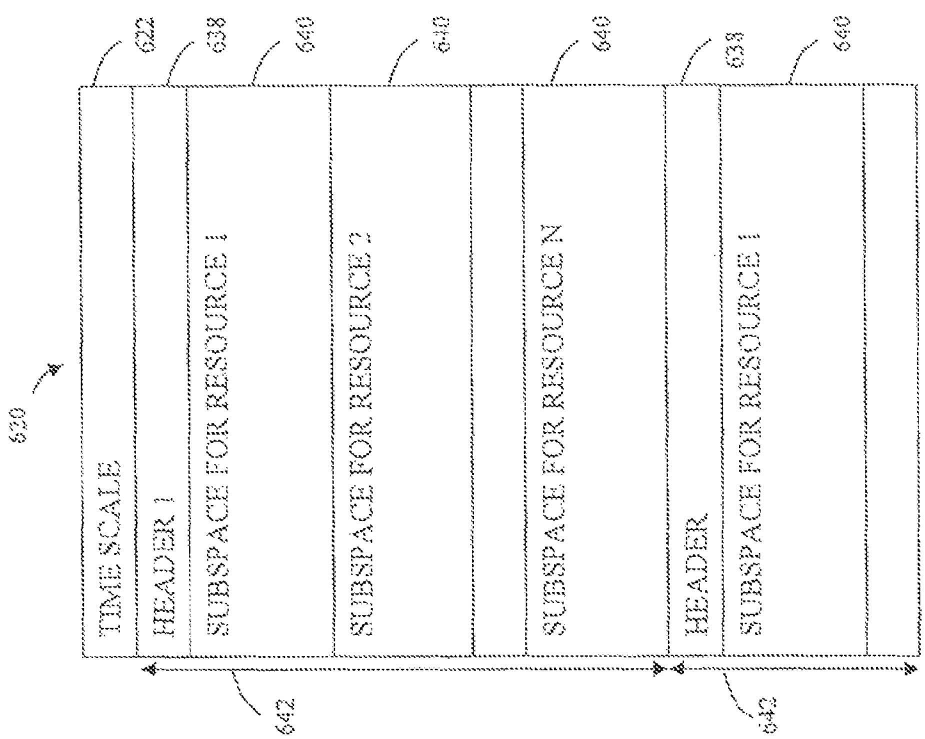

FIG. 6C illustrates an exemplary sequence view 620 of the electrical operation. As illustrated in FIG. 6C, the sequence view 620 of the electrical operation, may be divided include a timescale 622 and at least on sequence description 642. Each sequence description 642 uses the single time scale 622.

Each sequence description 642 includes one or more subspaces 640. Each subspace describes electrical information for a resource. Furthermore, a sequence description 642 may include a sequence description header 638. Preferably the sequence header is numeric text but any delineation may be used. The sequence descriptions are described below in more detail.

FIG. 6D illustrates an exemplary subspace 640. Referring to FIG. 6D, the subspace 640, may include a mechanical region 642 and may include an electrical region 646. The mechanical region 642 includes a subregion 624 for defining the mechanical positions of the resource as positions on a vertical axis and a subregion 544 for depicting the sequences information of the operation for the resource. The electrical region 646 includes a subregion 647 for defining the electrical signals of the resource as locations on a vertical axis, and a subregion 648 for depicting the signal information for the resource.

Figure 6E:
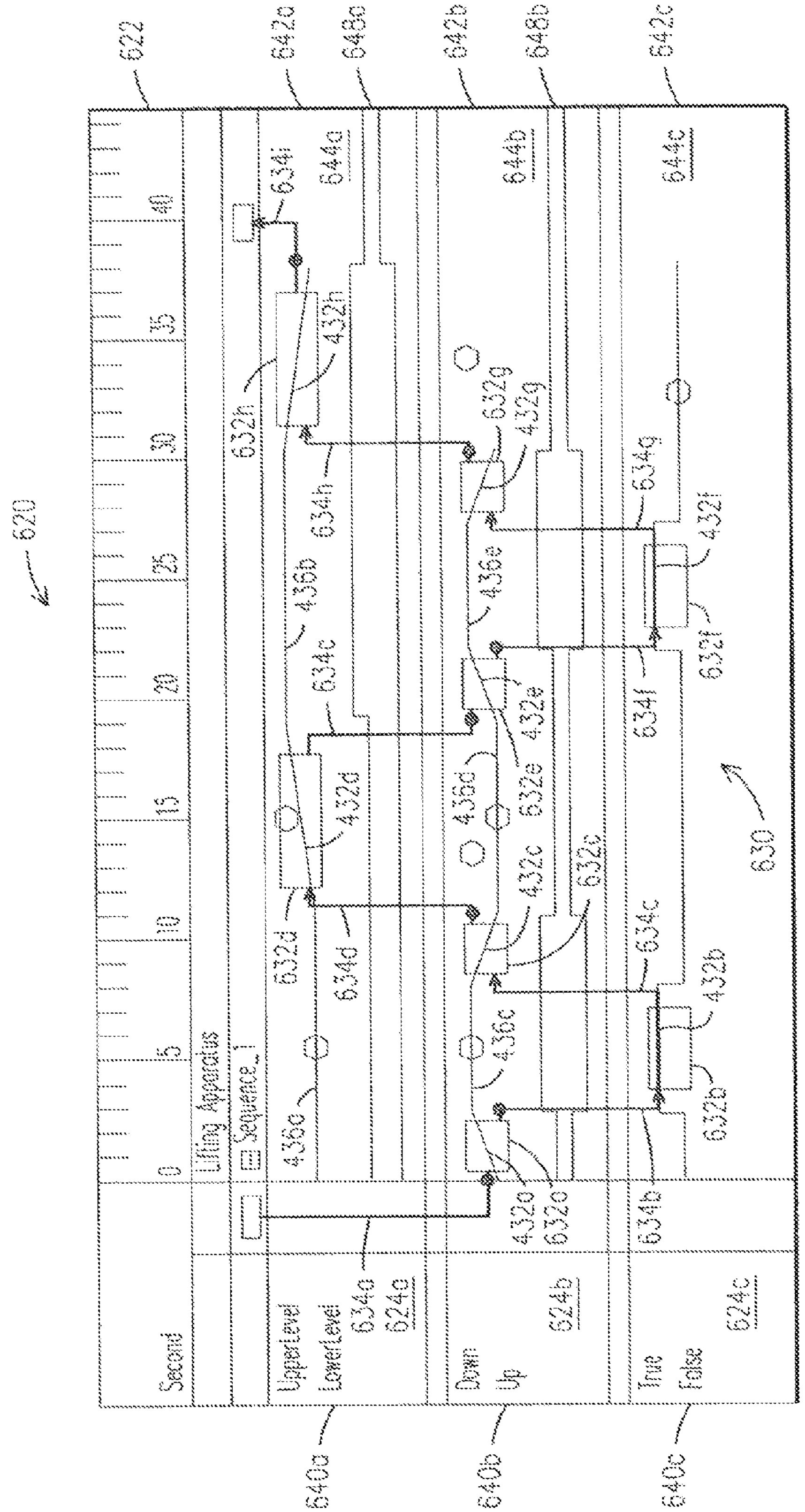

FIG. 6E illustrates the exemplary sequence view 620 of the electrical operation in more detail. FIG. 6E describes the sequence view 620 of the electrical operation which corresponds to the mechanical model described in FIG. 4. The sequence view 620, as shown in FIG. 6E, includes the time scale 622 positions 624 and graphical view 630. In the exemplary embodiment the positions 624 at least includes the positions 424 defined in the mechanical model 300.

The graphical view 630 visually illustrates the electrical sequence flow of the electrical operation. The electrical sequence flow includes electrical elements such as electrical steps 632 and electrical transitions 634. Changing from one electrical step 632 to another electrical step 632 is called an electrical transition 634. An electrical transition defines a dependency between the movement of a device and the state of an input signal and/or and output signal. The electrical transition visually connects the electrical step 632 being transitioned from, to the electrical step 632 being transitioned to.

As illustrated, an electrical step 632 may have a corresponding mechanical step 432. Likewise, an electrical transition 634 may have a corresponding mechanical transition 434.

In a preferred embodiment, the electrical sequence flow of the electrical model is automatically generated from the mechanical model. In the simple case, preferably an electrical step is automatically created for each mechanical step and an electrical transition is created based on each mechanical transition. In the case of more complex models, such as using proxy steps, split and merge as described below, the generation of the electrical sequence flow may be more complex.

An electrical step 632 may have various attributes assigned to it. For example a waiting time and a watchdog time and an error state time. In one embodiment the waiting time and watchdog time are automatically generated, preferably using the time value of an associated mechanical step 432.

The waiting time is defined as the minimum amount of time the electrical step 632 must take, regardless of how long the mechanical step 432 actually takes to execute. For example, if the mechanical step 432 completed in less time than the waiting time, a transition to the next mechanical step 432 could not be triggered until the end of the waiting time. In contrast, the watchdog time is defined as the maximum amount of time the mechanical step 432 can take before transitioning to an error state. Therefore, the watchdog time must be at least the amount of time corresponding to the mechanical step otherwise a transition to the error state will always occur. The waiting time and watchdog time are discussed in more detail below in regards to monitoring via the visual model.

The electrical sequence flow may be altered by a designer. In the exemplary embodiment, the mechanical sequence flow of electrical operation is superimposed over the mechanical sequence flow of the mechanical operation. As such, the mechanical steps 432 and mechanical waiting periods 436 are shown in the subregion 644 for depicting the sequences information. The superimposing allows the designer to visualize both the electrical sequence flow of the electrical operation and the mechanical operation simultaneously which may make it easier for the designer to make necessary alterations to the electrical model 600. One skilled in the art would recognize that the electrical sequence flow of the electrical operation may be displayed without being superimposed over the mechanical sequence flow of the mechanical operation.

Figure 6F:
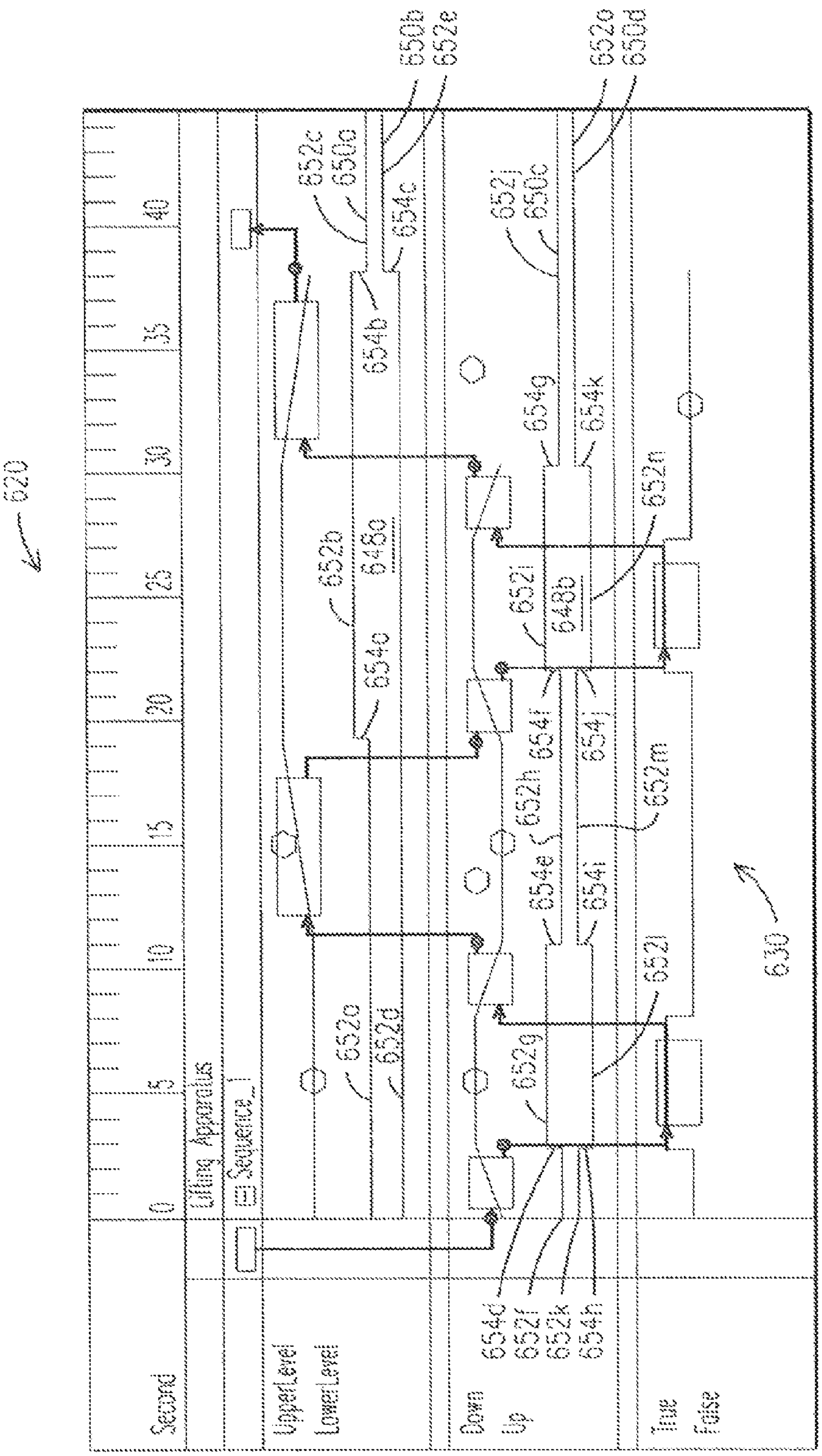

FIG. 6F describes further details of the electrical sequence flow of the electrical operation in which each signal in 616 from FIG. 6B is displayed graphically as a signal line 650. Each signal line 650 is graphically displayed in the subregion 648 for depicting the signal information.

A signal line 650 may include states 652 and state transitions 654. A state transition 654 indicates where a state of the pulse changes to another state. For example, the signal line may include state transition 654 from a low state 652(*a*) to a high state 652(*b*). One skilled in the art would recognize that exemplary illustration of the low state being visually lower in a vertical direction than the high state is merely a representation and the visualization may be reversed such that the high state is visually lower or the states may be represented in directions other than horizontal.

In one embodiment, the signal line 650 is automatically generated. In another embodiment the signal line 650 is input by the designer. In either case, it is preferable if the signal line 650 may be altered by the designer. The altering of the signal line 650 includes altering the states and/or state transitions of the signal line.

The signal line 650(*a*) corresponds to the lifter_upper signal in 616(*a*') of the lifting apparatus in FIG. 6B. Signal line 650(*a*), which is provided by a sensor, includes a state transition 654(*a*) from "low" state 652(*a*) to "high" state 652(*b*) which occurs after the sensor detects that the lifting apparatus is moved from the lower level to the upper level. Signal line 650(*a*) further includes a state transition 654(*b*) from high state 652(*b*) to low state 652(*c*) which occurs after the sensor detects that the lifting apparatus is moved from the higher level to the lower level.

The signal line 650(*b*) corresponds to the lifter lower signal in 616(*b*') of the lifting apparatus in FIG. 6B. Signal line 650(*b*), which is provided by a sensor, includes a state transition 654(*c*) from low state 652(*d*) to high state 652(*e*) which occurs after a sensor detects that the lifting apparatus is moved from the higher level to the lower level.

The signal line 650(*c*) corresponds to the securing_ends_ down signal in 616(*c*') of the lifting apparatus in FIG. 6B. Signal line 650(*c*) includes state transition 654(*d*), 654(*f*) from low state 652(*f*), 652(*h*) to high state 652(*g*), 652(*i*). The state transition 654(*d*), 652(*f*) occurs after the securing ends are moved from the up position to the down position. Signal line 650 (*c*) includes state transition 654(*e*), 654(*g*) from high state 652(*g*), 652(*i*) to low state 652(*h*), 652(*j*). The state transition 654(*e*), 654(*g*) occurs after the securing ends are moved from the down position to the up position.

The signal line 650(*d*) corresponds to the securing_ ends_ up signal 616 in (*d*') of the lifting apparatus in FIG. 6B. Signal line 650 (*d*) includes state transition 654(*h*), 654(*j*) from high state 652(*k*), 652(*m*) to low state 652(*l*), 652(*n*). The state transition 654(*h*), 654(*j*) occurs after the securing ends are moved from the up position to the down position. Signal line 650(*d*) includes state transition 654(*i*), 654(*k*) from low state 652(*l*), 652(*n*) to high state 652(*m*), 652(*o*). The state transition 654(*i*), 652(*k*) occurs after the securing ends are moved from the down position to the up position.

It would be understood that the specific input signals above are merely illustrative for the lifting apparatus. In some cases, a single input signal could replace multiple input signals or that more input, signals may be required.

Figure 6G:
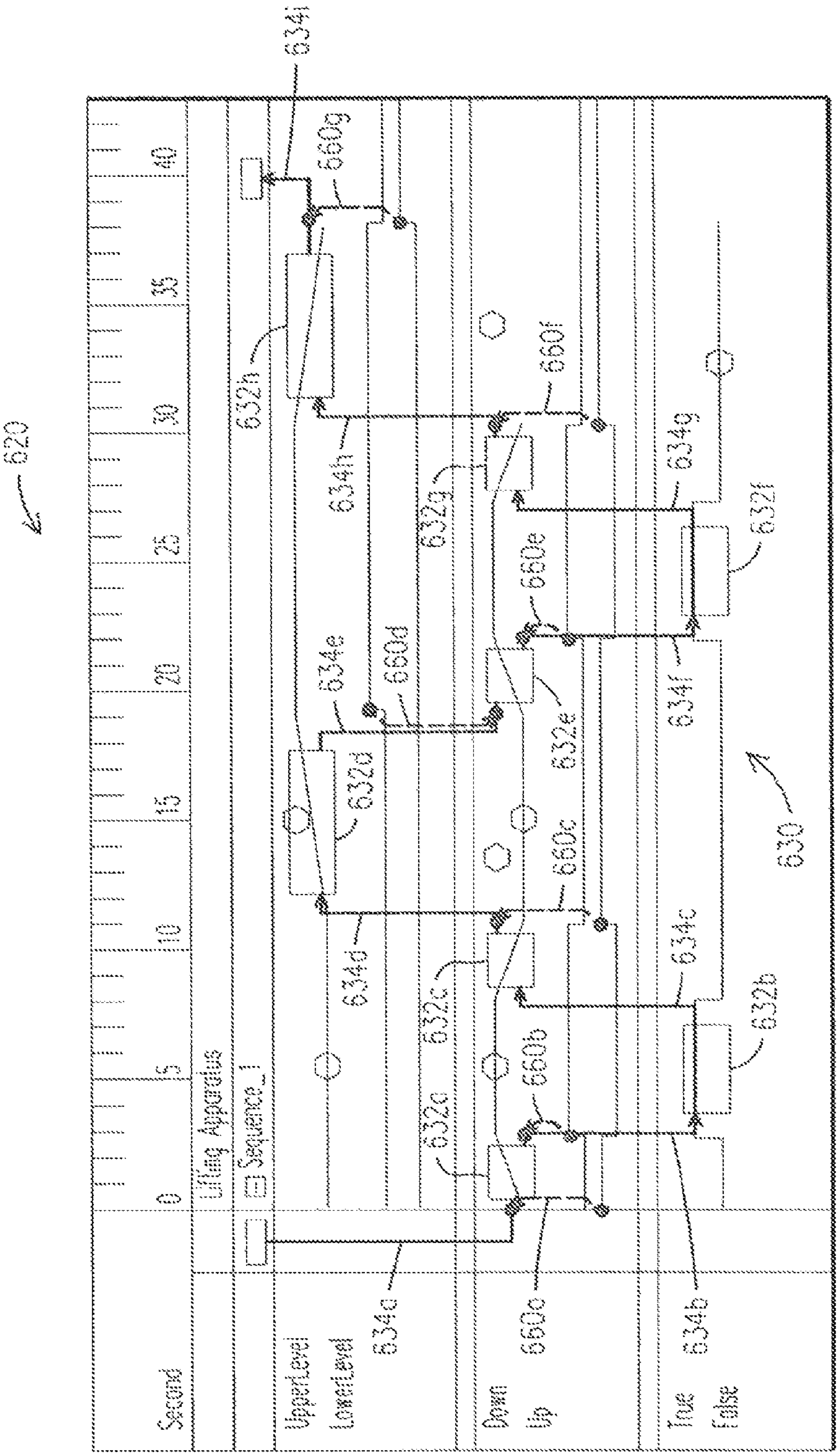

FIG. 6G illustrates other details of the electrical sequence flow. In some case one or more conditions must be net in order for an electrical transition 634 to occur. A condition is the logical state of an associated input signal or output signal. The condition 660 may be included before or after an electrical step 632. If the condition 660 is included prior to the electrical step, then the condition 660 must be met in order to transition to the electrical step 632. Likewise, if the condition 660 is included after the electrical step, then the condition must be met in order to transition from the electrical step 634. The condition 660 is based on one or more input signals.

In the exemplary illustration of FIG. 6G, for the electrical transition 634(*a*) to occur condition 660(*a*) must be met. The condition 660(*a*) is visually coupled to the high state of signal line 650(*d*). The high state of the signal line 650(*d*) occurs when a sensor of the securing ends detects that the securing ends are in the up position. Thus, in order for the electrical transition 634(*a*) to occur, a sensor of the securing ends must detect that the securing ends are in the up position. The electrical step 632(*a*) is complete after the condition 660(*b*) is met. Condition 660(*b*), which is visually coupled to the high state of signal line 650(*c*), is met when a sensor of the securing ends detects that the securing ends are in the down position. After the condition 660(*b*) is met, the electrical transition 634(*b*) occurs in order to transition to electrical step 632(*b*).

Figure 6H:
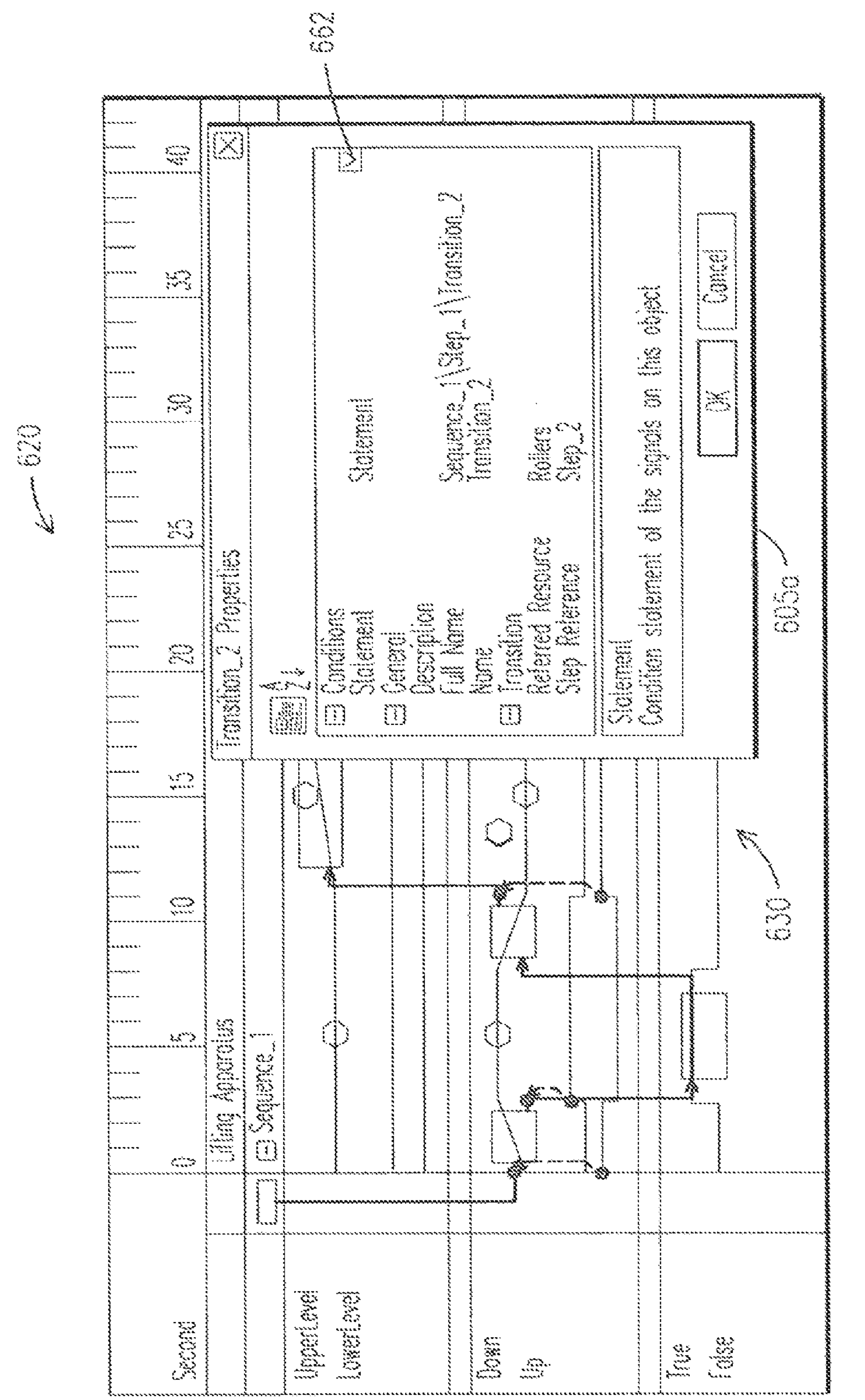

Conditions 660 may be altered by the designer. For example, a new condition may be added by way of altering a statement for the electrical transition 634. The designer may identify the electrical transition 634(*b*) to be altered to include the new condition by placing the mouse cursor on the electrical transition 634(*b*) and clicking the mouse. FIG. 6H illustrates a GUI tool 605(*a*) to alter the statement for electrical transition 634(*b*). GUI tool 605(*a*) illustrates a drop down 662 that may be identified to alter the statement.

Figure 6I:
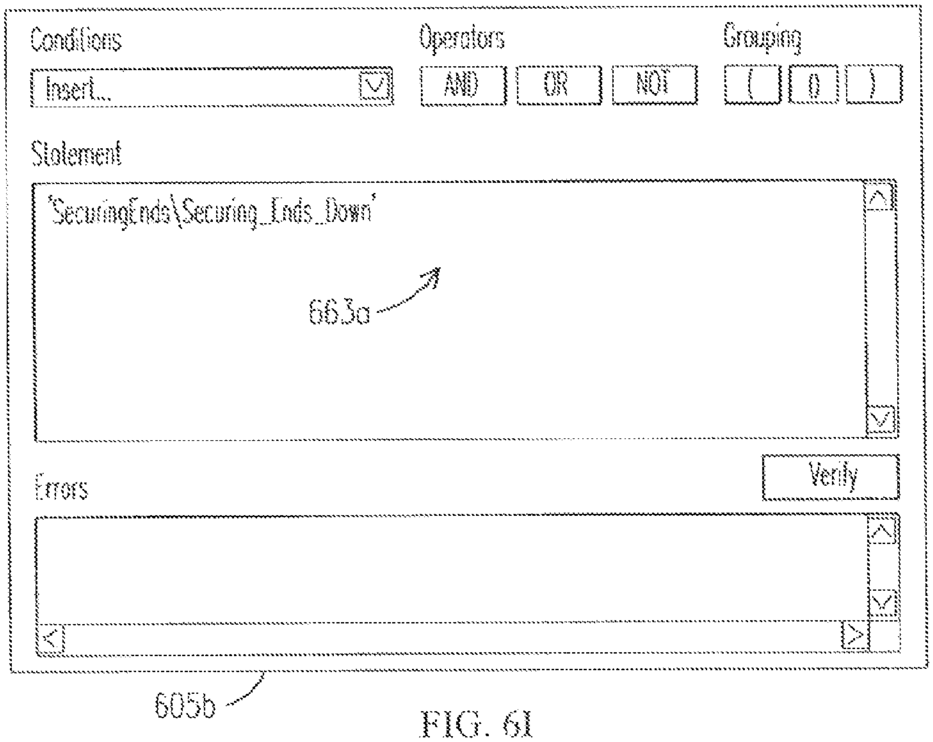

FIG. 6I illustrates a further GUI tool 605(*b*) that includes the statement 663(*a*) of the electrical transition 634(*b*). As shown by FIG. 6I, the transition occurs if the single condition 660(*b*) is met based which indicates that the securing ends are in the down position.

Figure 6J:
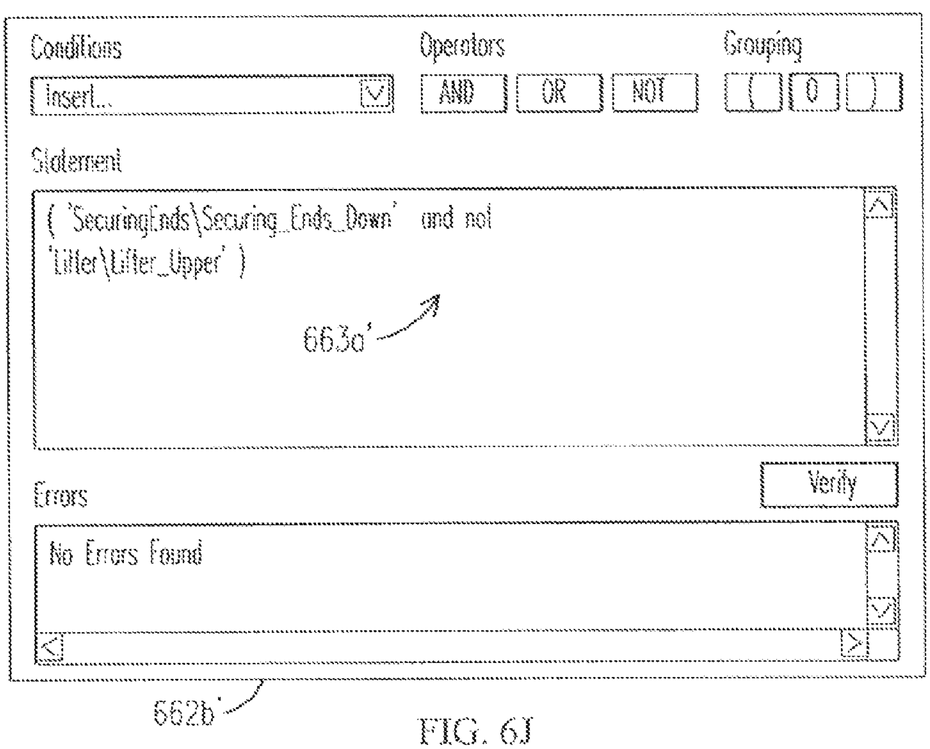

FIG. 6J shows an exemplary alteration of the statement 663(*a*) of the electrical transition 634(*b*) as illustrated in FIG. 6I into statement 663(*a*') of the altered electrical transition 634(*b*'). The altered electrical transition 660(*b*') shows that transition is based on multiple signal lines. The transition occurs when the condition 660(*b*) which indicates the securing ends are in the down position and the condition 660(*h*) which indicates the lifter is not in the upper position are both met.

Figure 6K:
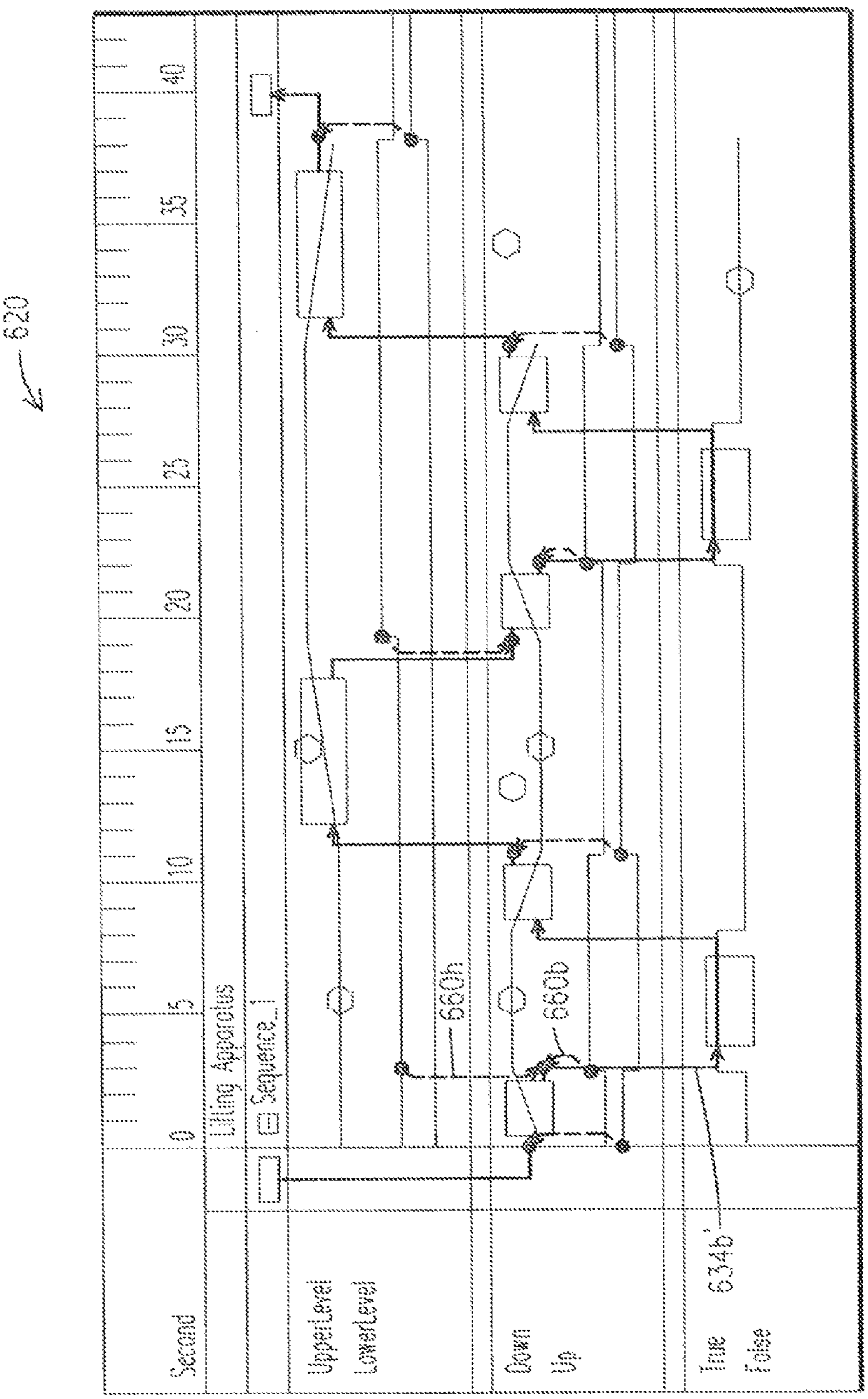

FIG. 6K illustrates graphically how the altered electrical transition 660(*b*') is based on the multiple conditions 660(*b*) and 660(*h*).

Although the alteration of electrical transition 634(*b*) was described in terms of a particular GUI tool 605(*a*) and 605(*b*), one skilled in the art would recognize that electrical transition 634(*b*) could be altered using different GUI tools 605 or other means. For example, the designer could "draw" the new part of the condition. The drawing may be by achieved via a touch screen or by placing the mouse cursor on the signal line corresponding to the state for the condition and clicking the mouse and also placing the mouse cursor on the transition and clicking the mouse.

Referring back to FIG. 6B, the signal out 614 describes an output signal produced by the PLC. The signal out 614 may be delivered to a device such as an actuator 613. The device may then be used to actuate a resource of the automation system. The output signal is associated with a resource 612. It would be understood by those skilled a resource does not require a signal out 614.

Figure 7A:
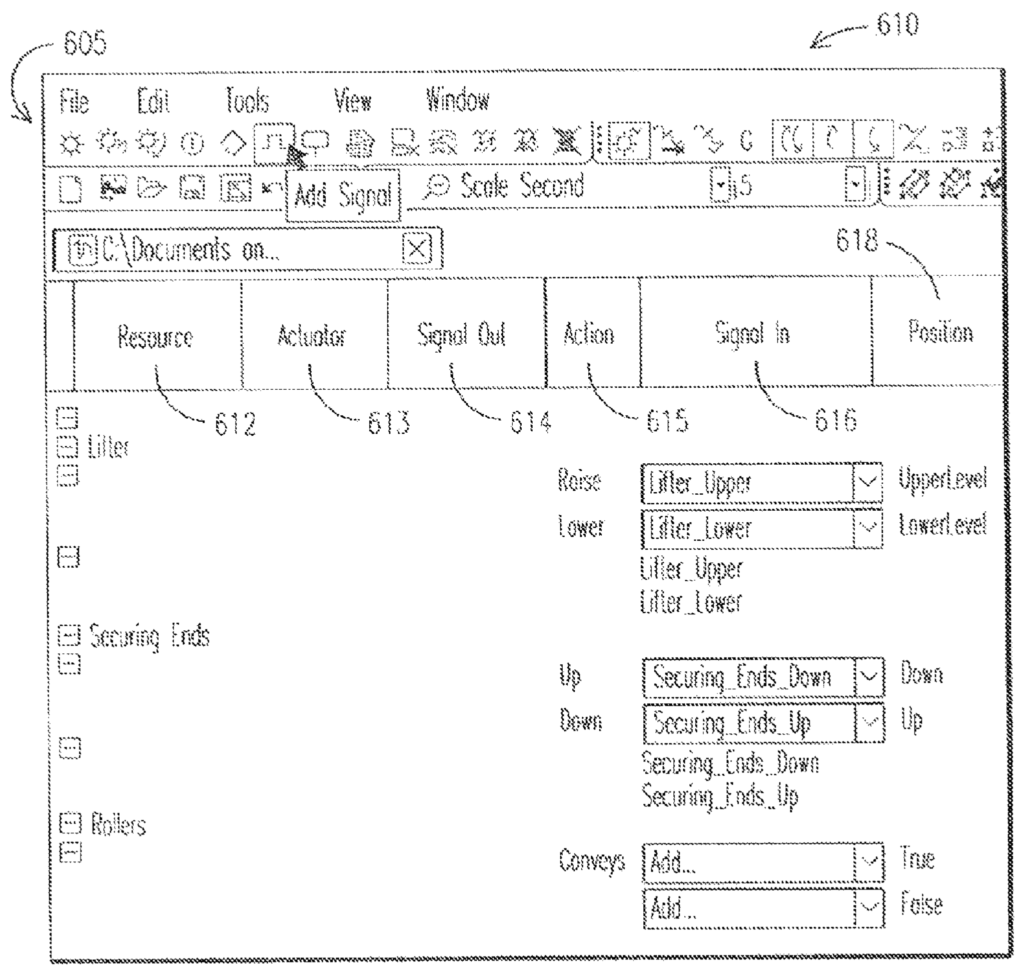
FIGS. 7A-7J illustrates an exemplary modeling of output signals and actuator in accordance with the present disclosure.

FIG. 7A illustrates a display of an exemplary table view 610 of the electrical model 600 in which a signal out 614 has not been added. In order to add the signal out 614, a designer may use a user interface such as the GUI tools 605.

Figure 7B:
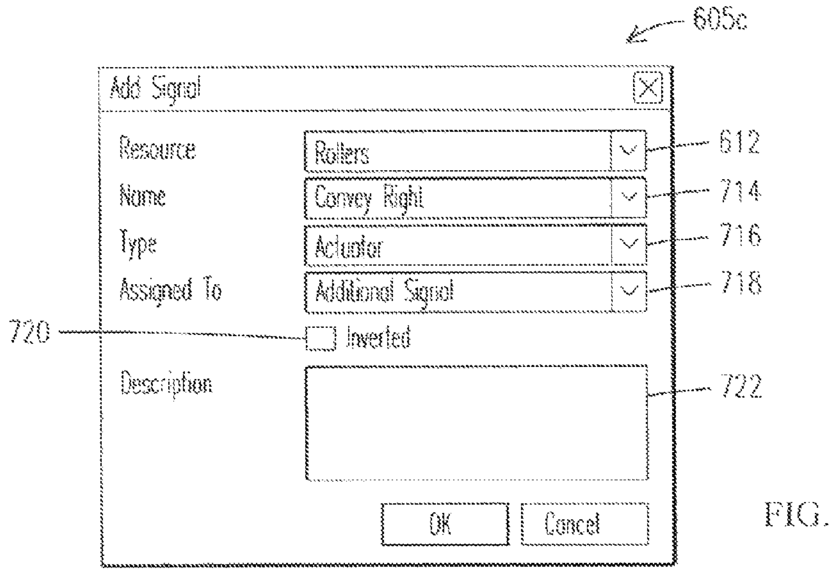

The signal may include attributes which are preferably alterable by the designer. FIG. 7B illustrates a display of an exemplary GUI tool 605(*c*) in which the designer may alter attributes for the signal. For example, the designer may specify the resource 612 that the signal is associated with, a symbolic address name 714, a signal type 716, assigned to information 718, inverted 720, and description information 722. In the illustrated embodiment, a single GUI tool 605(*c*) is provided which facilitates altering a signal in 616 and a signal out 614. However, one skilled in the art would recognize that separate GUI tools 605 may be used.

The symbolic address name 714 is a name that the designer may assign to the signal. The symbolic address name 714 is associated to a physical address in order to deliver the signal. The association may be provided via a symbolic, list file. The designer may alter the symbolic list file to alter an association and/or physical address.

The signal type 716 indicates if the signal is an input signal or an output signal. In the exemplary illustration the type "actuator" is used for an output signal and the type "sensor" is used for an input signal. The assigned to information 718 indicates if the signal is assigned to a position of the resource 612. A signal line 650 associated with the signal may be altered with the inverted 720 attribute as described in more detail below. The description 722 field may be altered to include a text description of the sensor.

Figure 7C:
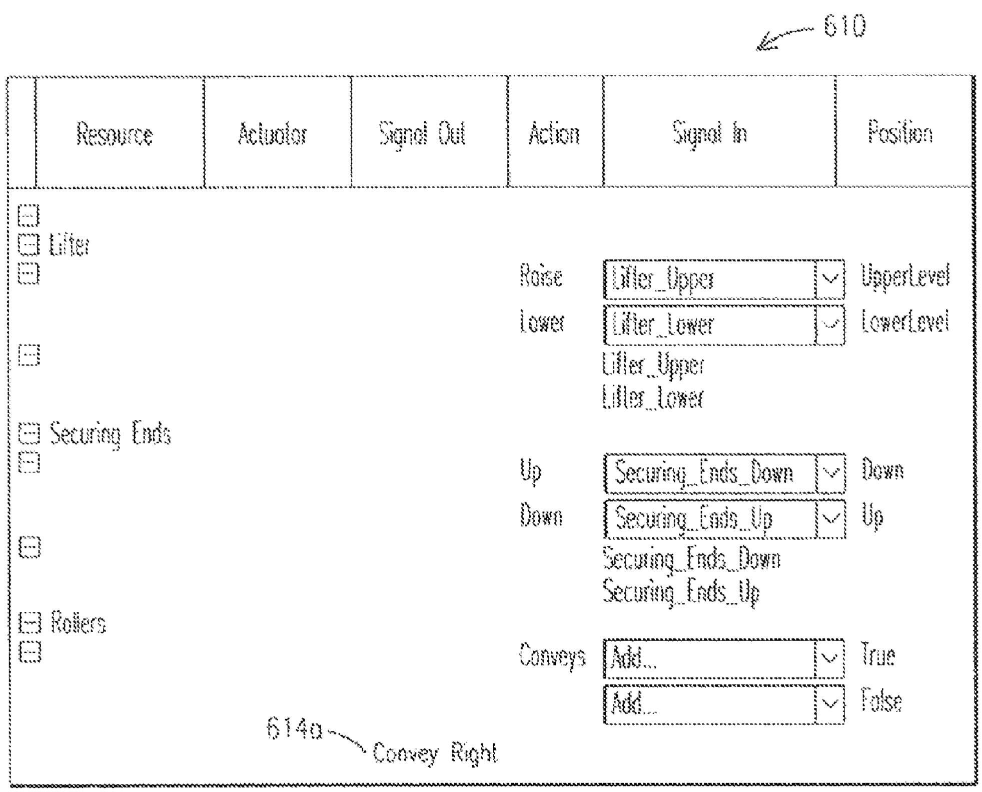
Figure 7D:
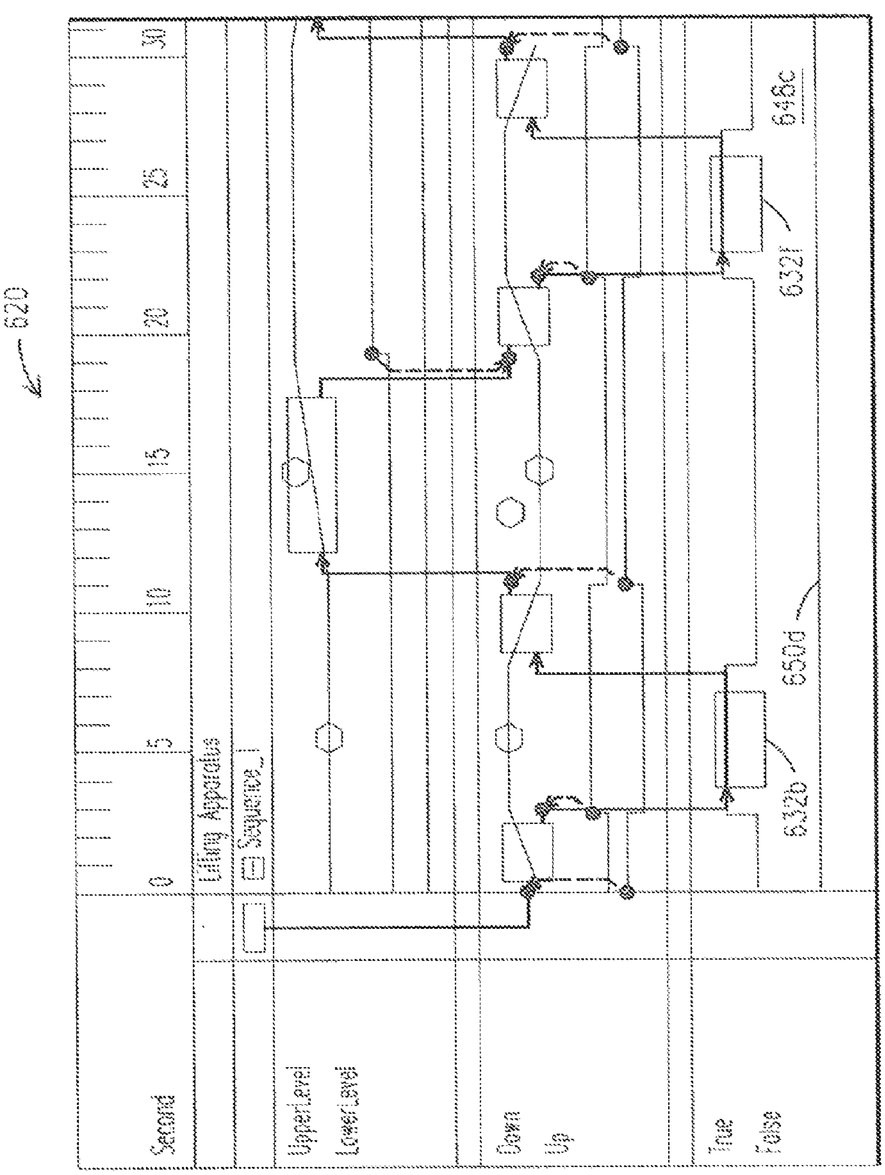

FIG. 7C illustrates a display of an exemplary table view 610 showing that signal out 614(*a*) is added with the symbolic name "Convey Right" for the roller resource. FIG. 7D illustrates the sequence view 620 with a signal line 650(*d*) that is associated with the signal out 614(*a*). Signal line 650(*d*) is displayed in the subregion 648(*c*) and is used to convey a parcel in the right direction. Preferably the signal line 650(*d*) is automatically generated and displayed after the signal out 614 is added. The illustrated signal line 650(*d*) is in a continuous low state. The inverted 720 attribute would invert the signal line 650(*d*) to a continuous high state.

In order to define the output signal behavior, an electrical step must be identified as well as a signal line of an output signal. The electrical step may be identified via an input interface by designer placing the mouse cursor on electrical step 632(*b*) and clicking the mouse to identify electrical step 632(*b*). The signal line 650(*d*) may be likewise identified. After the electrical step 632(*b*) and the signal line 650(*d*) are identified they are coupled together to define the output signal behavior. It would be understood by those skilled in the art that an electrical step may be coupled to multiple signal lines.

Figure 7E:
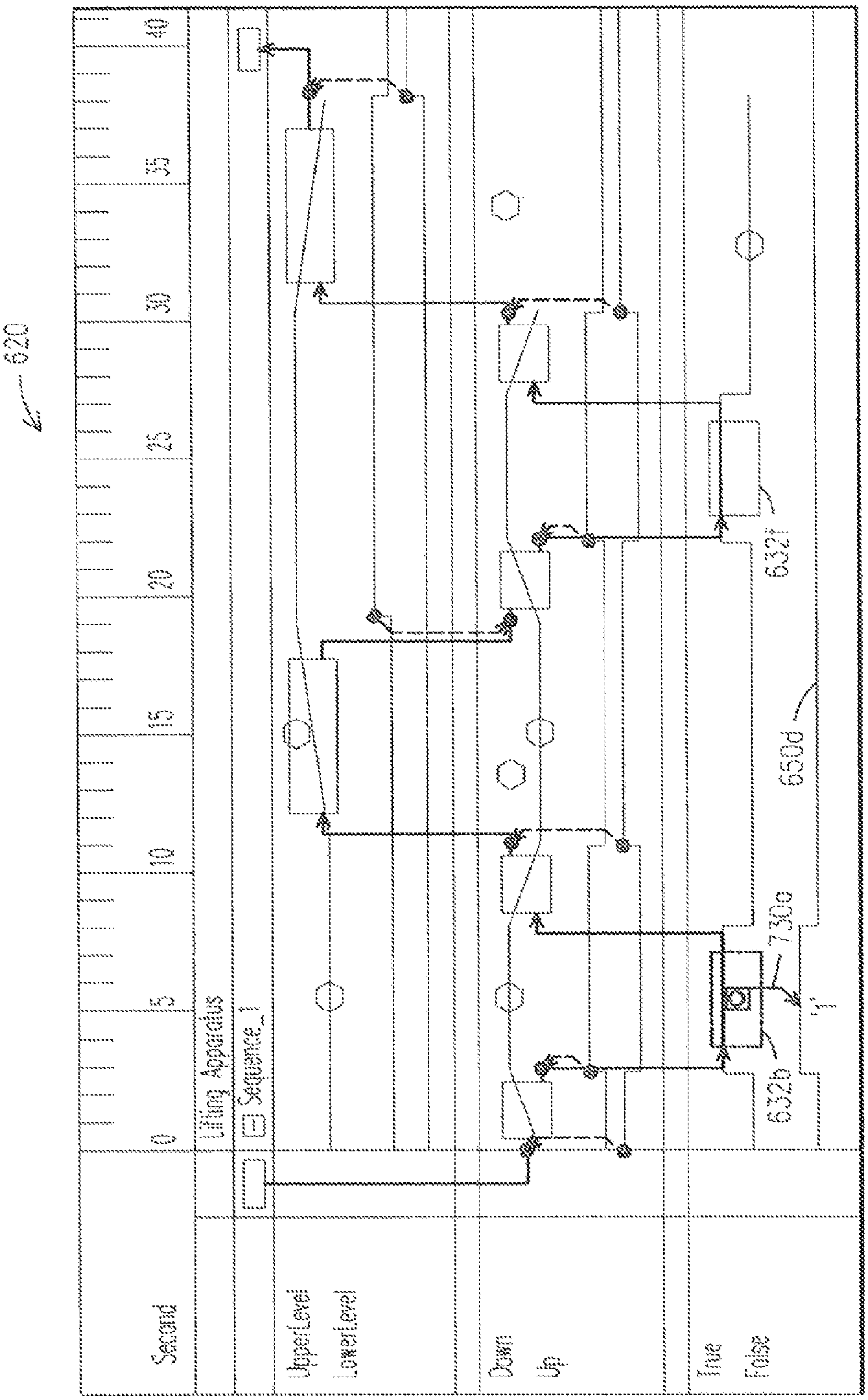

FIG. 7E is an exemplary display of the sequence view 620 with the electrical step 632(*b*) and the signal line 650(*d*) being visually coupled together via a line 730(*a*). The signal line is set to the high state from the low state at the beginning of the electrical step 632(*b*) and then is reset at the end of the electrical step 632(*b*).

Figure 7F:
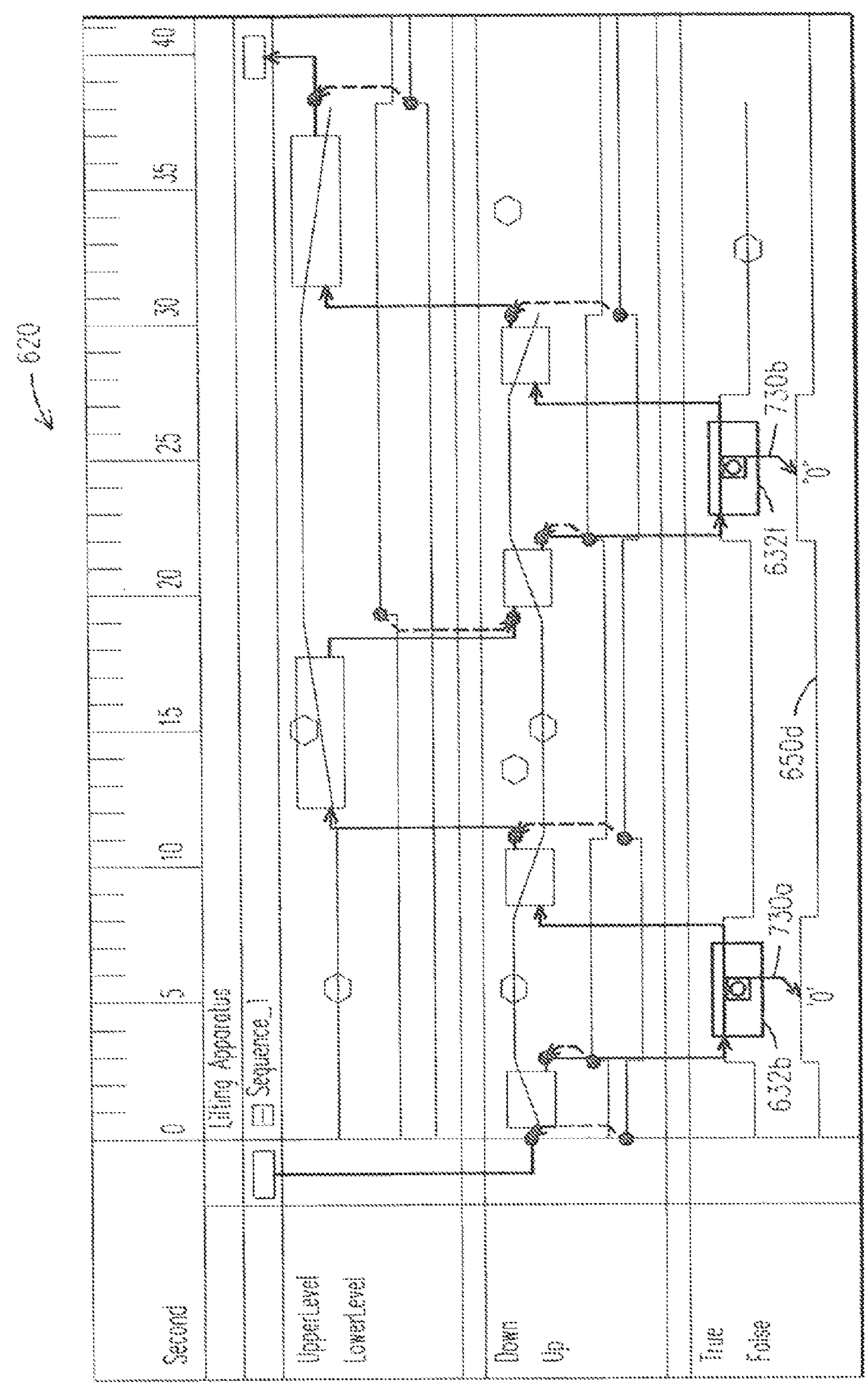

FIG. 7F is a further exemplary display of the sequence view 620 showing electrical 632(*f*) also being visually coupled to signal line 650(*d*) via line 730(*b*). In addition, FIG. 7F shows that the signal line 650(*d*) is inverted.

Figure 7G:
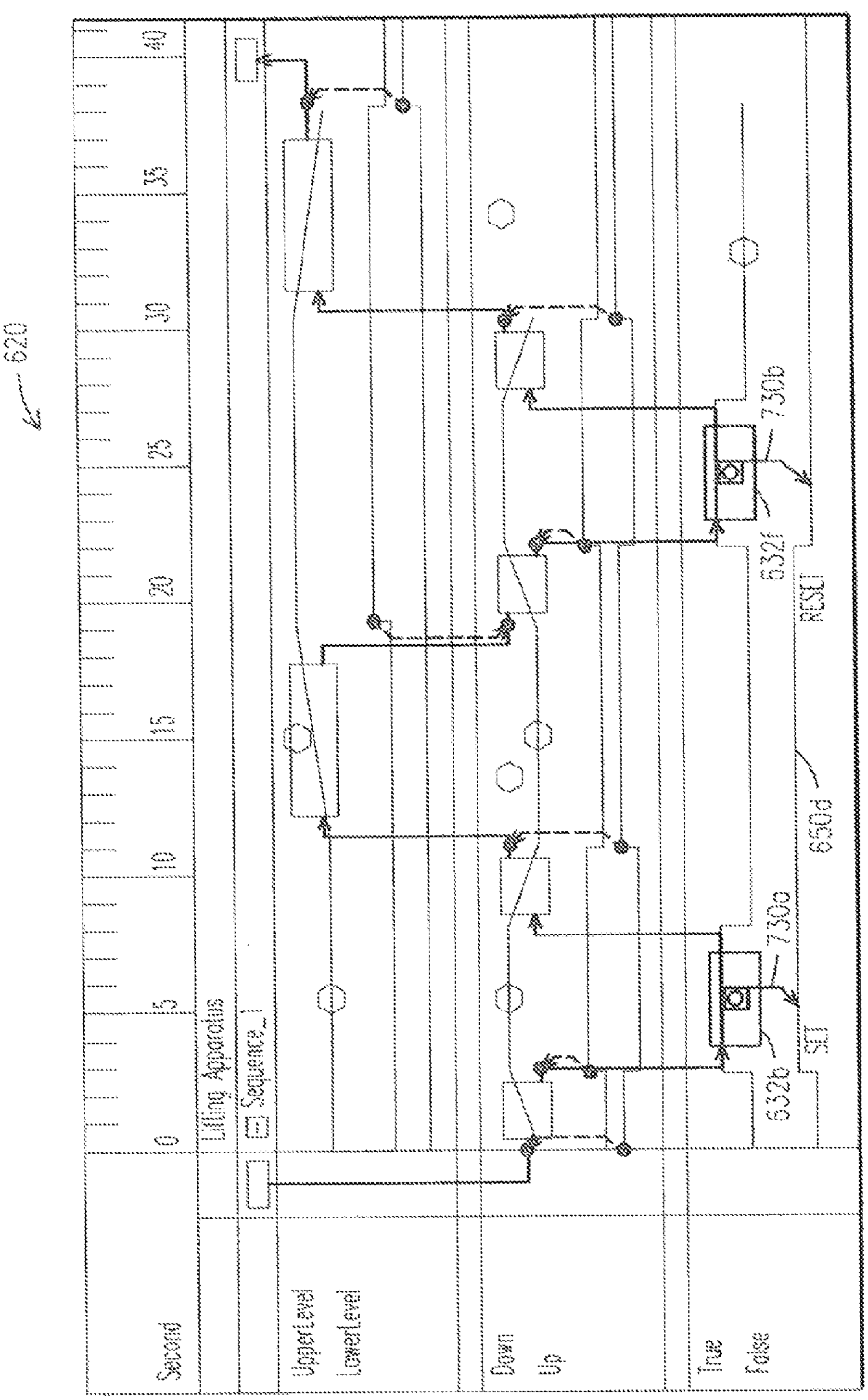
Figure 7H:
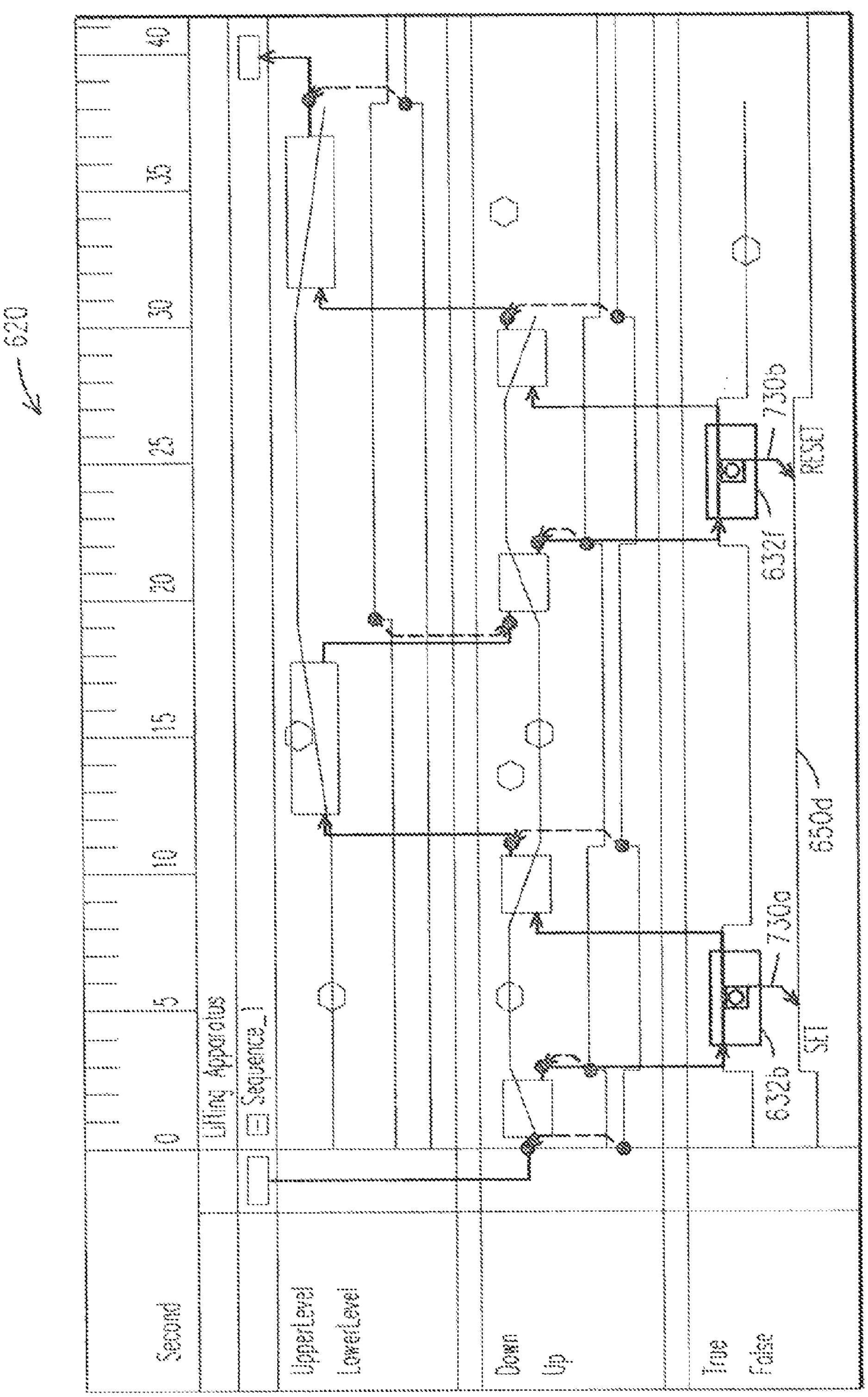

The designer may alter the signal line 650 to be "set" or "reset" via a user interface. FIG. 7G illustrates that the signal line 650(*d*) may be set at the beginning of an electrical step 632(*b*) and reset at the beginning of a different electrical step 632(*f*). FIG. 7H illustrates that the signal line 650(*d*) may be set at the beginning of an electrical step 632(*b*) and reset at the end of a different electrical step 632(*f*). One skilled in the art would recognize that the of setting and resetting the signal line 650(*d*) has other possibilities, for example, the signal line 650(*d*) might be set at the end of an electrical step 632.

It would be understood by those skilled in the art that an electrical step 632 may be coupled to multiple signal lines. As described above electrical step 632 facilitates output signals to be produced and/or input signals to be received.

FIGS. 7A-7H illustrated an output signal without specifying a specific device, such as an actuator, in which the output signal is associated. An actuator 613 may be added using a GUI tool 605 similar to that of FIG. 7A. Also similar to the signal, the actuator may include attributes which are preferably alterable by the designer.

Figure 7I:
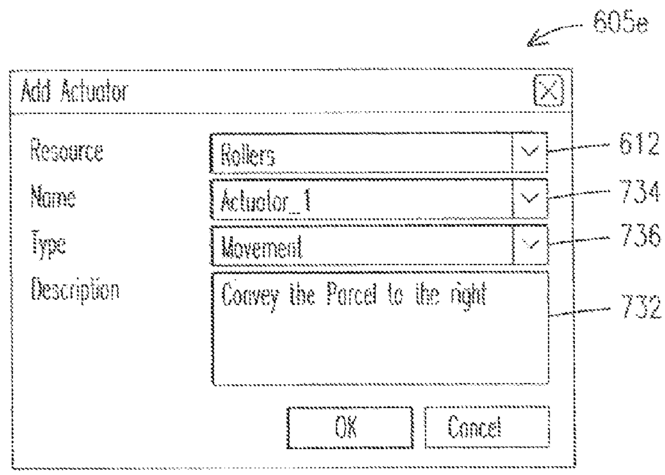

FIG. 7I illustrates a display of an exemplary GUI tool 605(*e*) in which the designer may alter attributes for the actuator. For example, the designer may specify the resource 612 that the actuator is associated with, a name 734, and actuator type 736, and description information 732. It would be understood that other attributes may be applicable such as the output signal.

Similar to the output signal, the actuator name 734 may be associated to a physical address in which the association may be provided via an alterable symbolic list file. However, the actuator name 734 may just provide a reference for the designer in order to associate the actuator with the output signal.

In the exemplary illustration the actuator type 736 "movement" is used to indicate the actuator facilitates a movement of the associated resource 612. The description 732 field may be altered to include a text description of the sensor.

Figure 7J:
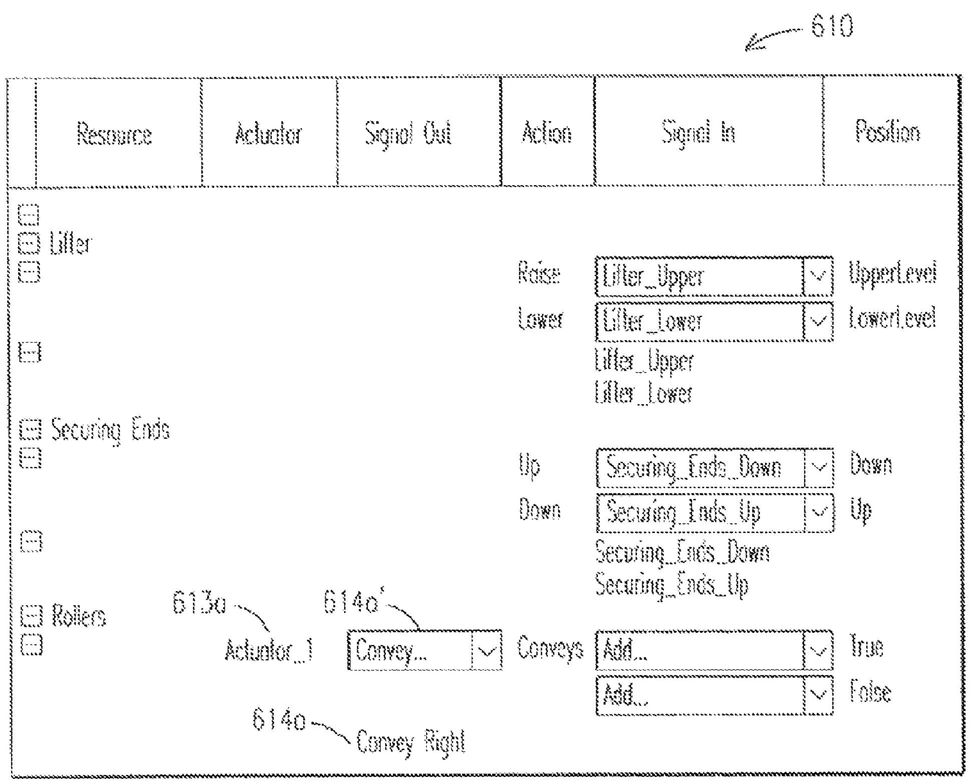

FIG. 7J illustrates a display of an exemplary table view 610 of the electrical model in which an actuator 613(*a*) has been added with a name Actuator_1. The actuator 613(*a*) is associated to signal out 614(*a*') is associated with a designer may use a user interface such as the GUI tools 605.

Proxy Step

Each of the electrical steps 632 described above corresponded to a mechanical step. However, it may be desirable in the modeling to define an electrical step not related to a mechanical step. An electrical step not related to a mechanical step is referred to as a proxy step. The proxy step may be executed in parallel to other electrical steps.

FIGS. 8A-8G are used to describe proxy steps an electrical model of a simplified automation system. The exemplary electrical model of FIGS. 8A-8G are superimposed over a mechanical sequence flow of the mechanical operation.

Figure 8A:
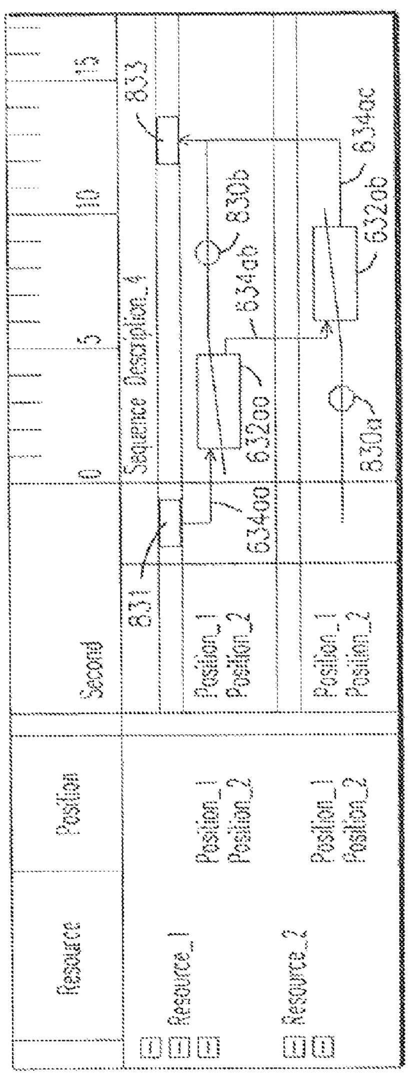
FIGS. 8A-8J illustrates exemplary modeling of proxy steps in the electrical model in accordance with the present disclosure.

FIG. 8A illustration an exemplary electrical model showing possible insertion points for a proxy step. Valid positions for each possible proxy step for the electrical model are determined. Positions for proxy steps may be located, relative to the time scale where waiting periods occur in the mechanical model. The illustrated display of the electrical model includes an icon 830 for each valid position where a proxy step may be inserted. Icon 830(*a*) occurs at a waiting period for resource 2 and icon 830(*b*) occurs at a waiting period for Resource_1. FIG. 8A also illustrates a global start step 831 and a global end step 832. The global start step 831 is the starting point of the operation of the automation system. Like wise, the global end step 832 is the ending point of the operation of the automation system. It would be understood that once the global end step 832 is reached that the operation would resume from the global start step 831.

Figure 8B:
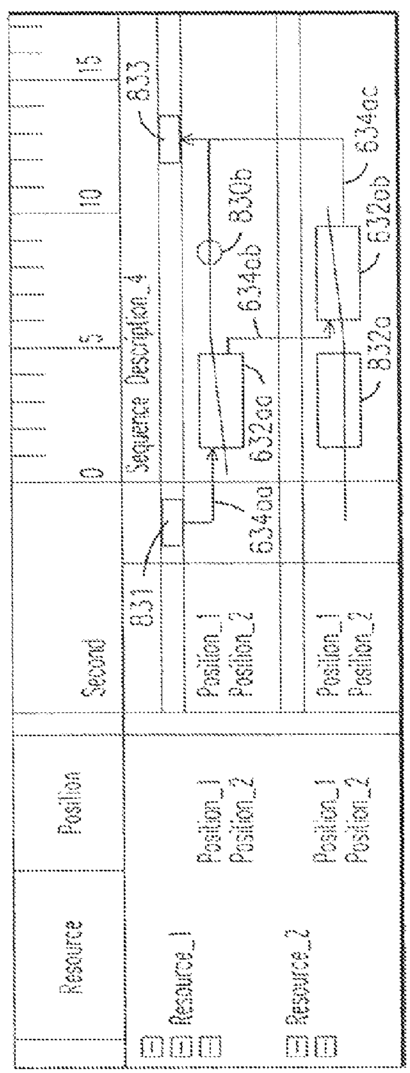

FIG. 8B illustrates an exemplary electrical model with a newly inserted proxy step 830. The designer may identify one of the valid positions for the proxy step to be inserted using a user interface. For example, the designer may place the mouse cursor on the icon 830(*a*) and click the mouse. A new proxy step 832(*a*) is inserted at the position of icon 830(*a*) and the icon 830(*a*) is removed from the display. Thus, the icon 830(*a*) is effectively replaced by the new proxy step 832(*a*). At this point electrical transitions 634 to or from the newly inserted proxy step 832(*a*) do not exist.

Figure 8C:
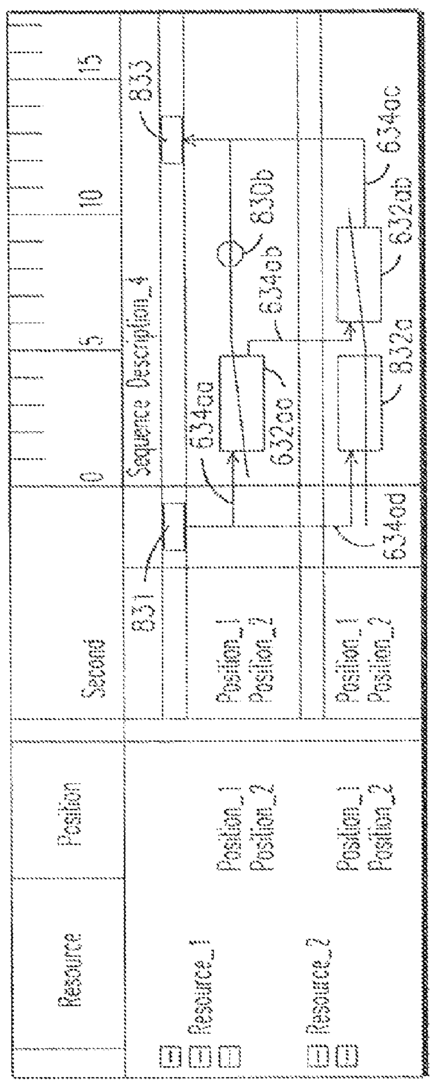
Figure 8D:
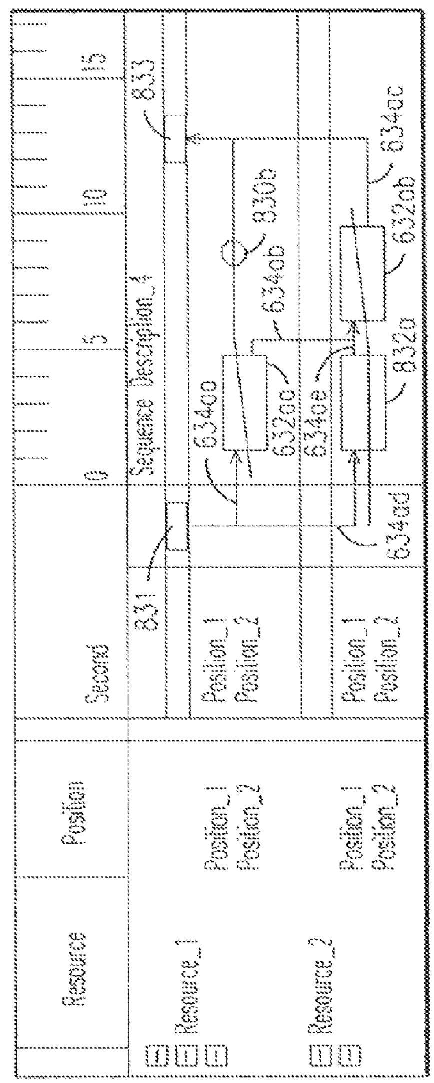

FIG. 8C illustrates an exemplary electrical model with an electrical transition 634 added to the newly inserted proxy step 830. Electrical transition 634(*ad*) is added from the global start step 831 to the newly inserted proxy step 832(*a*). FIG. 8D illustrates an exemplary electrical model with an electrical transition 634 added from the newly inserted proxy step 830. Electrical transition 634(*ae*) is added from newly inserted proxy step 832(*a*) to the electrical step 632(*ab*). The added electrical transitions 634(*ad*) 634(*ae*) effectively set the newly inserted proxy step 832(*a*) to be parallel relative the electrical step 632(*aa*). In order for the electrical step 632(*aa*) and the newly inserted proxy step 832(*a*) to be parallel, at least a portion of the newly inserted proxy step 832

Figure 8E:
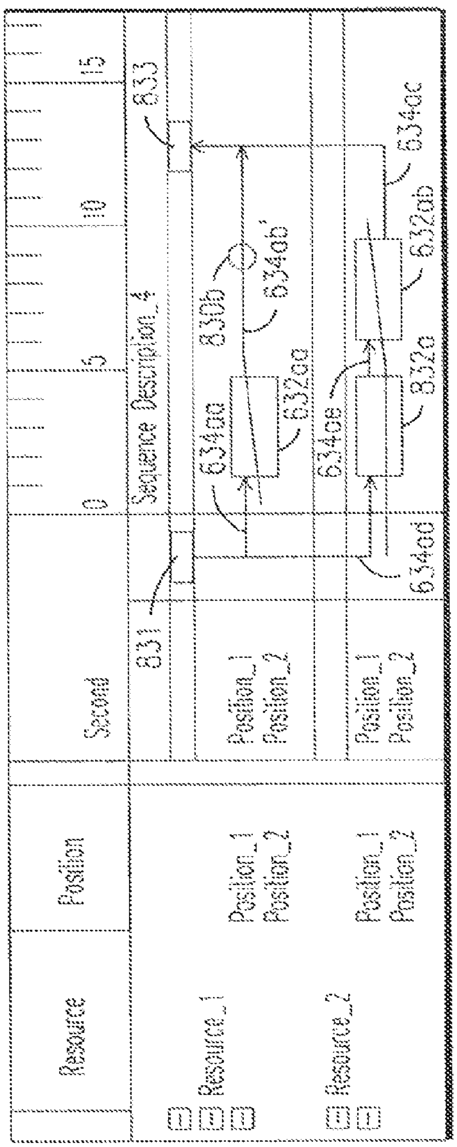

It may be desirable to alter the transition 634(*ab*) from parallel electrical step 632(*aa*). FIG. 8E illustrates an exemplary alteration of the transition 634 from the parallel electrical step 632(*aa*). As shown in FIG. 8E transition 634(*ab*) is altered to transition 634(*ab*').

In one embodiment, the adding the transitions is done automatically by the modeling tool. In another embodiment, the designer must manually input the transitions. In yet another embodiment, the transitions are added automatically but the designer may manually alter the added transitions. Similarly, in one embodiment, the altering of the transition is done automatically by the modeling tool. In another embodiment the designer must manually input the transition. In yet another embodiment the transition is automatically altered but the designer may manually alter the altered transition.

Figure 8F:
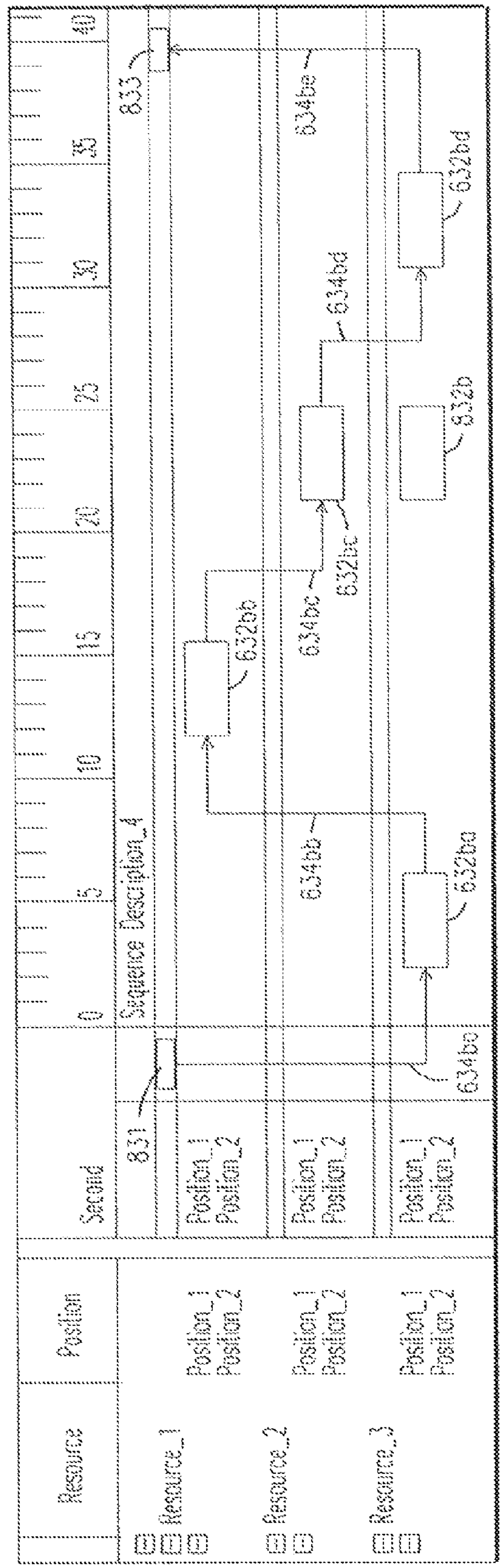

FIG. 8F illustrates an exemplary electrical model with newly inserted proxy step 832. The newly inserted proxy step 832(*b*) is intended to be parallel to electrical step 632(*bc*). In order for the proxy step 832(*b*) to be parallel to electrical step 632(*bc*) transitions to and from the proxy step 832(*b*) must be added.

The determination of automatically adding the transitions is described in the FIG. 8F-FIG. 8I—describes a first embodiment.

Figure 8G:
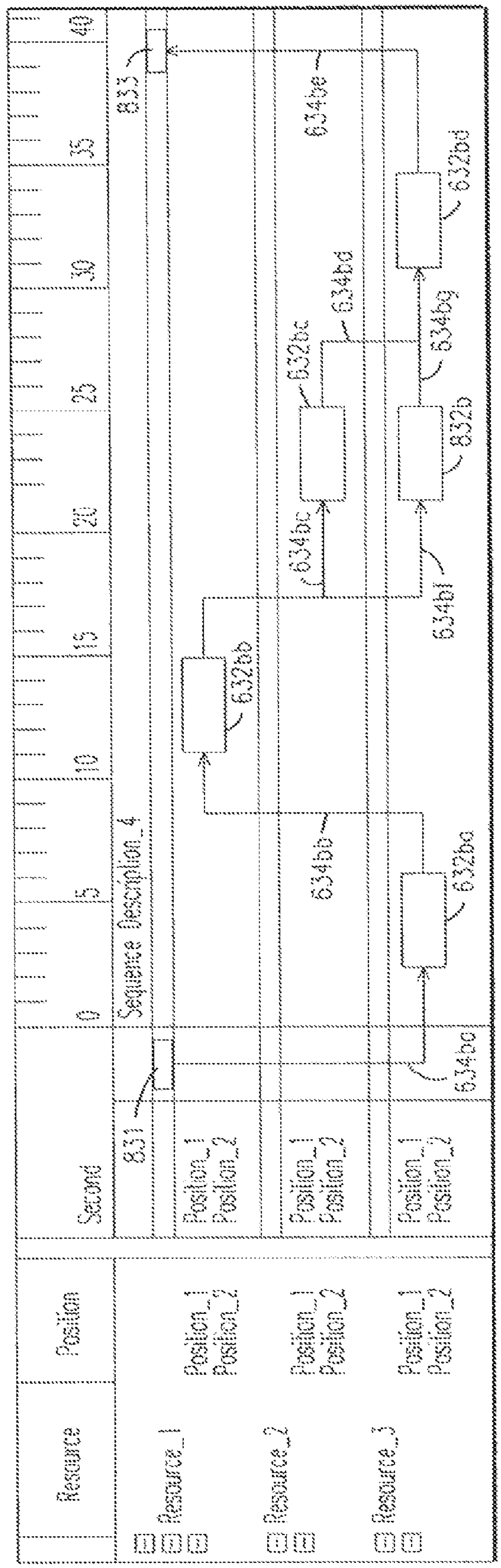

FIG. 8G illustrates an exemplary electrical model with the added transitions 634(*bf*)-634(*bg*) based on the time scale. According to the embodiment illustrated by FIG. 8G, the transition 634 to the proxy step 832 is determined based on the electrical step 832 which immediately precedes the proxy step 832 relative to the time scale. Since electrical step 632 (*bb*) precedes proxy step 832(*b*) relative to the time scale, transition 634(*bf*) was added in order to transition from electrical step 632(*bb*) to the proxy step 832(*b*). If an electrical step 832 does not precede the proxy step 832, the transition 634 may be added from the global start step 831 to the proxy step 832.

According to the embodiment illustrated by FIG. 8G, the transition 634 from the proxy step 832 is determined based on the electrical step 832 which immediately follows the proxy step 832, relative to the time scale, the proxy step 832. Since electrical step 632(*bd*) follows proxy step 832(*b*) relative to the time scale, transition 634(*bg*) was added in order to transition from proxy step 832(*b*) to electrical step 832(*bd*). If an electrical step 832 does not follow the proxy step 832, the transition 634 may be added from the proxy step 832 to the global end step 833.

Figure 8H:
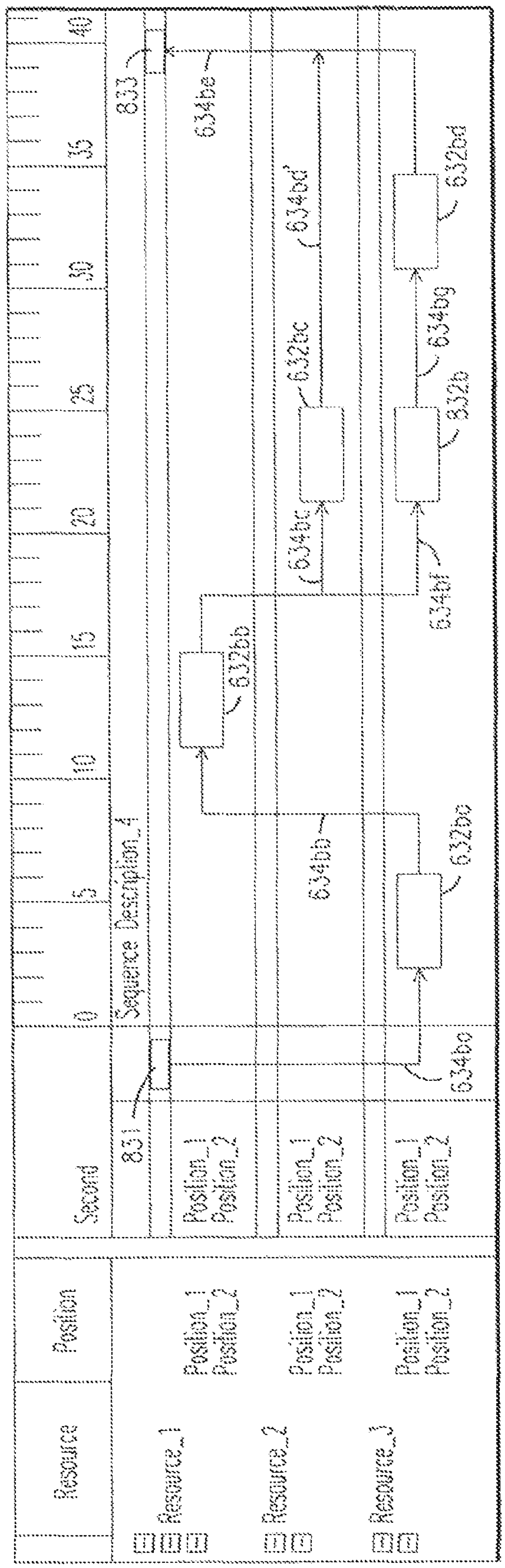

FIG. 8H illustrates an exemplary electrical model with an altered transition from the parallel electrical step. As previously stated, it may be desirable to alter the transition for the parallel electric step 832. In the exemplary illustration, the transition 834(*bd*) from the parallel electric step 834(*bc*) is altered. The transition 834(*bd*) may be altered to the following electrical step 832 having the same resource as the parallel electric step 834(*bc*). If an electrical step 832 having the same resource as the parallel electric step 834(*bc*) does not exist, the transition 634 may be altered to the global end step 833 as illustrated by transition 834(*bd*') in FIG. 8H.

Figure 8I:
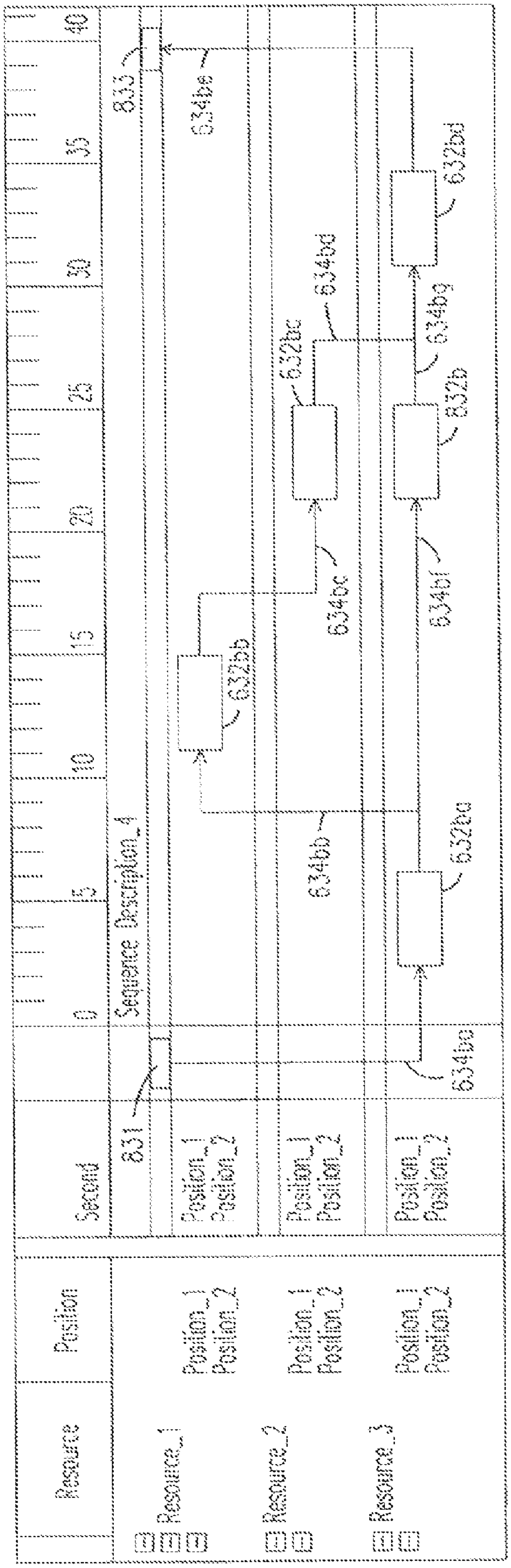

FIG. 8I illustrates an exemplary electrical model with the added transitions 634 (*bh*) 634(*bi*) based on the resource related to the proxy step 832. According to the embodiment illustrated by FIG. 8I, the transition 634 to the proxy step 832 is determined based on the first electrical step 832 which precedes the proxy step 832 and which is related to the same resource as the proxy step 832. Proxy step 832(*b*) is related to Resource_3. Since electrical step 632(*ba*) is the first electrical step 632 related to Resource_3 prior to the proxy step 832(*b*), transition 634(*bh*) was added in order to transition from electrical step 632(*ba*) to the proxy step 832(*b*). If an electrical step 832 having the same resource as the proxy step 832 does not precede the proxy step 832, the transition 634 may be added from the global start step 831 to the proxy step 832.

According the embodiment illustrated by FIG. 8I, the transition 634 from the proxy step 832 is determined based on the first electrical step 832 which follows the proxy step 832 and which is related to the same resource as the proxy step 832. Since electrical step 632(*bd*) is the first electrical step 623 related to Resource_3, transition 634(*bi*) was added in order to transition from proxy step 832(*b*) to electrical step 832(*bd*). If an electrical step 832 having the same resource does not follow the proxy step 832, the transition 634 may be added from the proxy step 832 to the global end step 833.

In addition to the adding of transitions 634(*bf*) and 634(*bg*), transition 834(*bd*) may be altered as described above for FIG. 8H.

It would be understood that the proxy step 832 may be modified to be coupled to an signal line as described above for electrical steps 832.

Since the proxy steps 832 are not related to a mechanical step, they are not required by the mechanical sequence. Thus, it is possible to delete a proxy step 832. When a proxy step is deleted 832, the added transitions 634 are deleted. Additionally, an altered transition 634 is altered back to the transition prior to the adding of the respective proxy step 832.

Figure 8J:
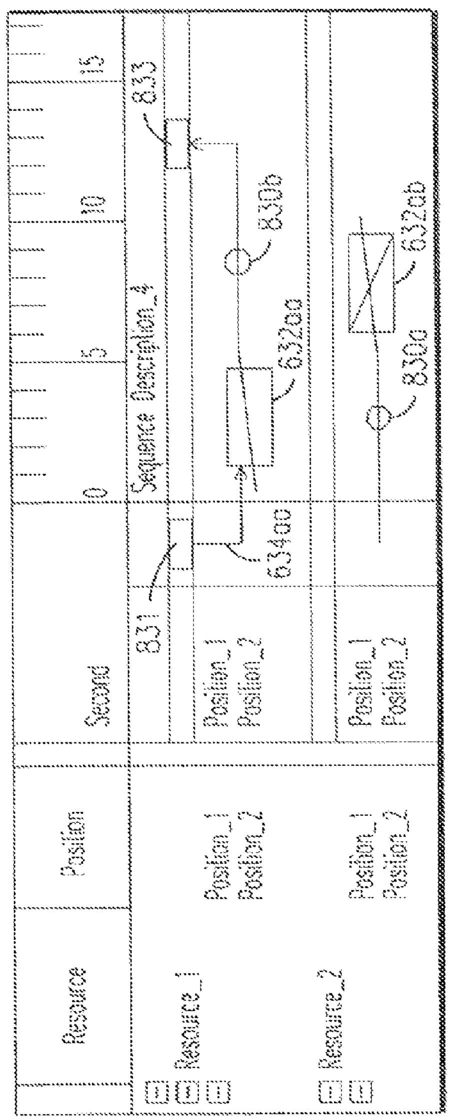

In some cases, electrical steps 632 which were automatically created from the mechanical steps 432 are not required. For example, if the associated mechanical step 432 is not operated via electrical signals as in the case of a chute which is operated by gravity. When the designer determines that the electrical step 632 is not required, the designer may deactivate the electrical step 632. Referring back to FIG. 8A, electrical step 632(*ab*) is transitioned to by transition 634(*ab*) and transition from by transition 634(*ac*). FIG. 8J illustrates a deactivated electrical step 632(*ab*). The step is deactivated with the removal of transitions 634(*ab*) 634(*ac*). A designer may reactivate the deactivated electrical step 632(*ab*). The electrical steps 634(*ab*) 634(*ac*) would be added back.

Sequence Element Replacement

Figure 1B:
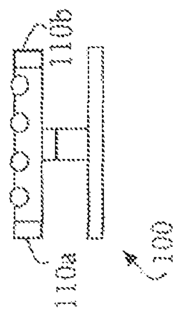
Figure 1C:
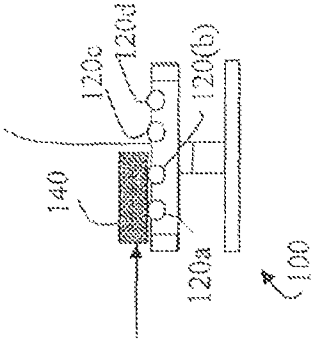
Figure 1D:
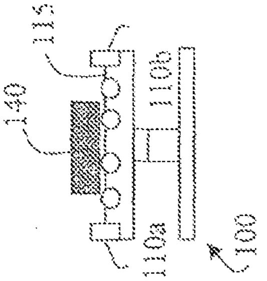
Figure 1E:
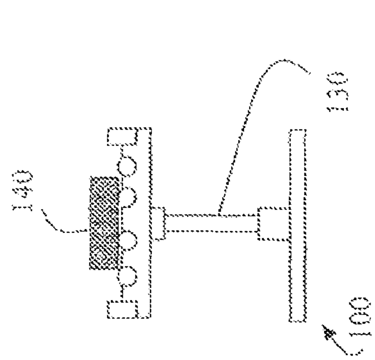
Figure 1F:
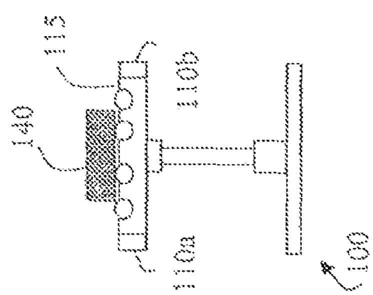
Figure 9A:
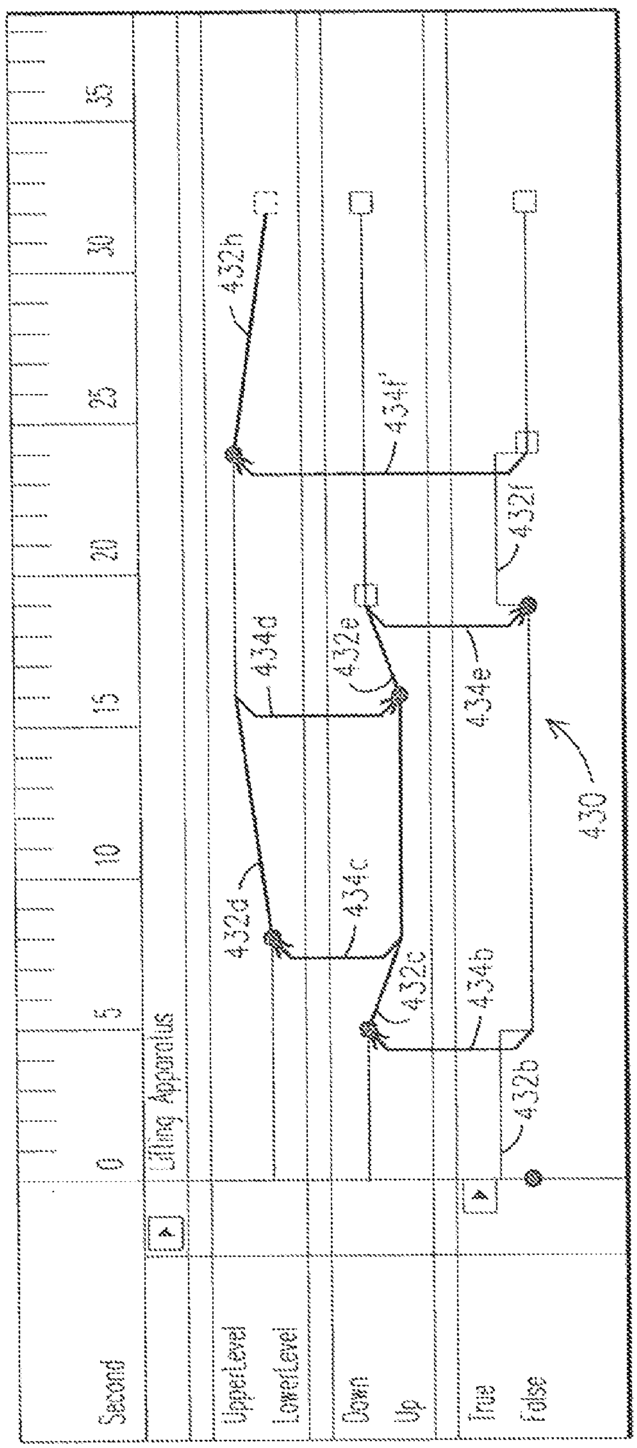
FIGS. 9A-9F illustrates exemplary replacement steps in accordance with the present disclosure.

After an automation system has been modeled it may be necessary to make changes to the model. For example, if the sequence view did not move the securing ends down as shown in FIG. 1B and up in FIG. 1H then these sequences would need to be added to the mechanical model. FIG. 9A illustrates the sequence view 420 without the sequences of FIG. 1B and FIG. 1H.

In order to alter the sequence view 420, a mechanical sequence element may be replaced by at least one new sequence element. FIGS. 9B-9E illustrates how the sequence view 420 may be altered to include the sequence illustrated in FIG. 1G. First, a sequence element to replace needs to be identified. In order to identify the mechanical sequence element, the designer may place the mouse cursor on the mechanical sequence element to be replaced and click the mouse.

Figure 1G:
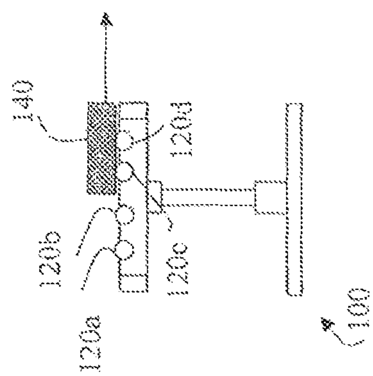
Figure 1H:
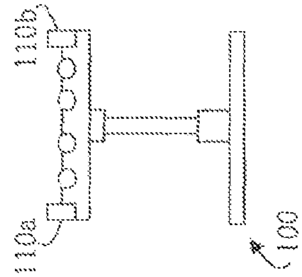
Figure 2:
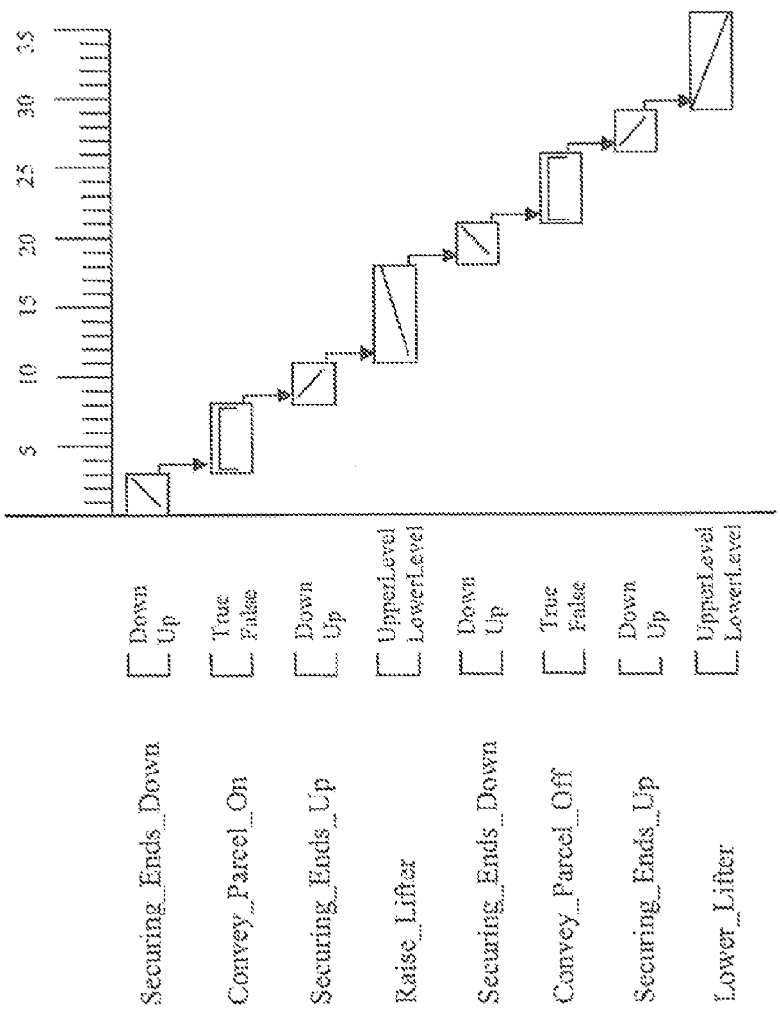
FIG. 2 illustrates the sequence flow of the mechanical operation of FIGS. 1A-1H according to a Gantt chart.
Figure 9B:
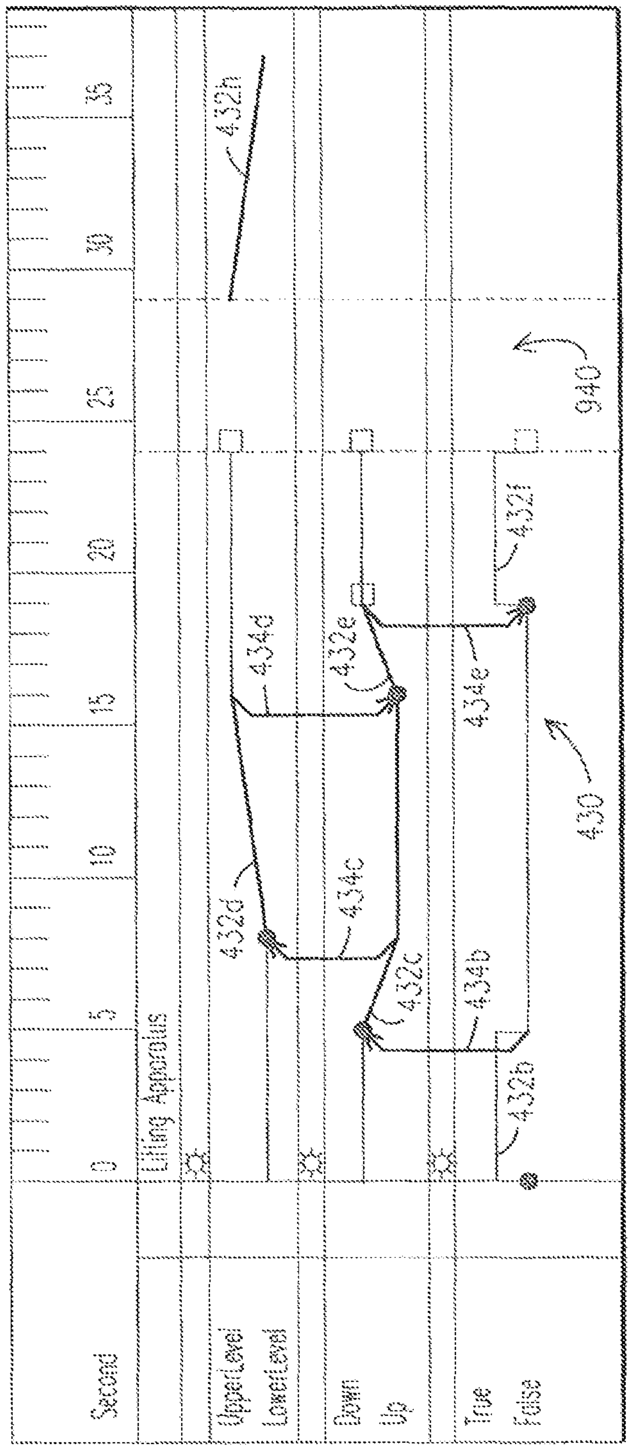

Since the moving of the securing ends of FIG. 1G should follow the mechanical step 432(*e*) which conveys the parcel, the mechanical transition 434(*f*') would be identified to be replaced. Once the sequence element is identified, it may then be removed from the display of the mechanical sequence flow. As shown in FIG. 9B, after the mechanical transition 434(*f*') is identified for replacement, the mechanical transition 434(*f*') is removed from the mechanical sequence flow.

In a preferred embodiment, the display includes a gap 940 which is inserted where the mechanical transition 434(*f*') was removed. The gap 940 serves as a position holder for the at least one new mechanical element to be added. The gap 940 may be formed starting at the starting time of the identified mechanical sequence element and ending at a time greater than the starting time of the gap 940.

Figure 9C:
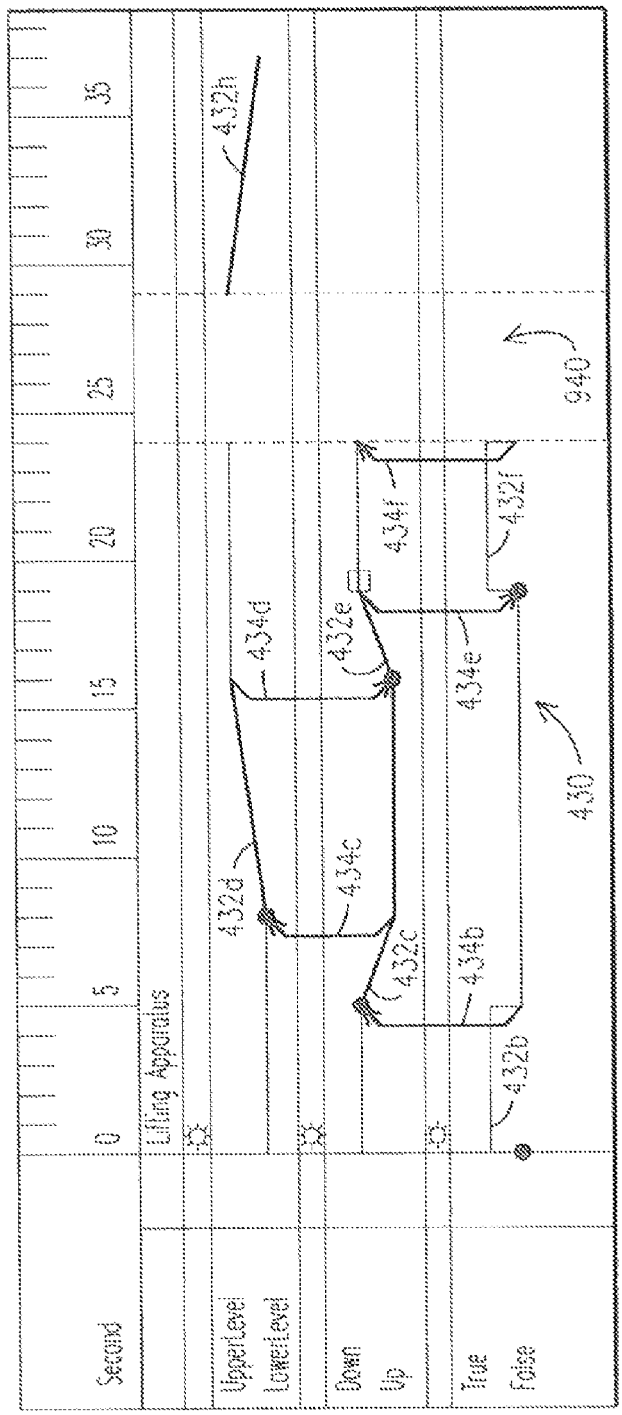
Figure 9D:
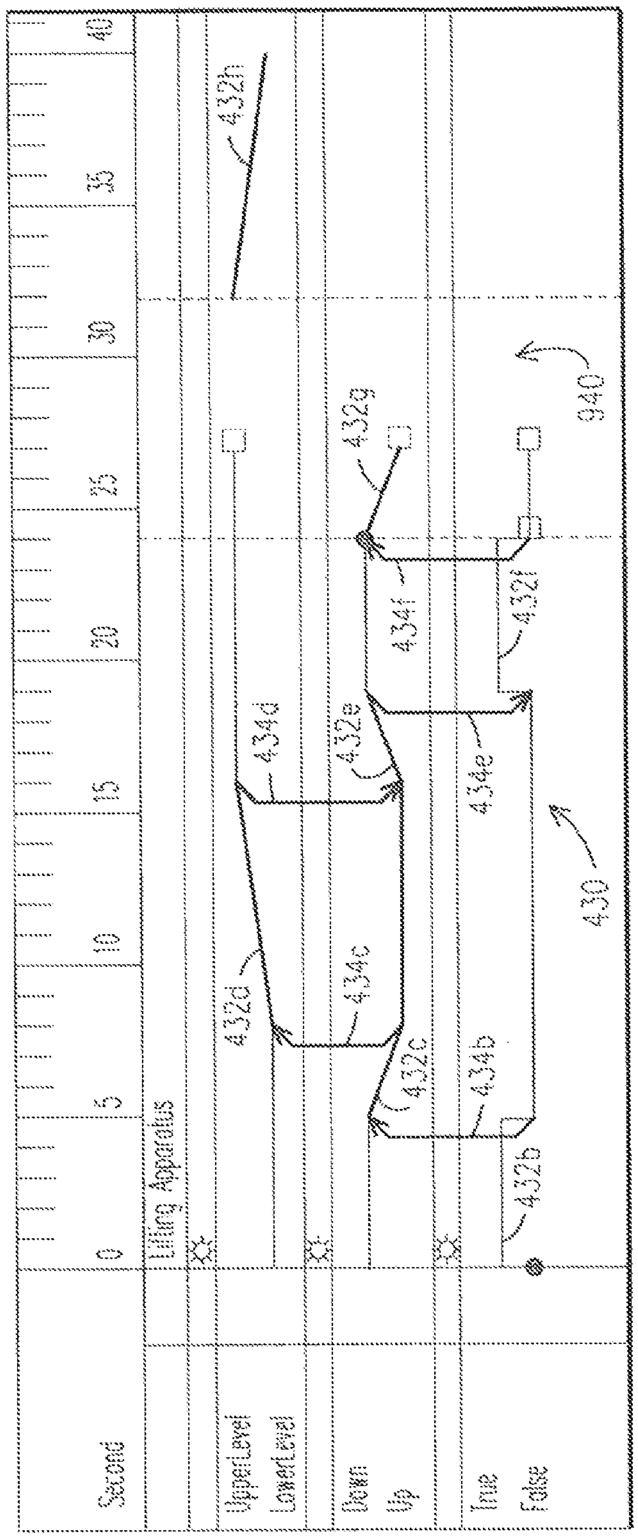

The display of the sequence view 420, in FIG. 9C illustrates, that new mechanical transition 434(*f*) is added from the mechanical step 432(*e*) to the down position of the securing ends. Referring to FIG. 9D, mechanical step 432(*g*) to move the securing ends is added at the end of the mechanical transition 434(*f*). Now referring to FIG. 9E, a mechanical transition 434(*g*) is added from the mechanical step 432(*g*) to the upper level position of the lifter.

Figure 9E:
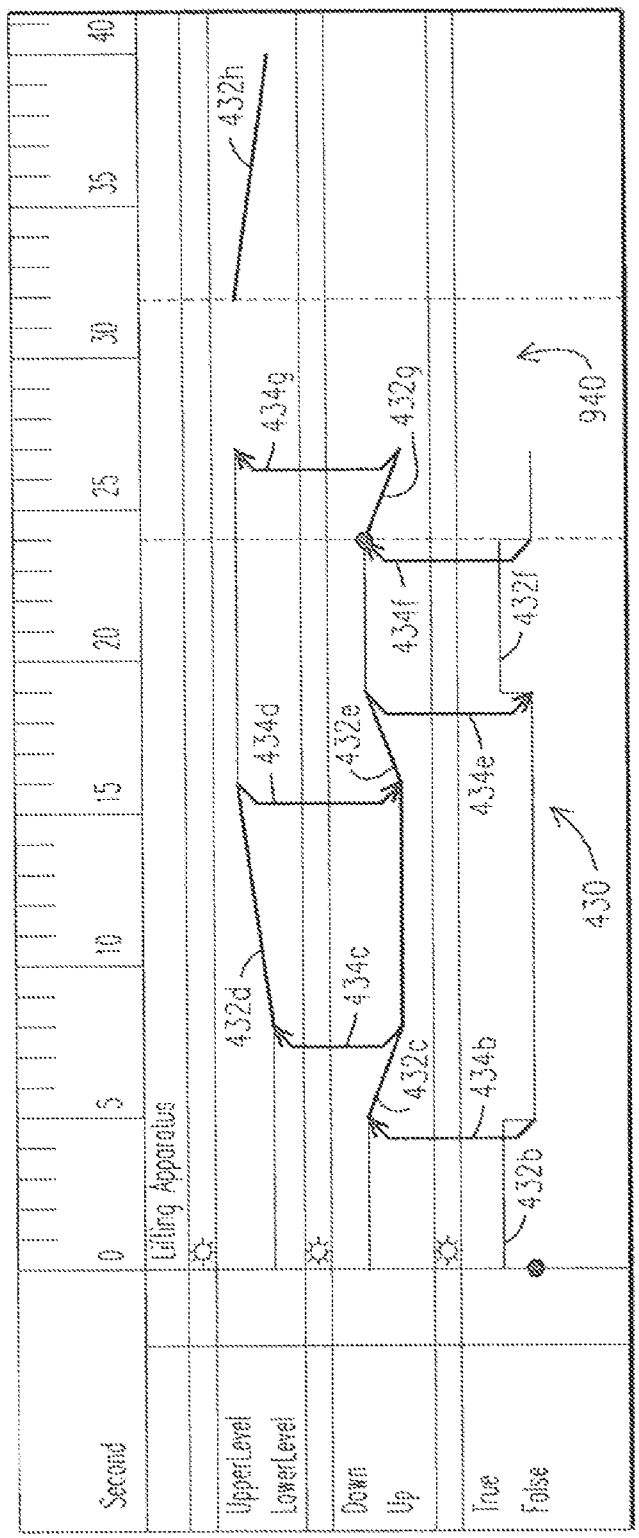

As shown in FIGS. 9C-9E, the gap 940 may be adjusted on the electronic display device as replacement sequence elements 434(*f*), 432(*g*), 434(*f*) are added. The gap 940 may be adjusted to be after the added mechanical step. Additionally the ending time of the gap 940 may be increased.

Figure 9F:
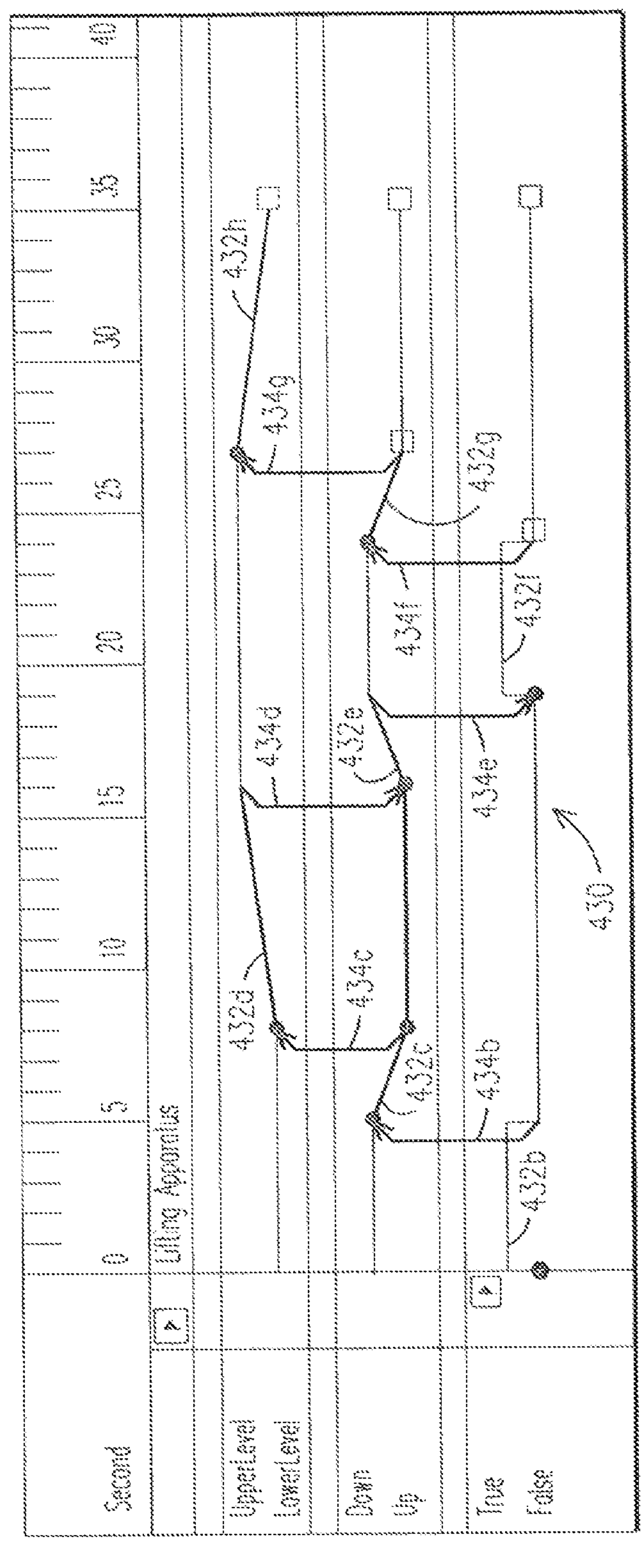

Referring to FIG. 9F, once all of the replacement sequence elements 434(*f*), 432(*g*), 434(*f*) are added 434(*f*), a finish replacement is selected. The designer may select to finish the replacement by completing the replacement or by canceling the replacement. If the finish replacement is indicated the gap 940 is removed from the display thereby replacing the sequence element 434(*e*). However, if the cancel replacement is indicated, the mechanical sequence flow is restored to comprise the mechanical sequence elements that existed in the mechanical sequence flow prior to the start of the replacement. In one embodiment, it would not be possible to display the electrical model until the replacement is finished.

In the above example, a mechanical transition was identified as the sequence element to be replaced. It would be understood that other sequence elements such as a mechanical step could be identified as the sequence element to be replaced. Furthermore, in the above example a single sequence element is identified to be replaced. It would be understood that multiple sequence elements could be identified to be replaced.

Alternative Path

An alternative path defines an alternative sequence flow that the system may use as an alternative to the original sequence flow. An alternative path denotes a break in the mechanical sequence where the sequence may use the alternative path. By providing alternative paths, the automation system does not need to be reprogrammed for different situations that may occur. For example, in some situations, the parcel may be placed onto the surface of the apparatus. In this case there would not be a need to convey the parcel onto the surface of the lifting apparatus. Thus, an alternative path may be added to skip the step of conveying the parcel onto the lifting apparatus. Another alternative path may eliminate the step of moving the securing ends up prior to lowering the lifter and then eliminating the step of moving the securing ends down prior to conveying the parcel on to the surface of the lifting apparatus. It is also possible to add new steps in the alternative path. For example, a scale could be added as new resource which could have a step to weigh the parcel prior to raising the lifter. An example of adding an alternative path to not raise the securing ends after the parcel has been placed on the lifter are illustrated.

Figure 10A:
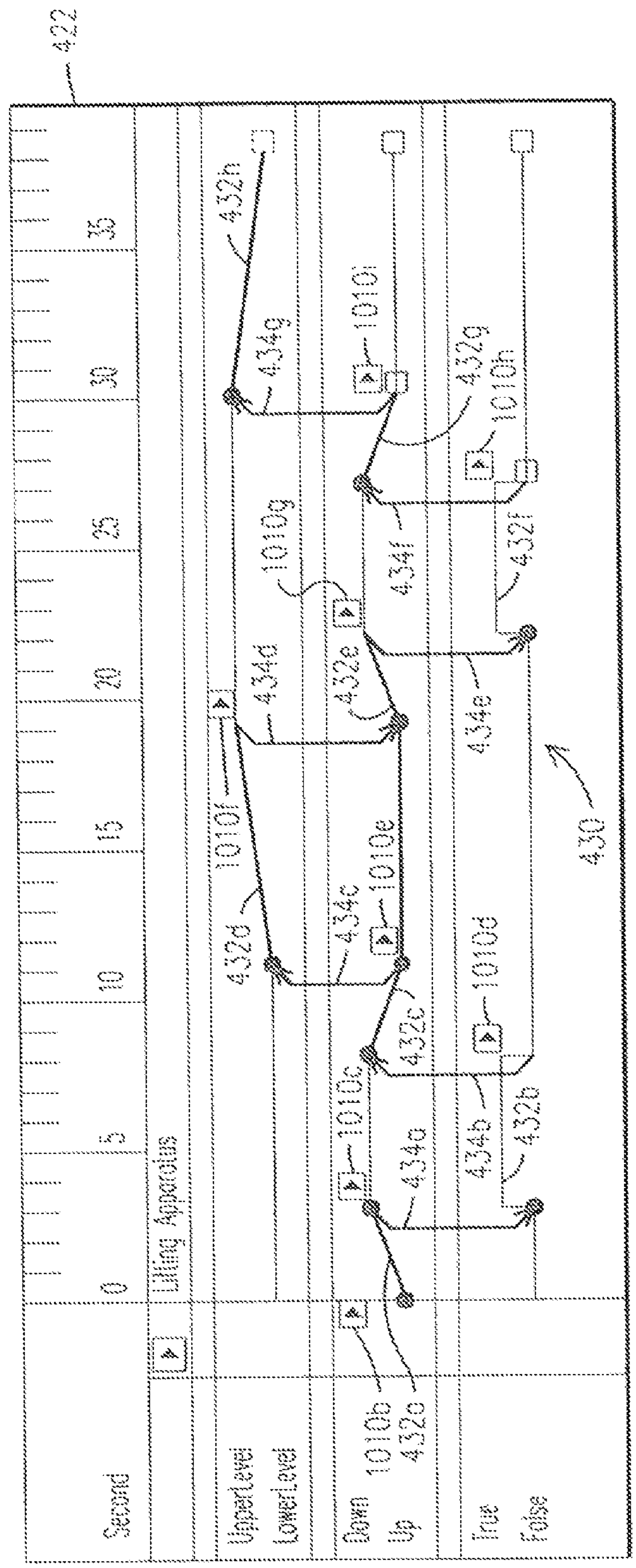

FIG. 10A illustrates an exemplary starting points 1010 for an alternative section in a sequence view of the mechanical model of the lifting apparatus of FIG. 4E. An alternative section denotes a particular start and end point in which an alternative path may be added. A global starting point 1010 (*a*) occurs prior to the sequence flow. The exemplary illustration includes the global starting point 1010(*a*). A local starting point occurs for each resource that changes position at time 0. In the exemplary illustration, only the securing ends change from the up position to the down position at time 0 and therefore have a local starting point 1010(*b*). The starting points 1010(*e*)-1010(*i*) relate to a mechanical step in which an alternative section may occur. In the illustrated embodiment the starting points are visually displayed in the sequence view. In the above illustration the starting points 1010 are denoted by the symbol . It would be understood that the starting points may be the start or end of a mechanical element and not visually displayed separately from the mechanical element.

The designer identifies a starting point 1010 of the alternative section by placing the mouse cursor on the starting point 1010 and clicking the mouse. Depending on the identified starting point 1010, the ending points may differ.

Figure 10B:
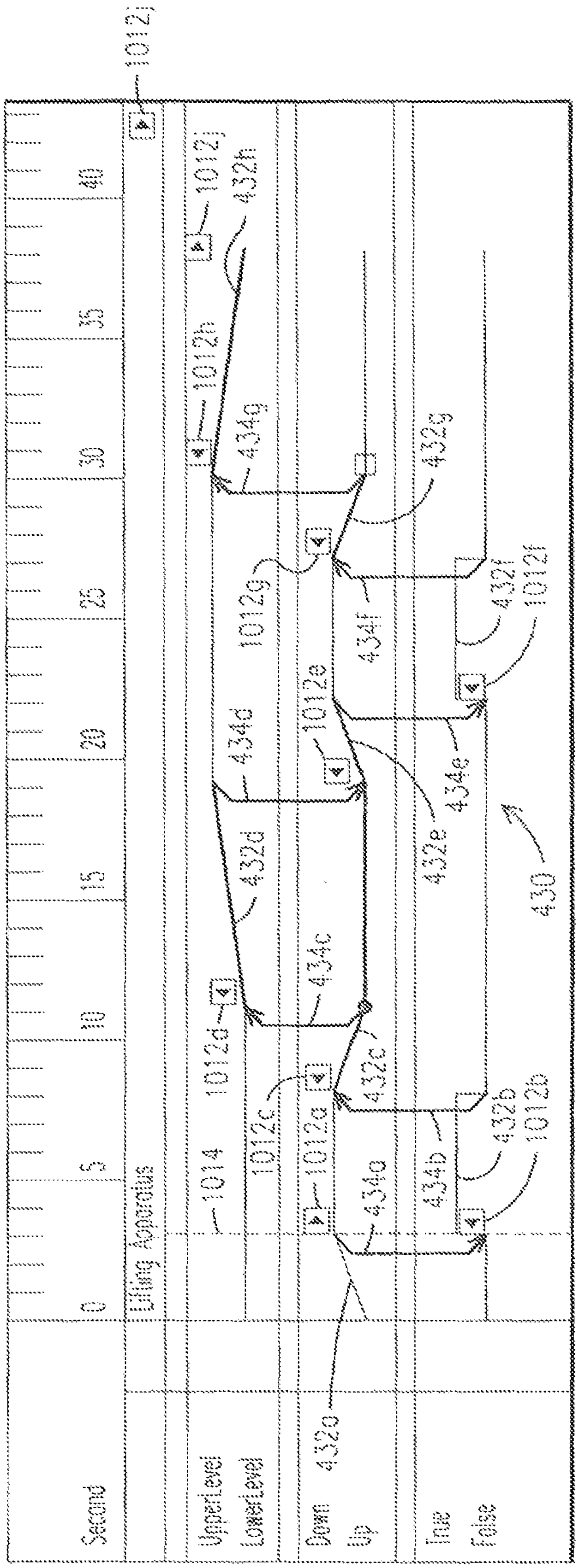

FIG. 10B illustrates an exemplary ending points 1012 for an alternative section in a sequence view of the mechanical model of the lifting apparatus. A global ending point 1012 occurs after the sequence flow. The exemplary illustration includes the global ending point 1012(*j*). A local ending point occurs for each resource that changes position at last time in the sequence flow. In the exemplary illustration, only the lifter change from the upper level to the lower level at a last time in the sequence flow and therefore has a local starting point 1012(*j*). The ending points 1012(*a*)-1012(*h*) relate to a mechanical step in which the end of an alternative section may occur. In the exemplary illustration of FIG. 10B, the ending points 1012(*a*)-1012(*h*) are based on the designer having identified starting point 1010(*c*) as the start of the alternative section. The ending points should be after the starting pint in relation to the time scale. In the illustrated embodiment the ending points are visually displayed in the sequence view. In the above illustration the starting points 1012 are denoted by the symbol . It would be understood that the ending points may be the start or end of a mechanical element and not visually displayed separately from the mechanical element.

Furthermore, a visual indication is preferably provided in the sequence view shows the identified starting point 1010. FIG. 10B shows the visualization of the starting point 1014 as a line which extends vertically from the time scale through a start or end of the mechanical element at the beginning of the alternative section. In FIG. 10B the line shows that the starting point is at the end of mechanical step 432(*a*).

The designer identifies an ending point 1012 of the alternative section by placing the mouse cursor on the starting point 1012 and clicking the mouse. For purpose of example, the ending point 1012(*f*) is identified. Thus, in the above example, the alternative section is from starting point 1010(*c*) to ending point 1012(*f*). One or more alternative paths may be provided within the alternative section.

Figure 10C:
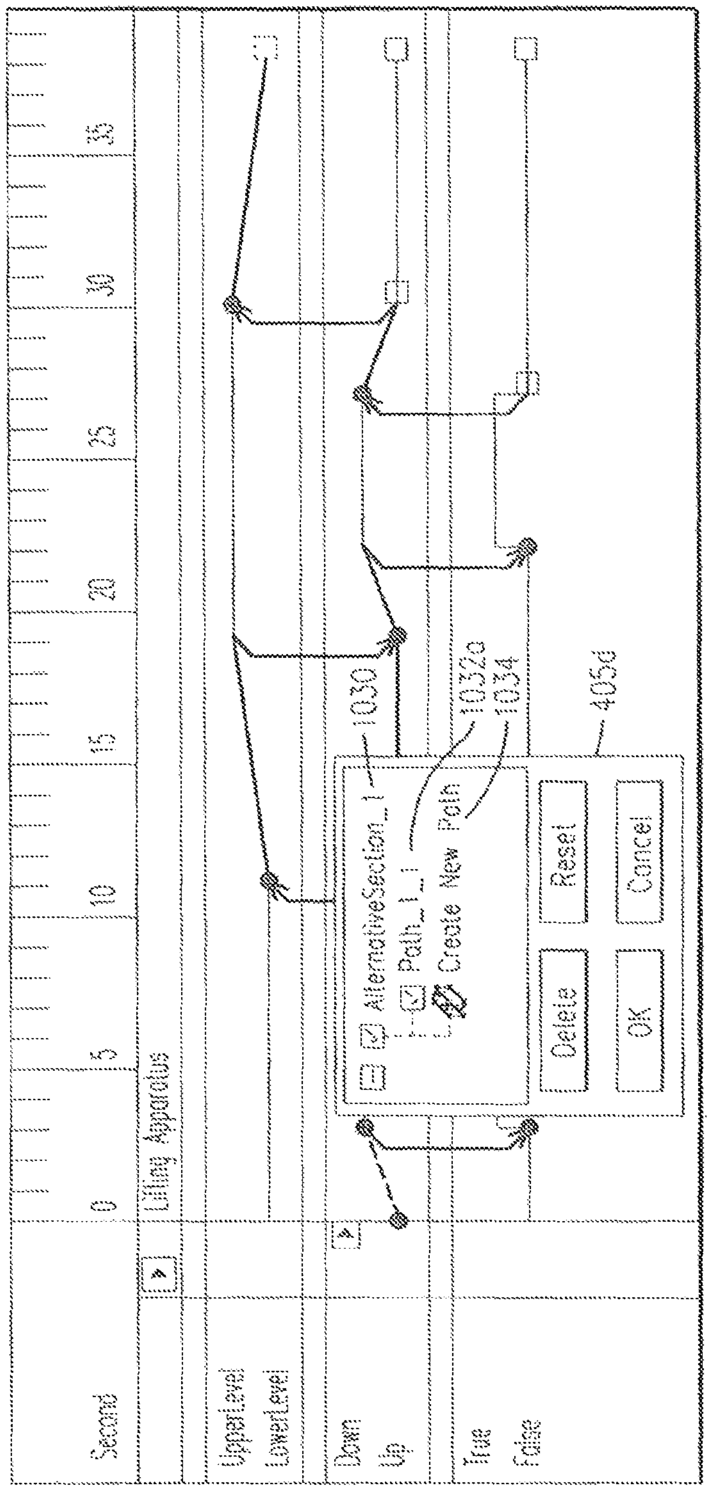

Once the ending point 1012 is identified a new path may be automatically created. However, it may be that a new path is explicated created by the designer. FIG. 10C illustrates an exemplary GUI tool 405(*d*) used to create a new path in the alternative section. AlternativeSection_1 1030 is the name the alternative section from starting point 1010(*c*) to ending point 1012(*f*). Path_1_1 1032(*a*) is the name of the originally defined path in the section. That is the mechanical elements from the starting point to the ending point. According to FIG. 10B the originally defined path is defined by mechanical elements 434(*a*), 432(*b*), 434(*b*), 432(*c*), 414(*c*), 432(*d*), 434 (*d*), 432(*e*) and 434(*e*) The option Create New Path 1034 is identified to create a new path. Preferably the path names 1032 and alternative section names may be altered.

Figure 10D:
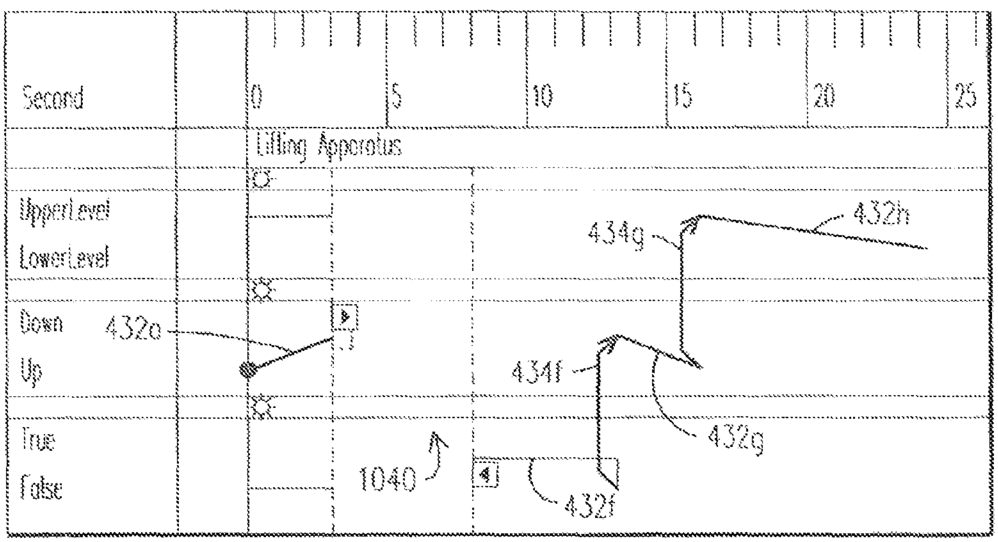
Figure 10E:
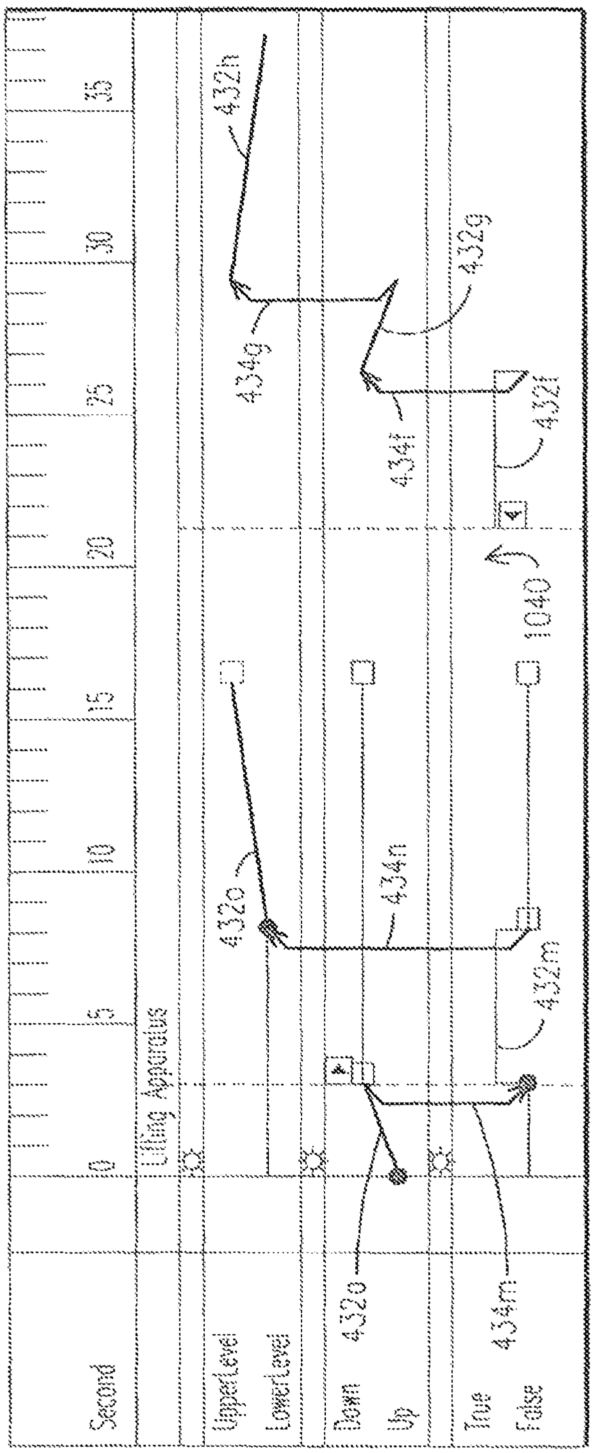
Figure 10F:
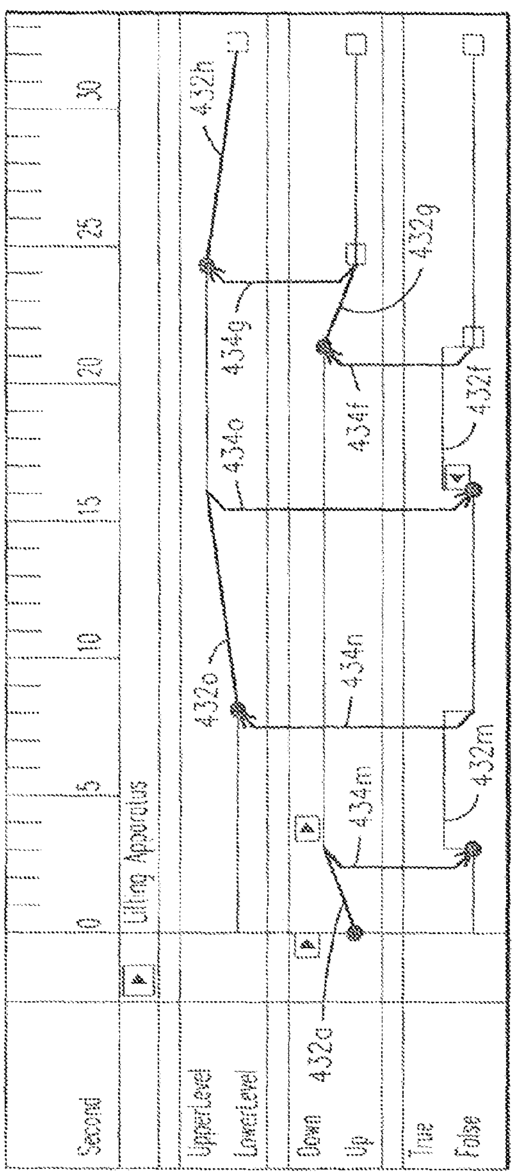

FIG. 10D illustrates a display of an exemplary creation of a new path in the alternative section in a preferred embodiment, the display includes a gap 1040. The gap 1040 serves as a position holder for the at least one new mechanical element to be added for the new path. The gap 1040 may be formed starting at time of the identified starting point and ending at a time greater than the starting time of the gap 1040. Preferably the ending is at a time of the identified ending point. FIG. 10 D illustrates the gap being formed from the end of mechanical step 432(*a*) to the beginning of mechanical step 432(*f*).

Figure 10G:
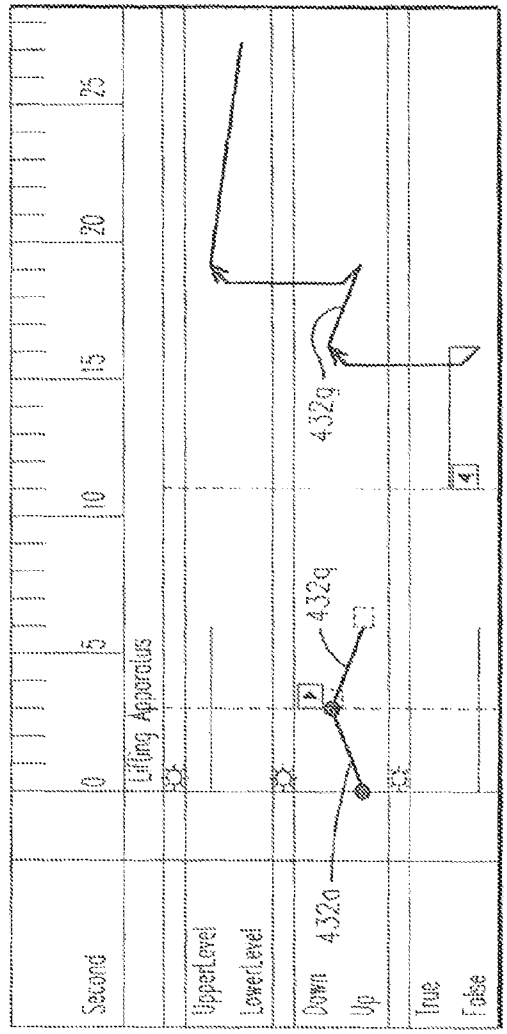
Figure 10H:
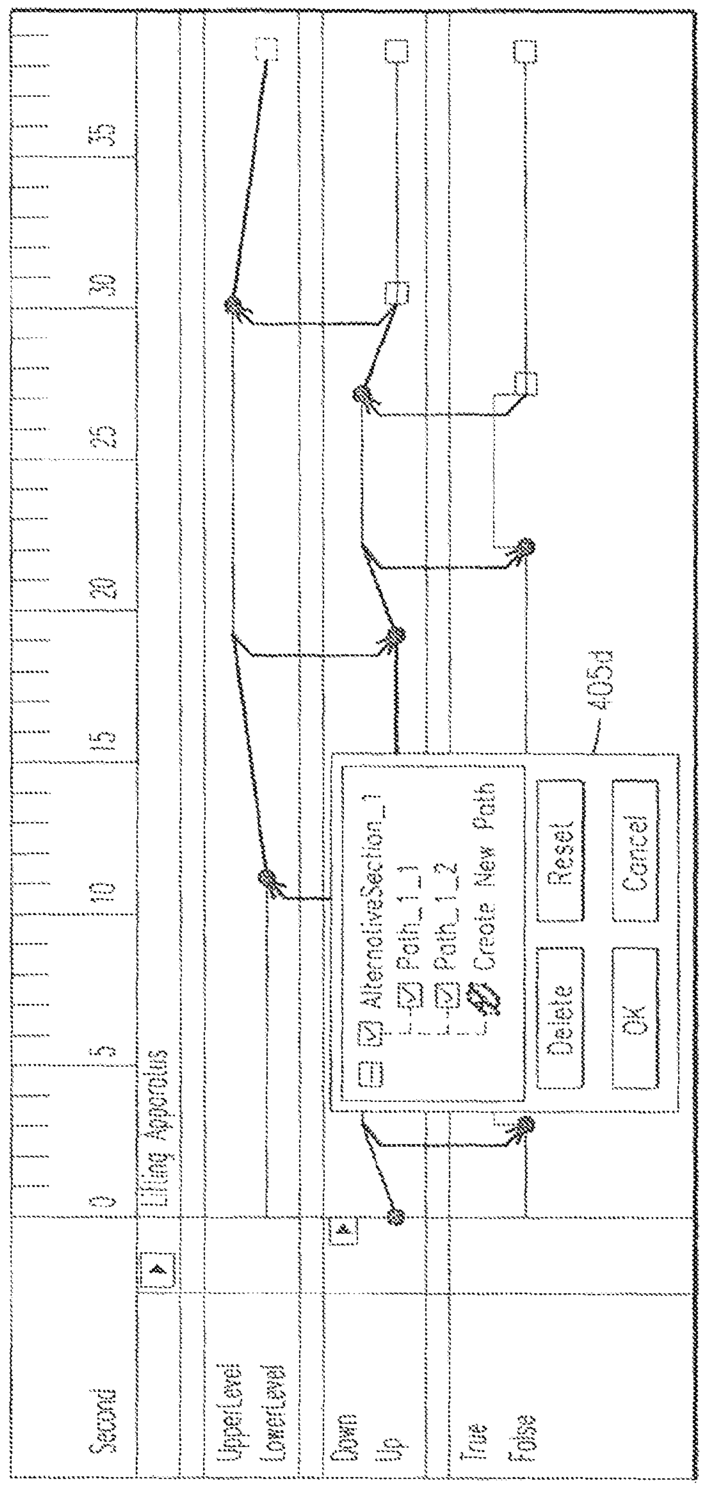
Figure 101:
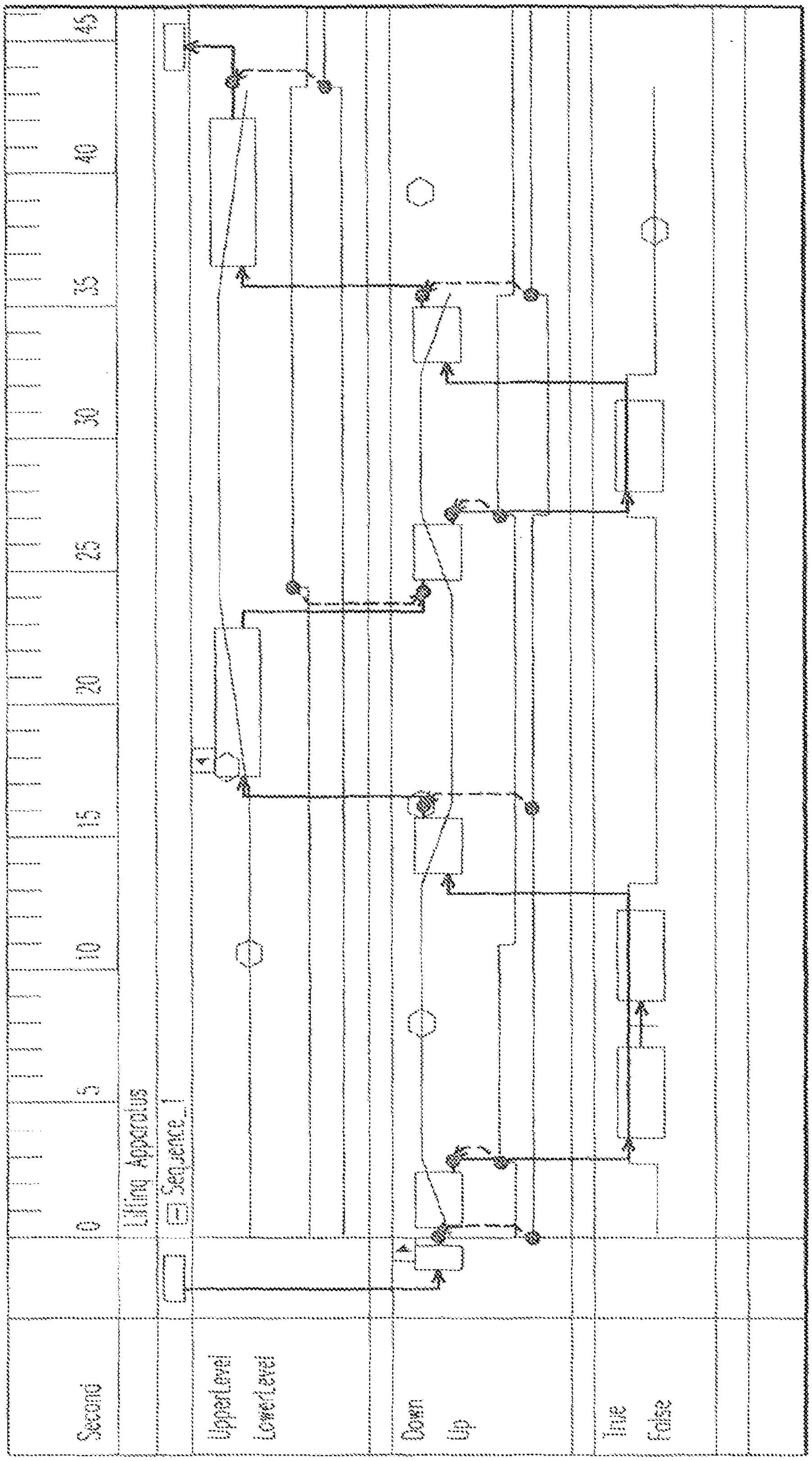

FIG. 10H illustrates that new mechanical elements have been added to the new path. In particular, transition 434(*m*) is added from the mechanical step 432(*a*) for moving the securing ends down to added mechanical step 432(*m*) for conveying the parcel. Transition 434(*n*) is added from added mechanical step 432(*m*) to added mechanical step 423(0) for lifting the lifter.

As shown in FIGS. 10D-10H, the gap 1040 may be adjusted on the electronic display device as mechanical elements are added to the new path. For example, the gap 1040 may be adjusted to be after the adding a mechanical element. Additionally the ending time of the gap 940 may be increased as mechanical elements are added. However, in one embodiment the beginning time of the gap 1040 is static.

Referring to FIG. 10I, once all of the mechanical elements of the new path are added, a finish path create is selected. The designer may select to finish the path create by completing the new path or by canceling the new path. If the cancel is indicated, the added mechanical steps are removed. Several embodiments of indicating to complete the created path are described.

In one embodiment, the gap 1040 is removed from the display, when the complete is indicated. In addition, it may be necessary after the complete to add a mechanical transition from end of the last mechanical element of the new path to the beginning of the mechanical step after the new path. Referring to FIG. 10I, the transition 434(*o*) is added from the last mechanical element of the new path 432(*o*) to the mechanical step 432(*f*). In a preferred embodiment the transition is automatically added. In one embodiment, it would not be possible to display the electrical model until the replacement is finished.

Furthermore, validity checks ma be performed when the complete is indicated. The new path should not added if the validity check indicates an invalid situation. In one embodiment an error is displayed to inform the designer of invalid situation. Validity checks may include checking that the ending position of a resource in the new path matches the starting position of the resource after the alternative section.

FIG. 10G illustrates a invalid situation for a new path. The securing ends move down at mechanical step 432(*a*) prior to the new path. The new path includes the mechanical step 432(*q*) to move the securing ends up. However, the securing ends are in a down position after the alternative section. Thus, the ending position of the securing ends is different and does not match the starting position of the resource after the alternative section.

For any given alternative section there may be multiple paths as shown in FIG. 10H. A path may span across multiple resources or a single resource. In a preferred embodiment, as illustrated, only one path is displayed at a time. In the illustration the new path that was added above has the name Path_1_2 and is currently being displayed. The GUI tool 605(*d'*) may be used to select the path to be displayed in addition to creating a new path in the alternative sequence. Thus the designer may switch the display between a currently displayed path to a different path.

In addition, within any given alternative section there may be multiple alternative sections. It would be understood that the electrical model may be altered for each path according to the methods described above. In a preferred embodiment, of the electrical model, only one path is displayed at a time. Furthermore, in one embodiment the signals differentiate the different paths such that the PLC recognizes which path to execute.

Dynamic Views

It would be appreciated that the modeling of the automation system may be complex. Therefore, it may be desirable to scale the modeling into smaller portions. Thus, each of the smaller portions would then be less complex than the whole. The modeling tool facilitates this with the use of sequence descriptions 442 as shown in FIG. 4C.

In the previous illustrations, the modeling of the automation system has been described in terms of a single sequence description 442. However, the use of multiple sequence descriptions 442 allows the modeling to be separated in terms of one or more resources. Thus, the modeling would be less complex for the designer. Furthermore, this facilitates multiple designers working on the same automation system but having responsibility of one or more sequence descriptions 442.

Figure 11A:
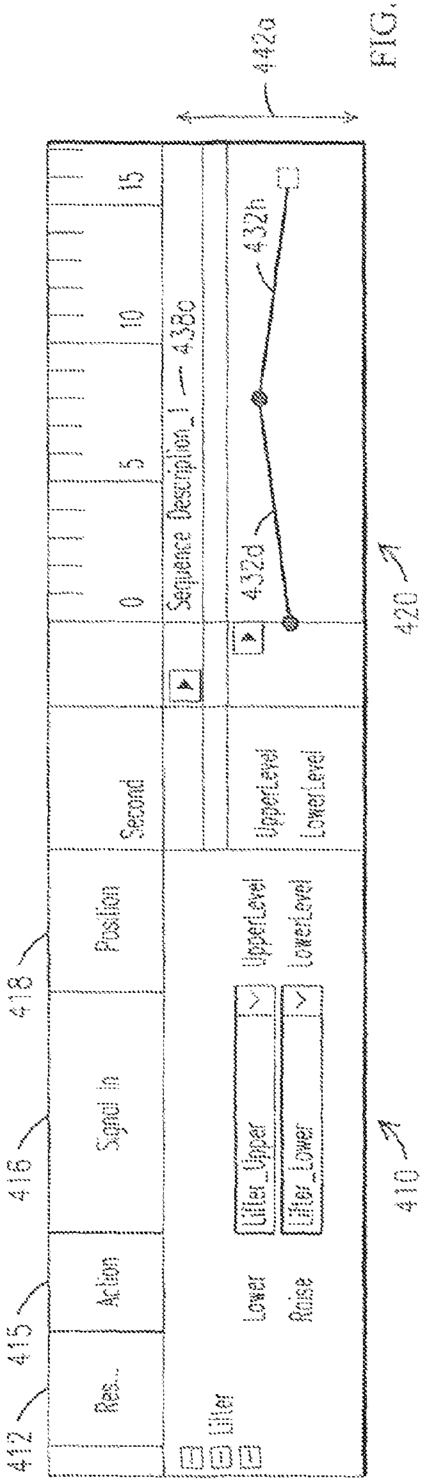
FIGS. 11A-11M illustrates exemplary dynamic views in accordance with the present disclosure.

FIGS. 11A-11E illustrates the display of sequence descriptions 442 by using the previously modeled lifting apparatus in 4E and 6A-6H. More particularly, FIG. 11A illustrates an exemplary first sequence description 442(*a*) according to a display of the mechanical model. First sequence description 442(*a*) includes a header 438(*a*) having the name "Sequence Description 1". Additionally, first sequence description 442(*a*) includes the lifter having the positions 418 and actions 416 as described in FIG. 4. Since the first sequence description 442(*a*) only pertains to the lifter, the designer only describes the sequence flow in terms of the lifter. As previously shown in FIG. 4E the lifter only has a mechanical step 432(*d*) showing the lifter raising from the lower level to the upper level and mechanical step 432(*h*) showing the lifter being lowered from the upper level to the lower level.

Figure 11B:
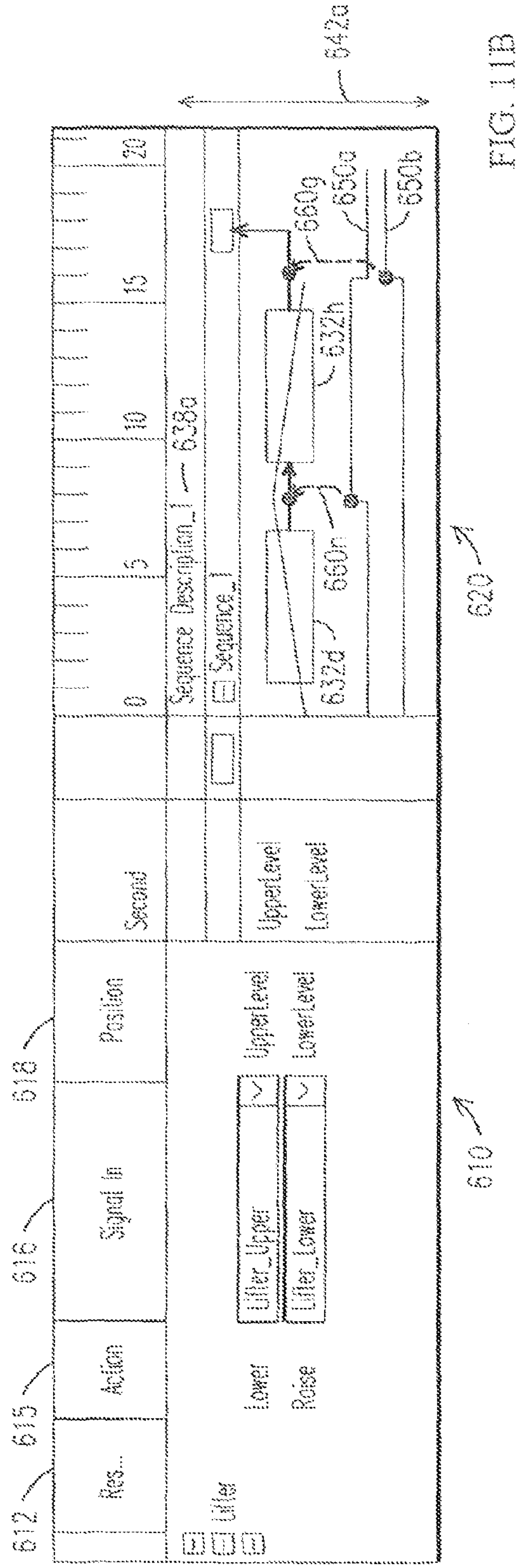

FIG. 11B illustrates an exemplary first sequence description 642(*a*) according a display of to the electrical model of FIG. 11A. First sequence description 642(*a*) includes a header 638(*a*) having the name "Sequence Description 1". Additionally, the first sequence description 642(*a*) includes the lifter having the positions 618, actions 616 and signal in 616 as described in FIGS. 6A-6G. Electrical steps 632(*d*) 632(*h*) and signal pulses 650(*a*) 650(*b*) are shown.

Figure 11C:
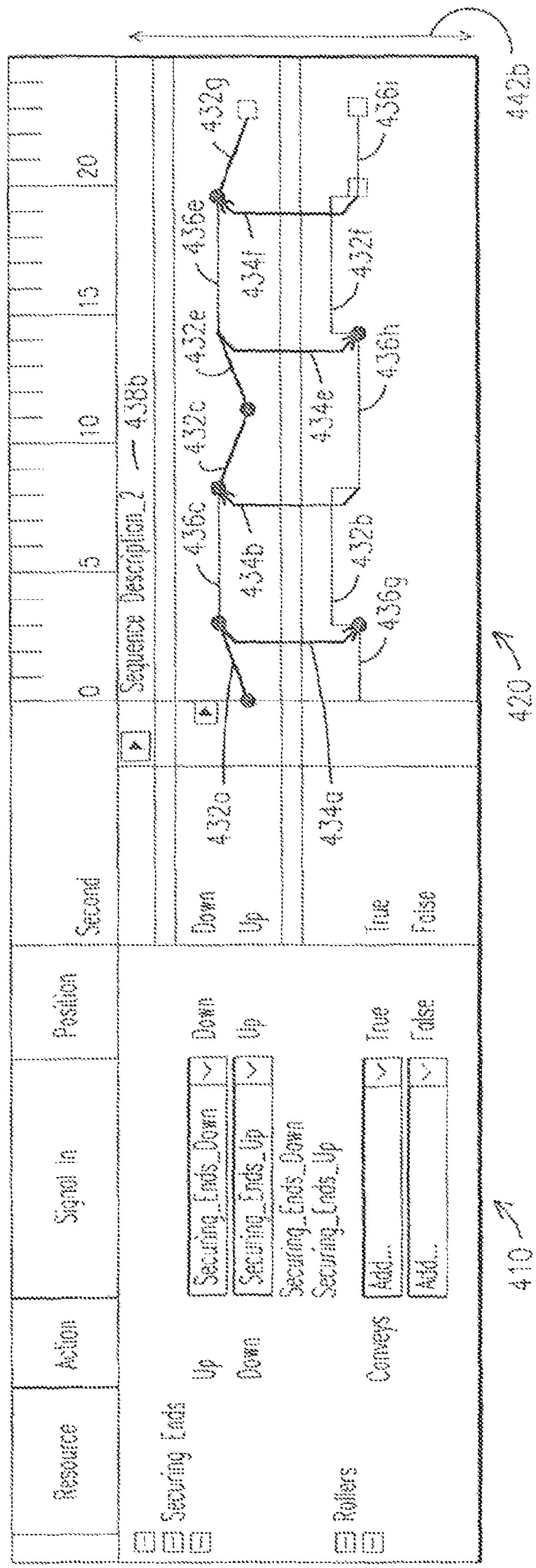

FIG. 11C illustrates an exemplary second sequence description 442(*b*) according to a display of the mechanical model. The second sequence description 442(*b*) includes a header 438(*b*) having the name "Sequence Description 2". Additionally, the second sequence description 442(*b*) includes the securing ends and rollers having the positions 418 and actions 416 as described in FIG. 4. Since the second sequence description 442(*b*) pertains to the securing ends and the rollers, the designer describes the sequence flow in terms of both the securing ends and the rollers as well as the transitions between the securing ends and the rollers. As previously shown in FIG. 4E the securing end move up from the down position via mechanical steps 432(*a*), 432(*e*) and move down from the up position via mechanical steps 432(*c*), 432(*g*). The condition for the rollers change from false to true via mechanical steps 432(*b*), 432(*f*) which convey the parcel. Also described in the second sequence description 442(*b*) are the mechanical transitions 434(*a*), 434(*b*), 434(*e*), 434(*f*) between the securing ends and the rollers and waiting states 436(*c*), 436(*e*), 436(*g*) 436(*h*), 436(*i*).

Figure 11D:
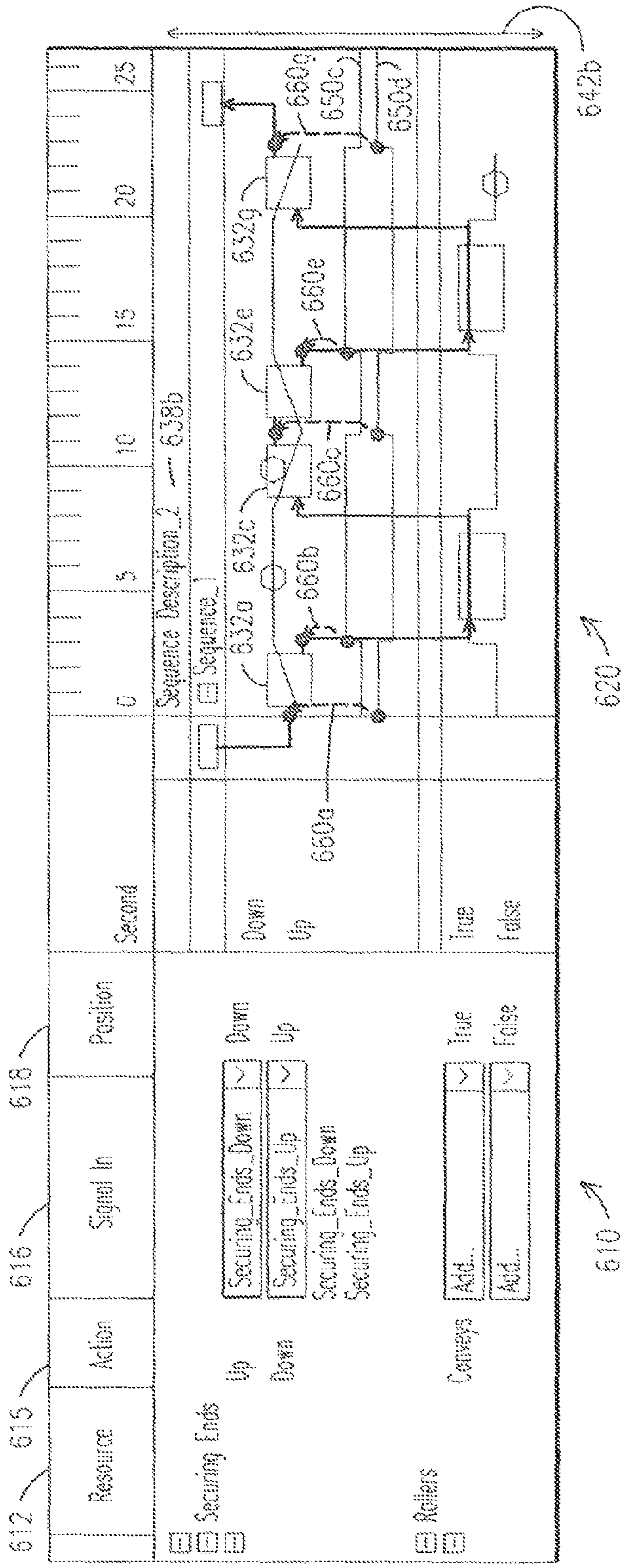

FIG. 11D illustrates an exemplary second exemplary sequence description 642(*b*) according to a display of the electrical model of FIG. 11C. Second sequence description 642(*b*) includes a header 638(*b*) having the name "Sequence Description 2". Additionally, the second sequence description 642(*b*) includes the securing ends and rollers having the positions 618, actions 616 and signal in 616 as described in FIGS. 6A-6G. Electrical steps 632(*d*) 632(*h*) and signal pulses 650(*a*) 650(*b*) are shown.

In a preferred embodiment, each of the sequence descriptions 442 are in separate XML files. For the above example, the first sequence description 442(*a*) is in a first XML file and the second sequence description 442(*b*) is in a second XML file. The combination of the first and second sequence descriptions 442(*a*), 442(*b*) as shown in FIGS. 11A-11D does not completely describe the mechanical operations of the automation device as shown by 4E. For example, transitions between the lifter and the securing ends are not provided.

Transitions between steps of resources of one sequence description to a step in different sequence description are external transitions. To add a transition a beginning or ending of a mechanical step 432 is identified in one of the sequence descriptions 442 as an external transition out. Likewise, a beginning or ending of a mechanical step 432 is identified in a different sequence description as an external transition in. Preferably a GUI tool is provided for the designer to differentiate between the type (in, out) of external transition being added.

Figure 11E:
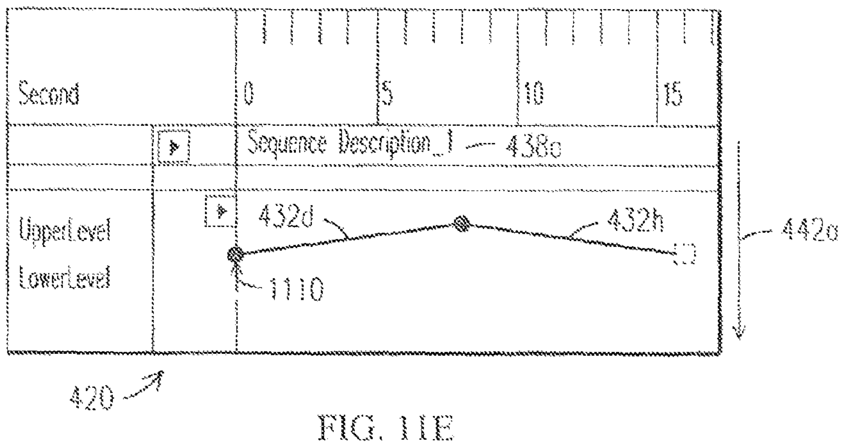

FIG. 11E illustrates the exemplary sequence view 420 of FIG. 11A where an external transition in 1110 has been added to the beginning of mechanical step 432(*d*). A visual representation of the external transition in 1110 may be provided. In the illustration, the arrow pointing towards the beginning of the mechanical step 432(*d*) visually represents the external transition in 1110.

Figure 11F:
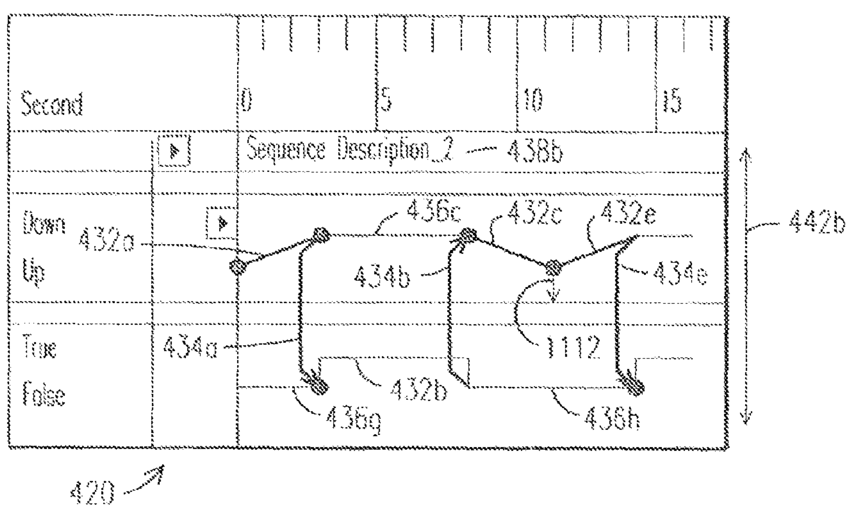

FIG. 11F illustrates the exemplary sequence view 420 of FIG. 11A where an external transition out 1112 has been added to the ending of mechanical step 432(*d*). A visual representation of the external transition out 1112 may be provided. The arrow pointing away from the ending of the mechanical step 432(*c*) visually represents the external transition out 1112.

At some point the external transition in 1110 and an external transition out 1112 must be linked together. The reference that provides a link from one sequence description to a different sequence description is referred to as an external link. In one embodiment, the user is prompted, during or after the creation of the external transition in 1110, for information regarding the sequence description of the external, transition out 1112. In another embodiment, the user is prompted, during or after the creation of the external transition out 1112, for information regarding the sequence description of the external transition in 1110. Other embodiments are described below. The information regarding the sequence description is any information to uniquely identify the sequence description. For example, the XML file pertaining to the sequence description or the name of the sequence description.

Figure 11G:
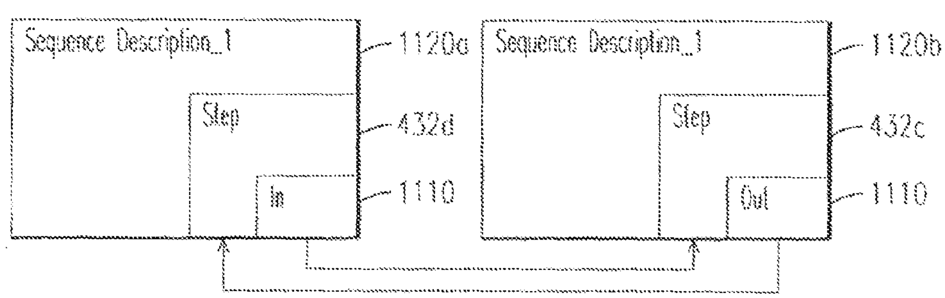

When the external transition in 1110 in is linked with the external transition out 1112, the respective sequence descriptions are altered to include the external links. In particular, the respective XML files are altered to include the external links. FIG. 11G illustrates an external link between the first XML file 1120(*a*) of the first sequence description and the second XML file 1120(*b*) of the second sequence description. According to the illustration of FIG. 11G, the external transition in 1110 of step 432(*a*) in a first XML file 1120(*a*) has a reference to the step 432(*c*) of the second XML file 1120(*b*). FIG. 11G further illustrates that the external transition out 1112 of step 432(*c*) of the second XML file 1120(*b*) has a reference to the step 432(*a*) of the first XML file 1120(*a*).

The above examples illustrate embodiments of working with the sequence descriptions independently of each other. However, the designer may indicate one or more sequence descriptions to be displayed on the electronic display as a single display. The display of the model therefore dynamically based on what the designer wants to display.

Various embodiments and/or GUI tools 405 may be used for a designer to select the sequence descriptions to be displayed. In one embodiment, the sequence descriptions 442 are displayed by opening each of the XML files in the mechanical model or electrical. This may be done, for example, via a GUI tool 405, such as a file open or a manage references in another embodiment, the different XML file is opened and displayed when adding the external transition in or external transition out as described above.

It would be understood that the designer may also alter the display to reduce the number of sequence descriptions on a single display. For example, the designer may close an open sequence. Preferably, a sequence description which remains open and includes an external transition to the sequence description which was closed would include a visual representation of the external transition, such as in FIGS. 11E and 11F. In another embodiment all of the external transitions are deleted between the closed sequence description and the sequence description that remains open.

Figure 11H:
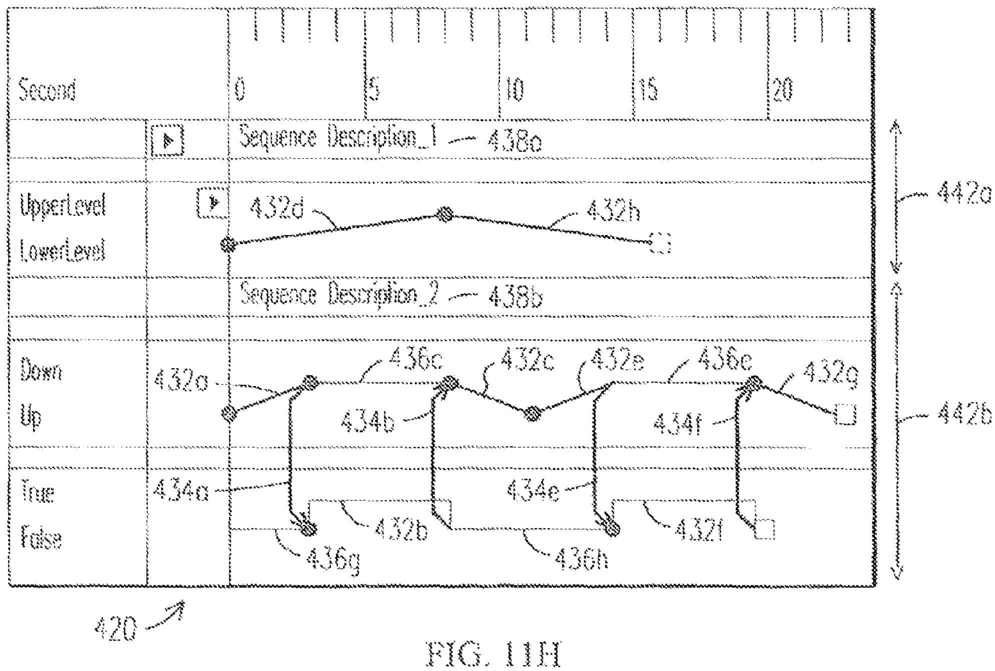

FIG. 11H illustrates an exemplary single display with the sequence flows for the first 442(*a*) and second 442(*b*) sequence descriptions according to a mechanical model. FIG. 11H shows the first 442(*a*) and second 442(*b*) sequence descriptions prior to adding an external transition. The external transition may be added in a similar fashion as described above for FIG. 11E and FIG. 11F.

Figure 11I:
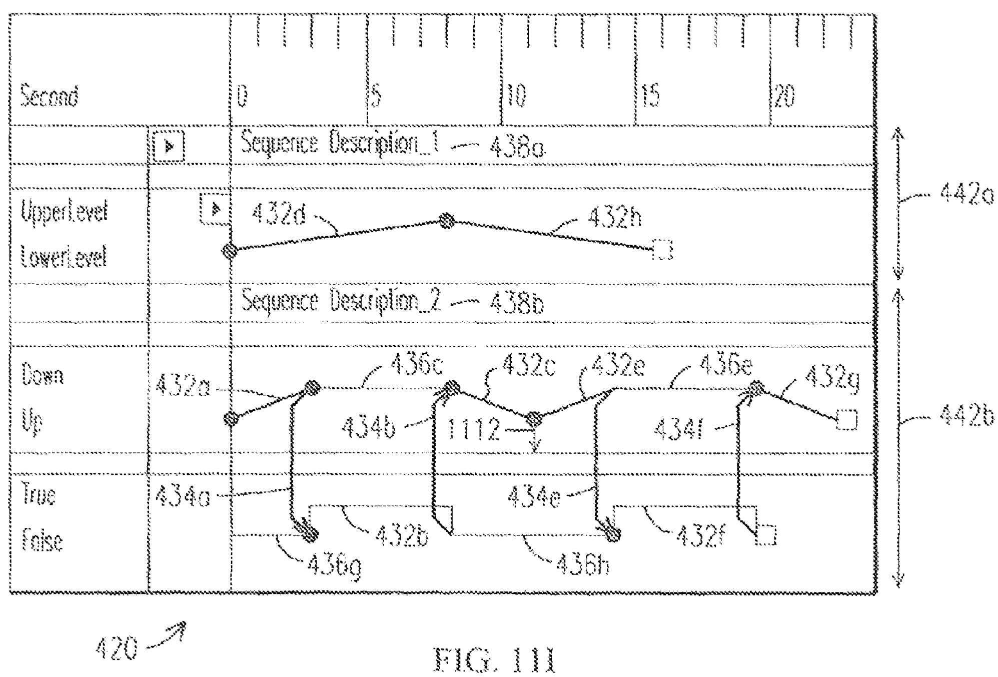
Figure 11J:
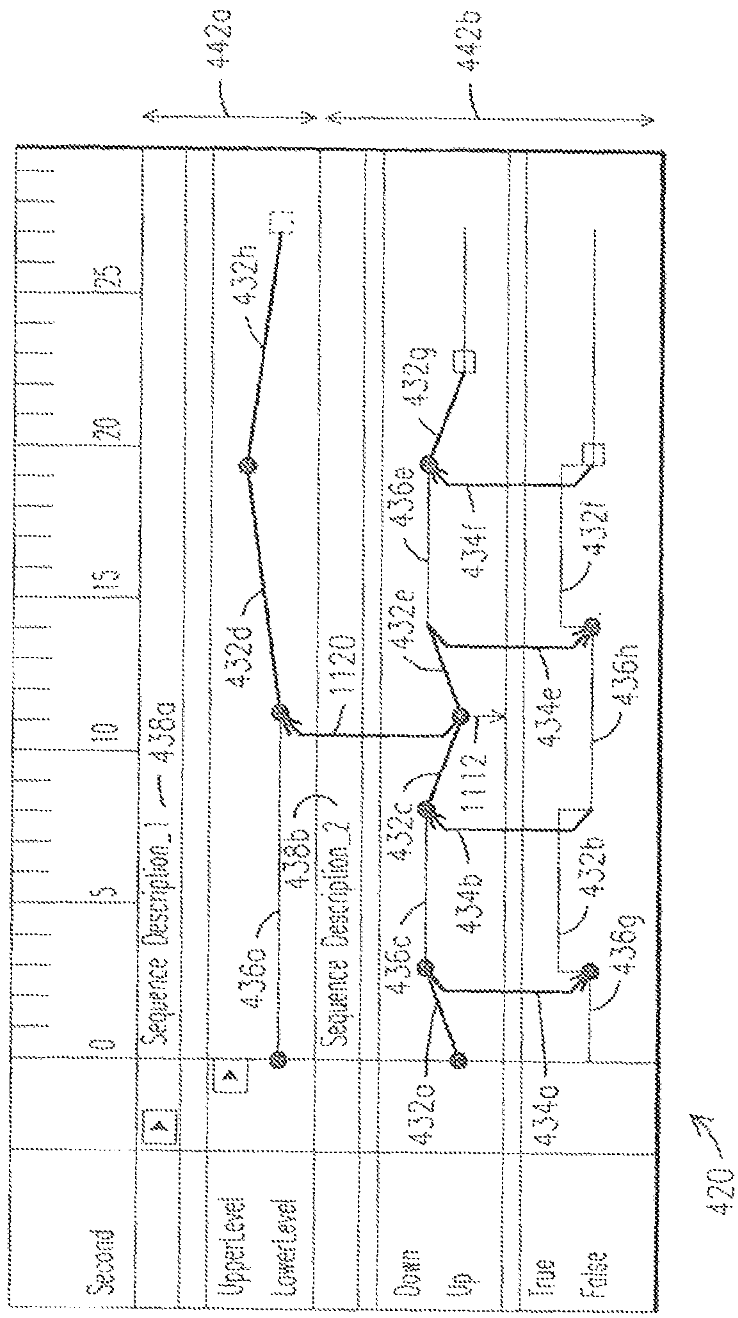

FIG. 11I illustrates an exemplary display after external transition out 1112 has been added the end of mechanical step 432(*c*). FIG. 11J illustrates a display after external transition in has been added to the beginning of mechanical step 432(*d*). As shown an external transition 1120 is now visually displayed between the mechanical step 432(*d*) of the first sequence description 442(*a*) and the mechanical step 432(*a*) of the second sequence description 442(*b*). In addition, a waiting step 436(*a*) was added. Since the sequence descriptions involved in the external transition are both concurrently displayed, the modeling tool may derive the linkage between the sequence descriptions without an additional prompt. Furthermore, with the sequence descriptions involved in the external transition are both concurrently displayed it may be transparent to the designer that an external transition is being added. Therefore, it may be desirable that the external transition is added as described for the transitions in FIG. 4E.

The external transitions are described above in reference to the mechanical view. It would be understood that the external transitions could also be added similarly in the electrical view. Furthermore, the above disclosure for the dynamic views has been described in terms of an external link being for an external transition. It would be understood that an external link may used when any object of one sequence description interfaces with a sequence description of a different sequence description. For example, an external link may be used for a condition for an electrical transition or for an electrical step to a signal.

Figure 11K:
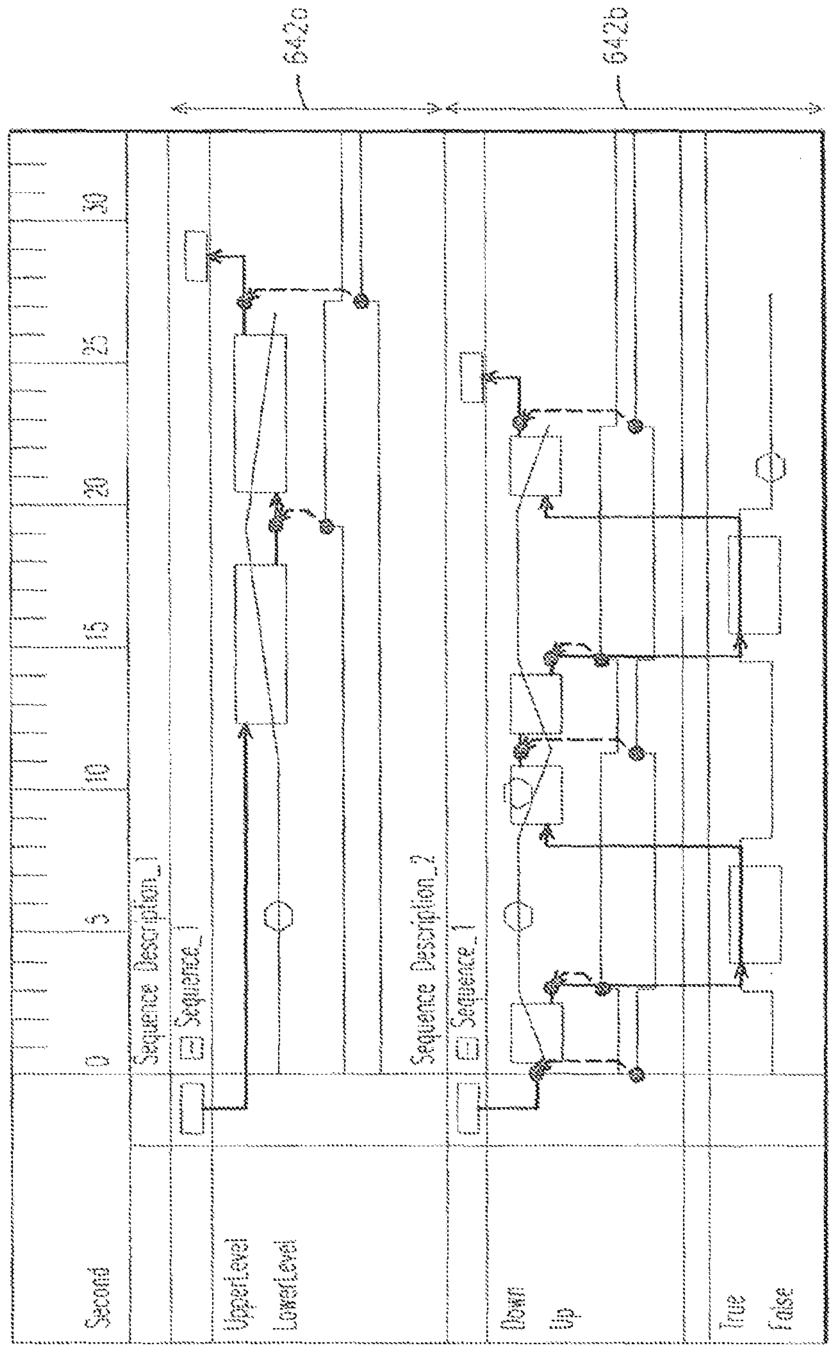
Figure 11L:
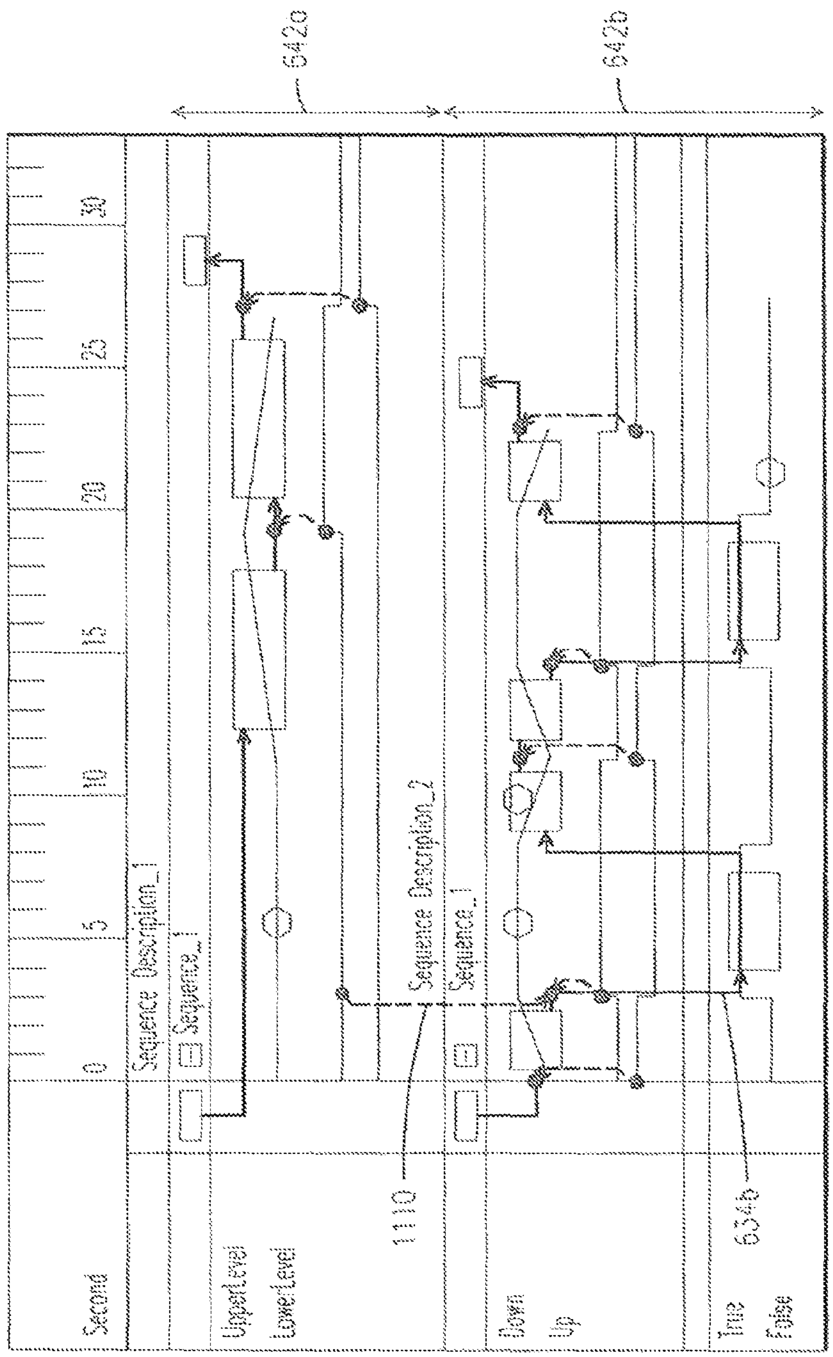
Figure 11M:
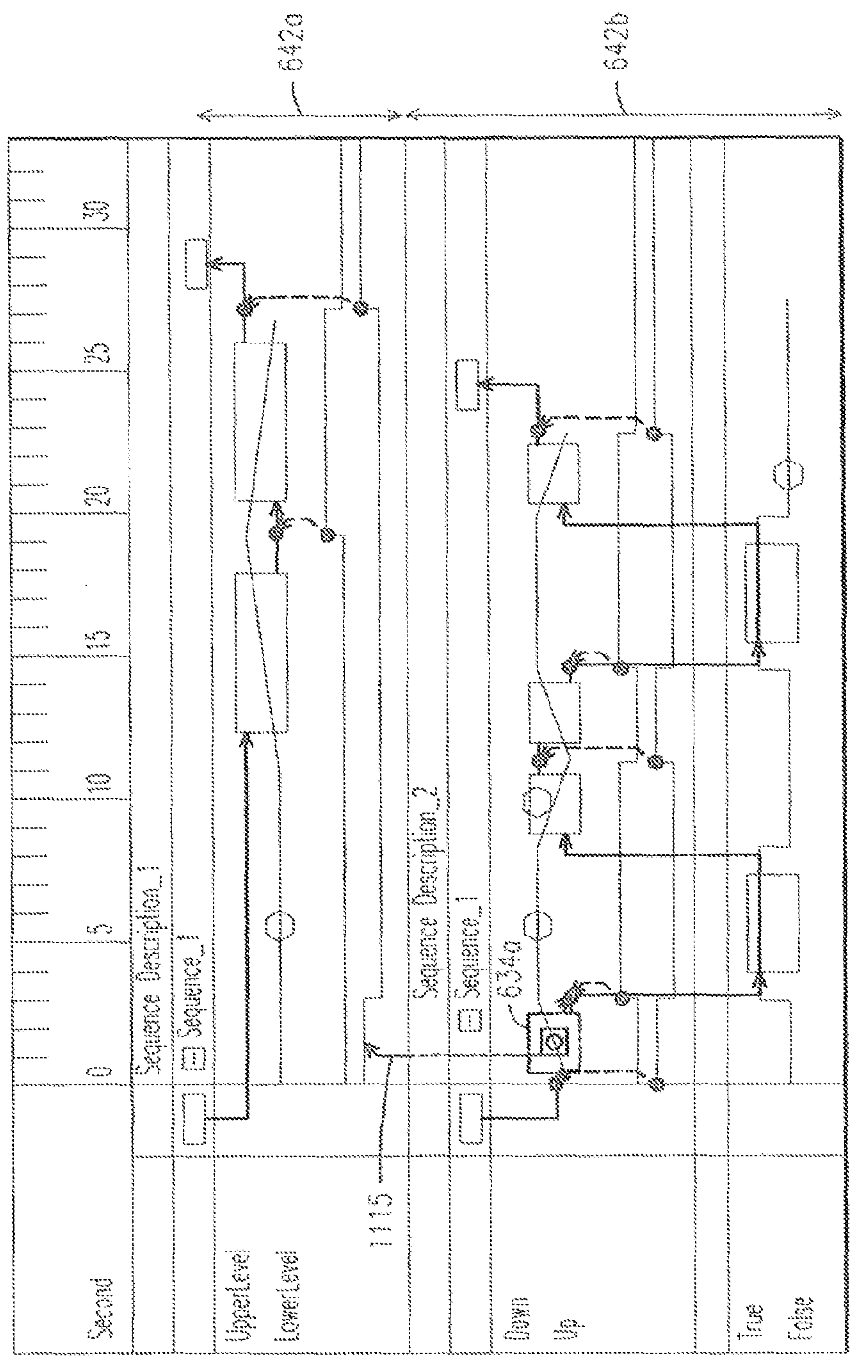

FIG. 11K illustrates an exemplary single display with the sequence flows for the first 642(*a*) and second 642(*b*) sequence descriptions according to a display of an electrical model of FIG. 11J. FIG. 11L illustrates an the exemplary sequence view 620 of FIG. 11K where a condition transition in 1110 has been added to the beginning of mechanical step 432(*b*). FIG. 11L illustrates an the exemplary sequence view 620 of FIG. 11K where a condition 1110 has been added to the beginning of electrical transition 634(*b*). FIG. 11M illustrates an the exemplary sequence view 620 of FIG. 11K where a condition transition in 1115 has output has been added to electrical step.

The above disclosure describes an external link being altered when external transitions and other objects are added. It would be understood that the transitions and other objects may be altered, thereby altering the external link.

Split and Merge

As previously noted, the modeling of the automation system may be complex. Along with this the runtime software produced for the PLC may be complex. This may be the result of factors such as numerous resources, parallel operations, and alternative paths as described above. Therefore, it may be desirable to produce split the runtime software of the automation system into smaller portions. Each portion being a subset of the runtime software for the automation system and executes on a separate PLC.

Advantages may be realized from the smaller portions. For example, the PLC programming may be less complex. Furthermore, a less expensive PLC might be used since a reduction of Input/Output (I/O) would occur with smaller portions.

Thus, by splitting the runtime software into smaller portions, each PLC may be responsible for controlling one or more resource. However, the determination of how to split up the software may not be initially known during the modeling phase. Moreover, it would be desirable the splitting be adaptable after the modeling phase. Preferably, one or more resources may be selected for each runtime software.

Figure 12A:
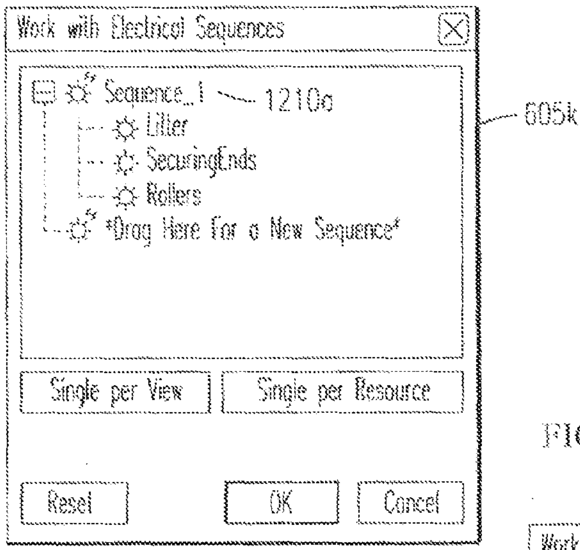
FIGS. 12A-12F illustrate exemplary split and merge in accordance with the present disclosure.

FIG. 12A illustrates an exemplary GUI tool 605(*k*) to split the programming of the automation system of FIG. 6 into a plurality of sequences. Each sequence producing a runtime software. Via the GUI tool 605(*k*) sequences may be altered. As shown in the illustration, a single sequence 1210(*a*) the name Sequence1 is provided. Preferably the name of the sequence may be altered by the designer. In the illustrated example, Sequence 1 includes the lifter, the securing ends and the roller resources. Thus, a single runtime software is produced to be executed on a single PLC. The single runtime software responsible for the lifter, securing ends and the roller resources.

Figure 12B:
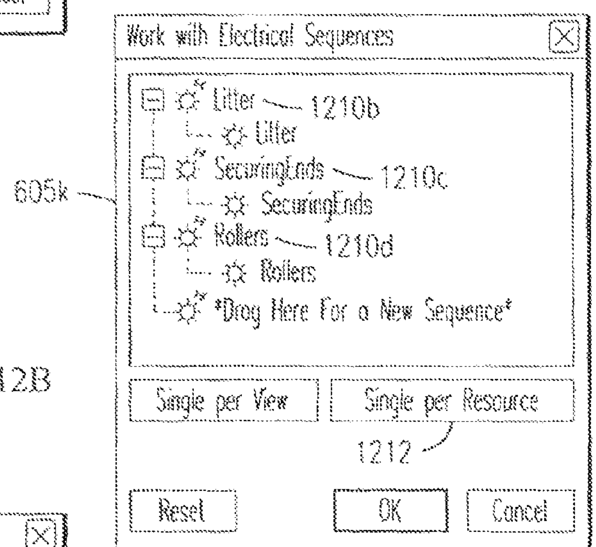
Figure 12C:
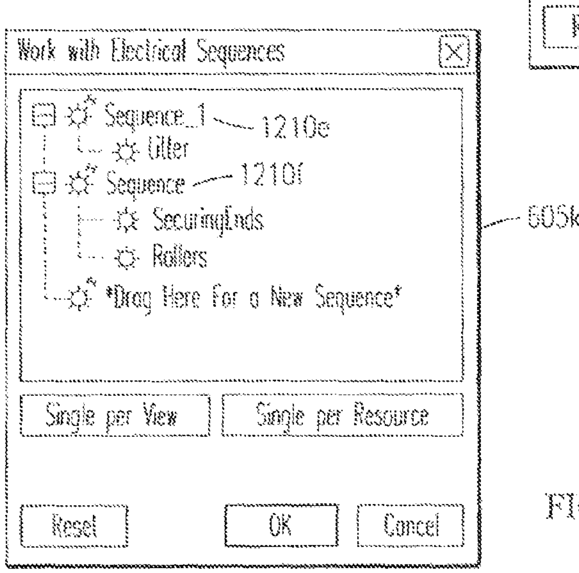

FIG. 12B illustrates splitting the programming of the automation system such that each sequence includes only one resource. GUI tool 605(*k*) shows 1210(*b*), 1210(*c*), 1210(*d*) each with a single resource. The splitting may be done, for example, via a GUI tool option such as the button 1212 which automatically splits all the resources into a separate sequence. In another embodiment the splitting is done by a user identifying the resource from Sequence1 to be split to a different sequence. The identification may be done, for example, by placing a cursor over the identified resource and clicking and/or clicking and dragging the identified resource to the different sequence. If the different sequence does not exist, then it is created. Likewise, if the last resource is split for a sequence, the sequence is removed. FIG. 12C illustrates a further splitting of the programming of the automation system with sequences 1210(*e*) 1210(*f*). The above examples show how a resource may be split from a sequence to a different sequence.

Furthermore, all the resources may be merged back into a single sequence or back into a sequence the resource was split from. The merge may be done, for example via a GUI tool option such as the button 1214 which automatically merges all the resources into a single sequence. In another embodiment, the merge is done a user identifying the resource to be merged. The identification may be done, for example, by placing a cursor over the identified resource and clicking and/or clicking and dragging the identified resource to the different sequence.

Figure 12D:
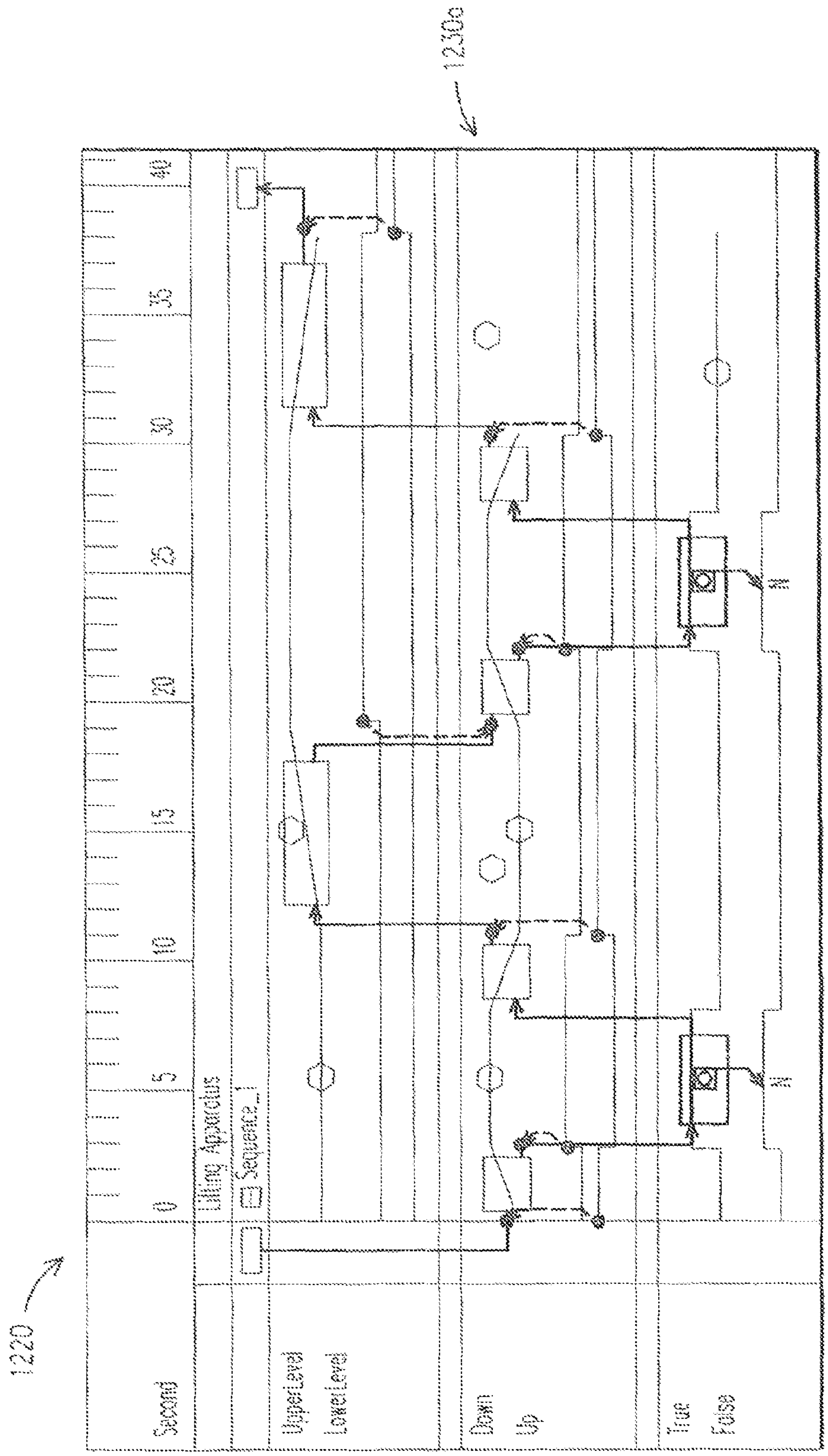
Figure 12E:
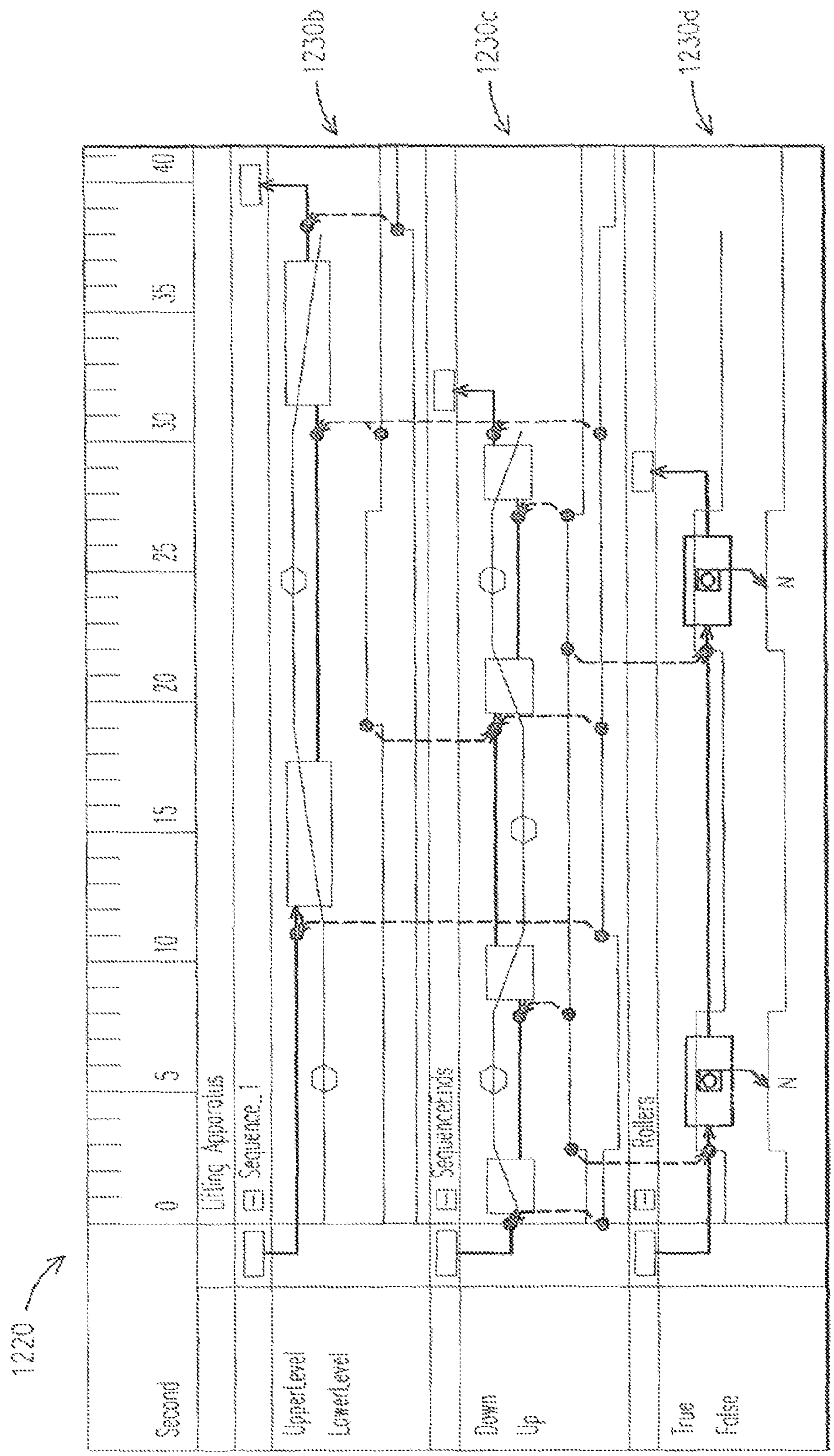
Figure 12F:
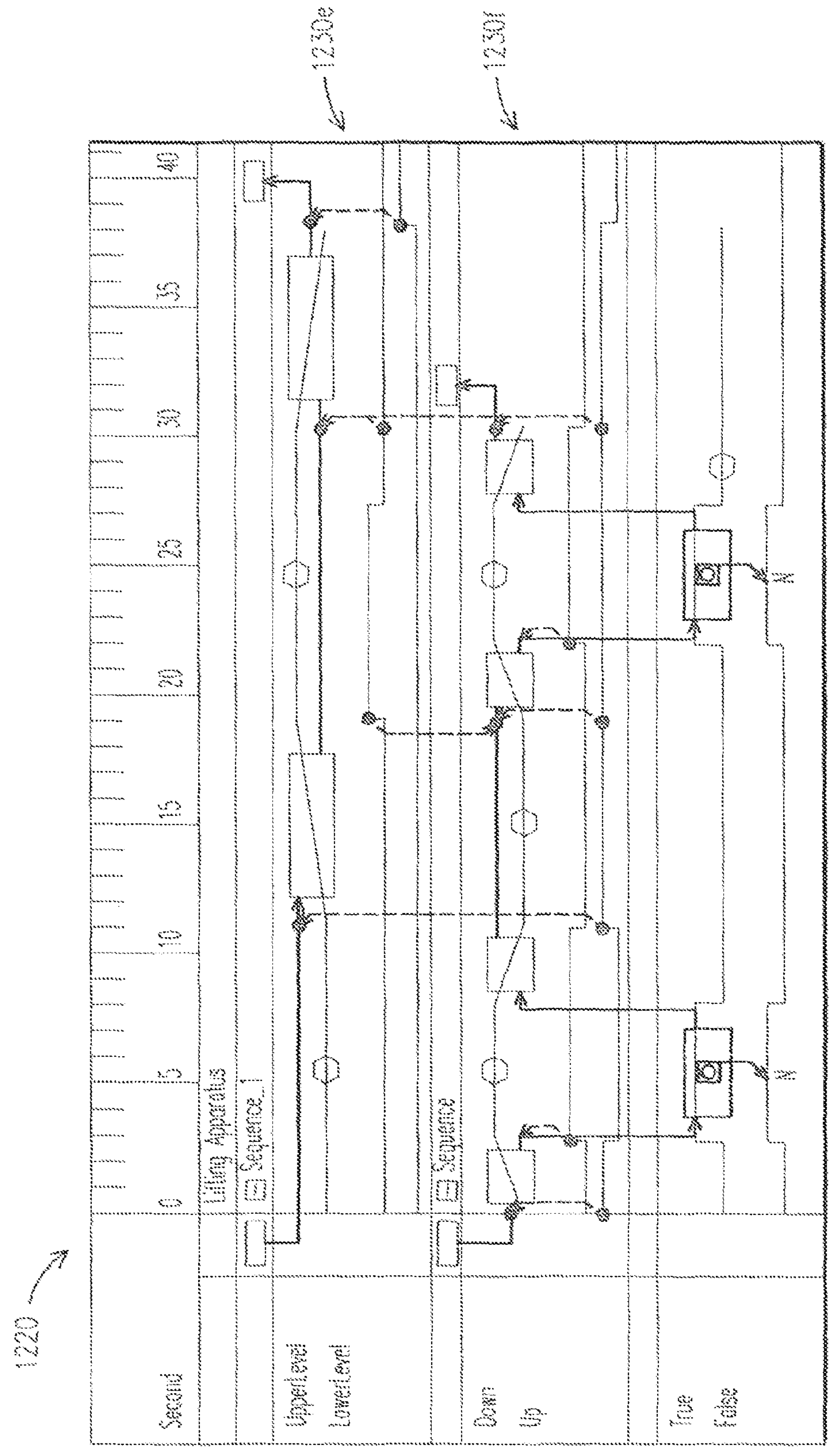

In a preferred embodiment, the sequence view of the electrical model is automatically altered to reflect the splitting of the programming. FIG. 12D illustrates an exemplary sequence view 1320 of the electrical model according to a single sequence 1330(*a*) of FIG. 12A. A runtime software may be produced from the single sequence 1330 which would control the lifter, securing ends and rollers. FIG. 12E illustrates an exemplary sequence view 1320 of the electrical model according including sequences 1330(*b*) 1330(*c*) 1330(*d*) of FIG. 12B. Thus, three separate runtime software may be produced, one to control the lifter, one to control the securing ends and one to control the rollers. FIG. 12F illustrates an exemplary sequence view 1320 of the electrical model according including sequences 1330(*e*) 1330(*f*) of FIG. 12C. Thus, two separate runtime software may be produced, one to control the lifter, and one to control the securing ends and the rollers.

Although the above illustrations are shown using the electrical model, it would be understood that the splitting and merging of resources into sequences may be done in the mechanical model.

Monitoring Via the Visual Model

After a PLC of the automation system has loaded with the PLC runtime software the automation system may be monitored. Advantageously, the monitoring is via the electrical sequence flow used to create the PLC runtime software. A further advantage is that the monitoring may be done while the automation system is online and not just as a debugging tool. For this purpose, it is possible the monitoring is done remotely from the automation system.

For simplicity, the exemplary automation system to be monitored as described below has a single PLC. It would be understood that an automation system having multiple PLCs may monitored using the same principles. Furthermore, for simplicity, the electrical sequence flow as described below does not have alternative paths. It would be understood that an electrical sequence flow having multiple may used to monitor the automation system with the same principles as described below.

Figure 13A:
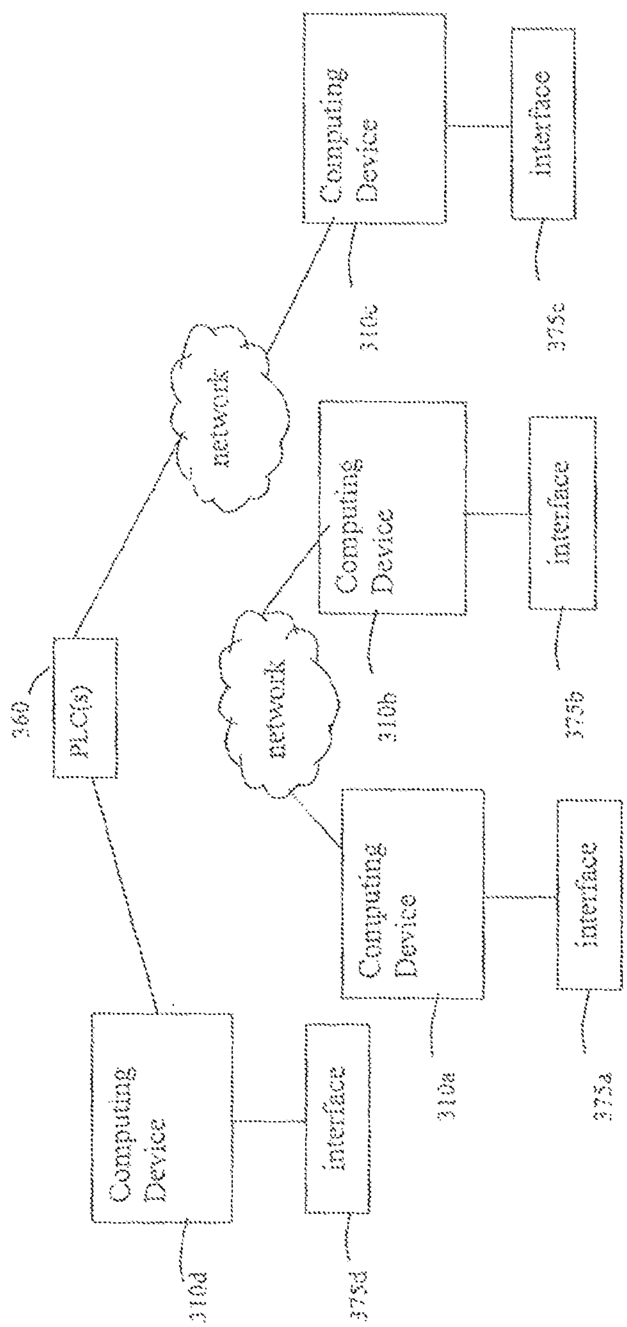
FIGS. 13A-13H illustrates an exemplary monitoring of the automation system in accordance with the present disclosure.

FIG. 13A illustrates exemplary embodiments of a computing device 310 that may monitor the PLC. The same computing device 310(*a*) used to model the automation system and to create PLC runtime software may be used to monitor the PLC. Other configurations to monitor the automation system include a different computing device 310(*b*) connected over the network 305(*a*), a computing device 310(*b*) connected over a different network 305(*b*) and a computing device 310(*d*) physically coupled to PLC 360 directly or couple indirectly such as through a backplane. The computing device 310 used to monitor the PLC includes information used to model the automation system. For example, the XML file 382 and/or the PLC runtime software 382 may be included on the computing device 310 used to monitor the PLC.

Figure 13B:
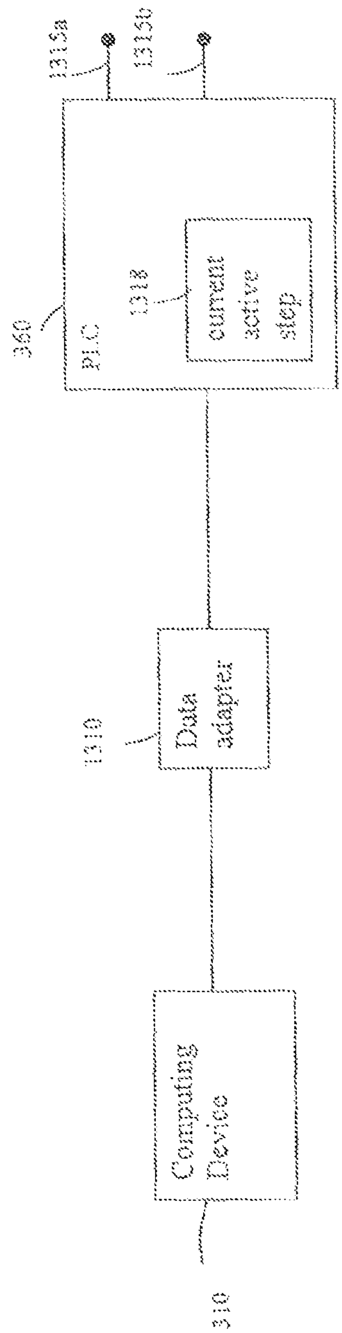

While the PLC executes, PLC runtime information is received effective to map the PLC execution to where the execution is occurring in the visual model of the electrical sequence flow. The PLC runtime information is received during a real time of the operation of the automation system. FIG. 13B illustrates an exemplary computing device 310 that receives PLC runtime information. The PLC runtime information may include an input signal 1315(*a*) and/or output signal 1315(*b*) and or current active step 1318 information regarding the PLC runtime software. It should be noted that the current active step of the PLC does not necessarily correspond directly to an electrical step. In contrast, the current active step of the PLC step corresponds to the PLC runtime software and relates to the current execution state of the PLC.

In addition, a data adapter device 1310 may be required in order to translate the PLC runtime information to information corresponding to the electrical sequence flow. The data adapter device 1310 may interface directly or indirectly to both the PLC 360 and to the computing device 310. Software may be included in the data adapter device 1310 to facilitate the translation. In one embodiment, the data adapter 1310 may be able to translate a plurality of PLC target types. In another embodiment the data adapter 1310 translates only one specific PLC target type. It is also possible that a data adapter 1310 be specific to a simulation PLC.

It would be understood that the functionality of the data adapter device 1301 may be provided directly by the computing device 310, thus, removing the need for a separate data adapter device 1301. The functionality could be provided by the computing device 1310 via software, hardware or combinations thereof.

Figure 13C:
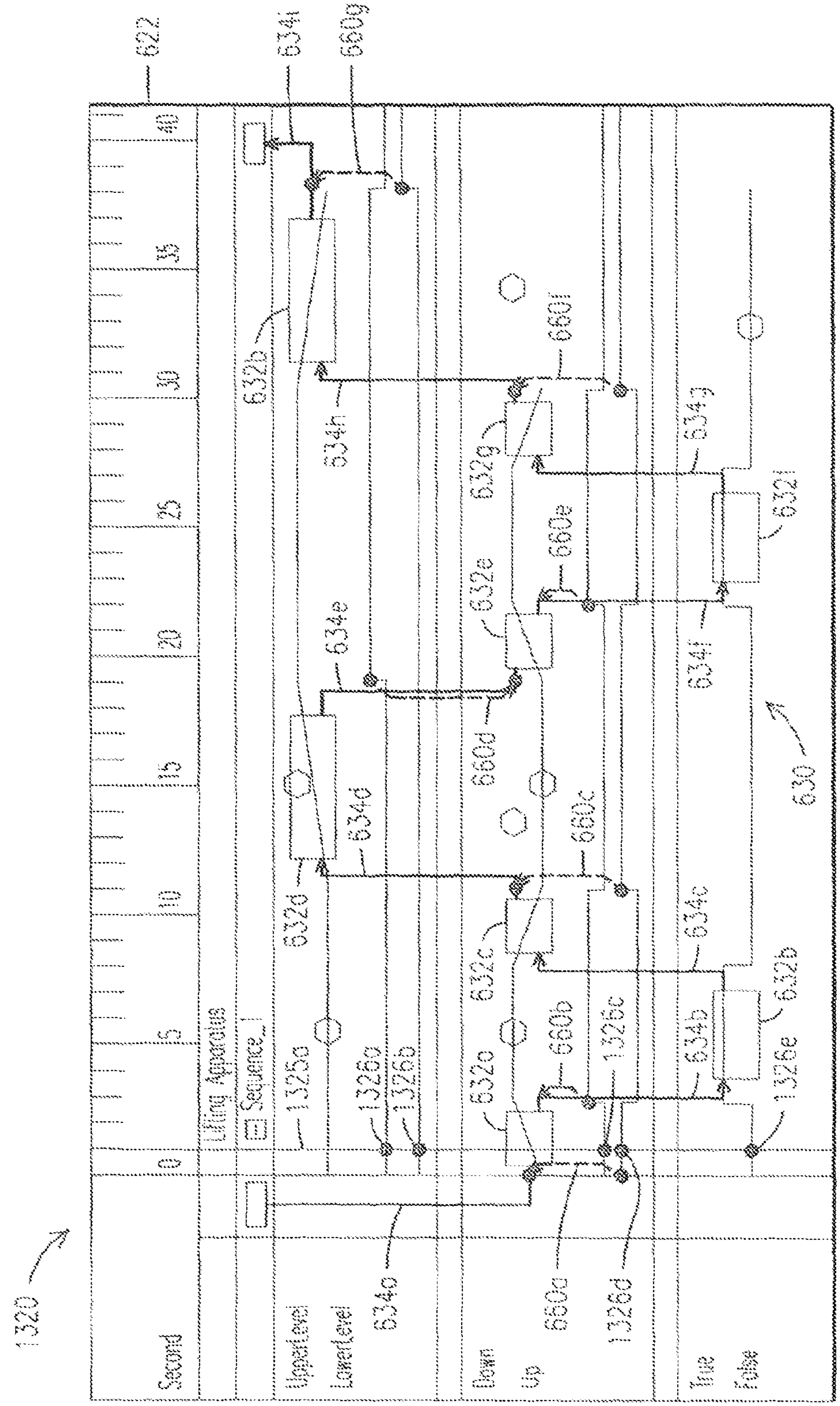

FIG. 13C, illustrates an exemplary monitoring of an automation system. The automation system being monitored is the exemplary lifting apparatus having the sequence view 1320 of the electrical model from FIG. 6G. A visual representation 1325 of the current execution state of the PLC is provided.

In the illustration, the visual representation is a line 1325(*a*) which extends perpendicularly from the time scale across at least a portion of the electrical sequence flow represented by the graphical view 1630. The line 1325(*a*) moves in a right angle to the time scale 622 in a direction of increasing time of the time scale. The line 1325 visually represents via the electrical sequence flow the current execution state of the PLC. To the right of the line is what is yet to be executed and the left is what has been executed. At the last transition 660(*g*) the line 1325 would start back at time 0 and execution would start.

Where the line 1325(*a*) intersects an electrical element denotes the current execution state of the PLC. In the illustration, line 1325(*a*) intersects with the electrical step 632(*a*) which visually represents the current active step of the PLC. Signal markers 1326 may also be provided to indicate a current signal value on the signal line.

Figure 13D:
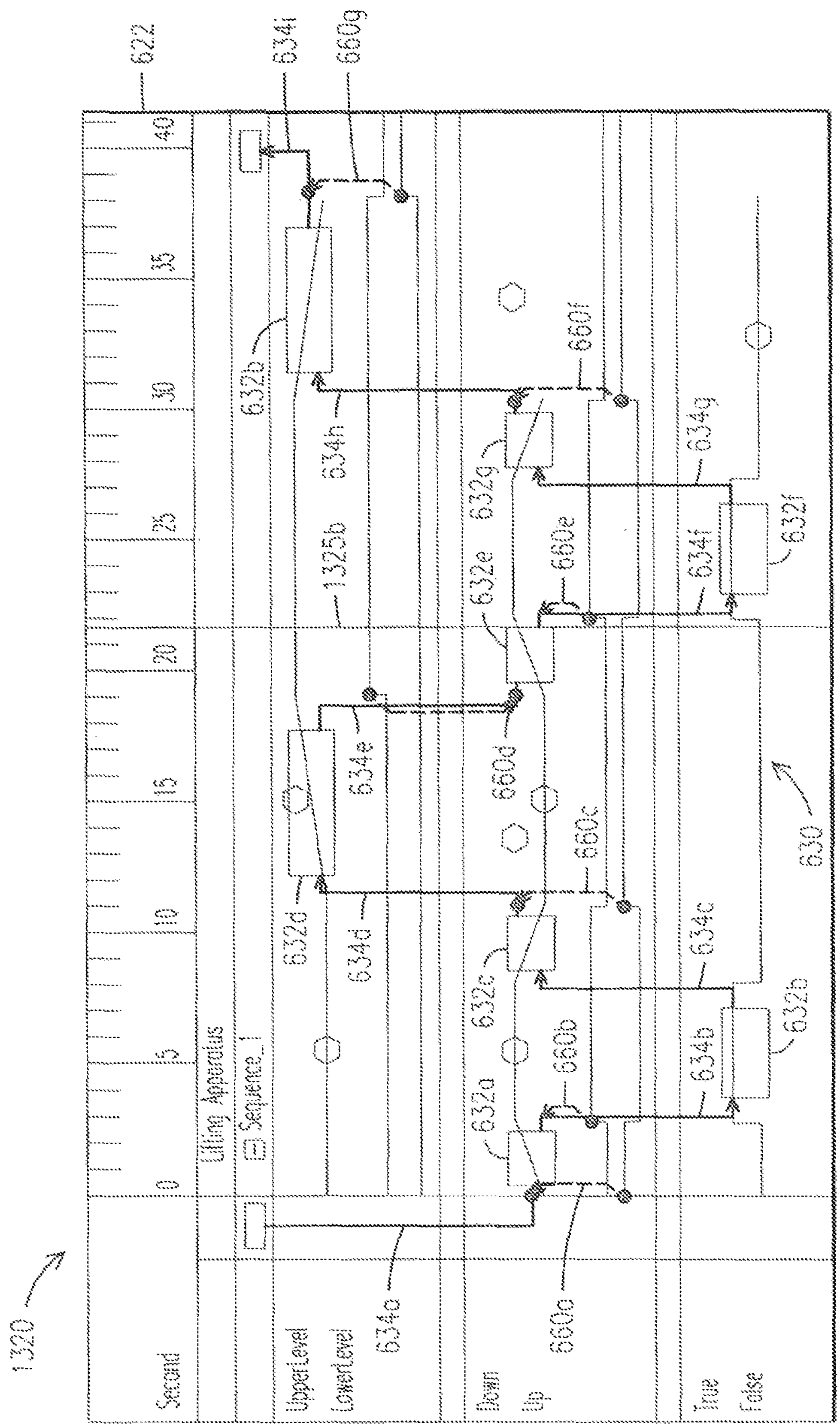

FIG. 13D illustrates the exemplary monitoring of the automation system of FIG. 13C at a later time. According to the illustration, the line 1325(*b*) is at the end of electrical step 632(*e*), which visually represent that the PLC has finished a step corresponding, to electrical step 632(*a*) and will be transitioning to a new step.

Figure 13E:
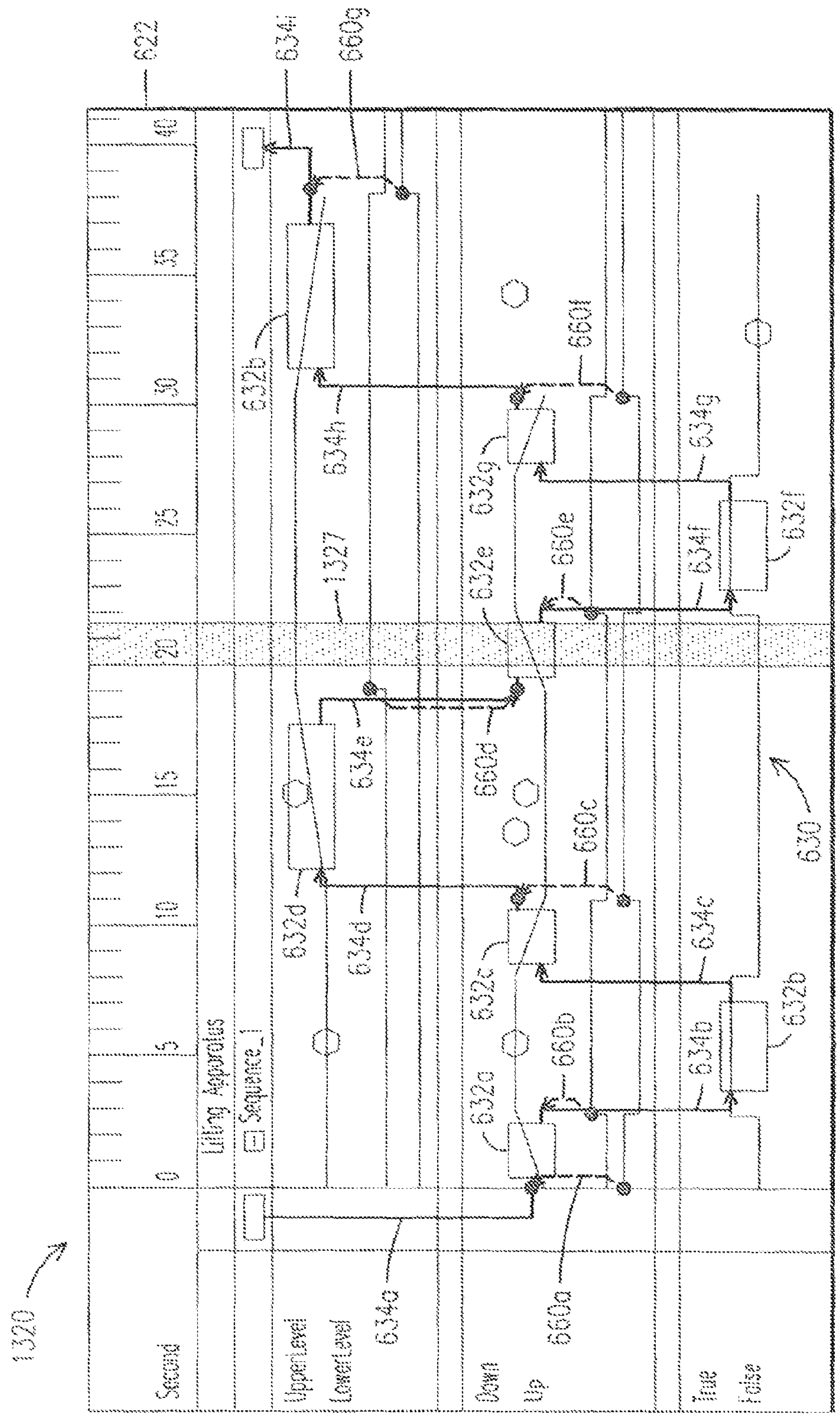

Although a visual representation is illustrated as a narrow line it would be understood other means such as an execution band 1327(*b*) as shown in FIG. 13E could be used. The band execution band 1327(*b*) represents a region of the PLC execution. Other visualization methods may be incorporated such as changing the color or brightness of the electrical element, signal line, and/or conditions which visually represents the execution of the PLC. This may be especially useful to denote an alternative path. Furthermore, a condition that is fulfilled may be represented in a different manner than a condition that is not fulfilled.

Figure 13F:
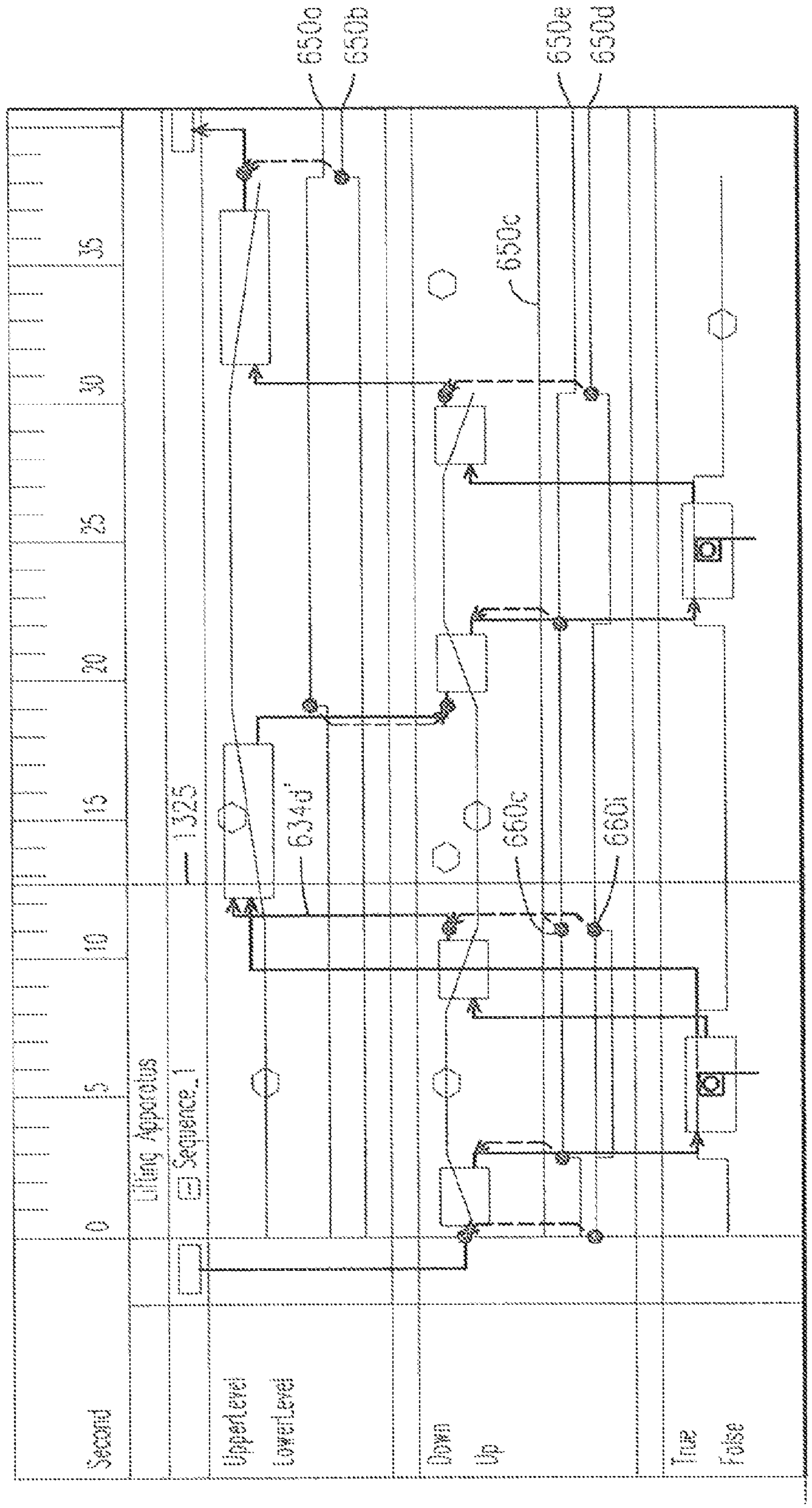

FIG. 13F illustrates a model with an electrical transition 660 multiple conditions. The signal line 650(*c*) corresponds to the securing_ends_down input signal, and the signal line 650(*d*) corresponds to the securing_ends_up input signal. A signal line 650(*e*) corresponds to a input signal that represents when a parcel is on the surface of the lifting apparatus. In the exemplary illustration, electrical transition 632(*d'*) is based on condition 660(*i*) and condition 660(*c*). It is possible that a condition 660 is not fulfilled. For example, the parcel may not be on the surface of the lifting apparatus in which case condition 660(*i*) is not fulfilled. Assuming that condition 660(*c*) is fulfilled, the display for the conditions would have to different. For example, different colors.

For the example of 13F, the transition 632(*d'*) cannot occur since all the conditions 660 were not fulfilled. In which case, a transition from electrical step 632(*c*) cannot occur. In which case a transition to an error state may occur based on the attributes of the current electrical step 632(*c*). It may be desirable to have in the monitoring display a visual representation of the timing attributes of the current electrical step.

Figure 13G:
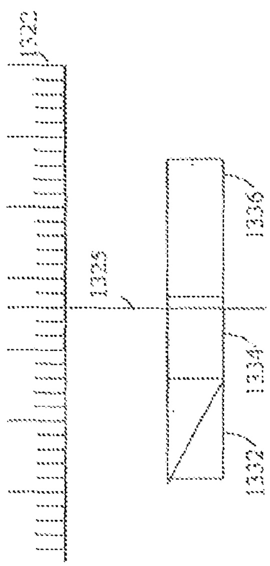
Figure 13H:
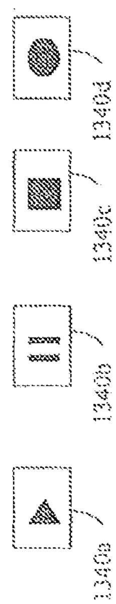

FIG. 13G illustrates a representation of the time attributes for an electrical step 632 as a duration of time. The time attributes illustrated are a waiting time 1332 and watchdog timer 1334 of an electrical step 632 over a time scale 1322. A visual representation of the current execution state of the PLC is displayed via line 1325. According the illustration, the waiting time 1332 has exceeded but not the watchdog timer 1334. After the watchdog timer 1334 is exceeded, a transition would occur to the error state 1336.

It may be desirable to control the monitoring automation system. For this purpose one or more control buttons 1340 may be added. For example, a play button 1340(*a*) and/or pause button 1340(*b*) and/or a stop button 1340(*c*) may be added. The monitoring user may select one of the buttons 1340 to control the monitoring. A play button 1340(*a*) may be selected to start or resume monitoring when monitoring is stopped. A pause button 1340(*b*) may be selected to temporarily pause monitoring and the stop button 1340(*c*) may be selected to stop the monitoring. The stop button 1340(*c*) may act similarly to the pause button 1340(*a*) or it may reset monitoring to start at the beginning with a time 0.

The control of the monitoring may or may not have an effect on the PLC. That is, selecting the pause button 1340(*b*) will pause the monitoring but the automation PLC may still keep running. When this is the case and the play button 1340(*a*) is selected to resume monitoring, the automation system may not be at the same point as when the pause button 1340(*b*) was selected. At this point, the visual representation has to adjust to the current execution which could cause a jump in the visual representation. For example, the line 1325 may be at a time 2 when the pause button 1340(*b*) was selected and jump to a time of 35 when the play button 1340(*a*) is selected. A similar situation exists when the stop button 1340(*c*) is selected. The stop button 1340(*b*) may not stop the PLC execution.

Depending on the PLC target type, it may however be possible to control at least a portion of the execution of the PLC. In this case the pause button 1340(*b*) may stop execution of the PLC and allow it to resume where it stopped when the play button 1340(*b*) is selected. Likewise, the stop button 1340(*b*) may reset the PLC to start at a time 0. This may also include reinitializing PLC data.

A record and playback functionality may also be provided. A record button 1340(*d*) may be provided to record the execution of the automation system. The recorded execution could be played back at a latter time to allow the designer or other user to do error analysis even if the sequence is executed in a very small timeframes or very complex. This may allow for improved timing control of the automation system. In this case the monitoring of the playback would not be in real time. The play back may be, for example, via the play button 1330(*a*) or a further defined button.

While the invention has been described in terms of a certain preferred embodiment and suggested possible modifications thereto, other embodiments and modifications apparent to those of ordinary skill in the art are also within the scope of this invention without departure from the spirit and scope of this invention. Thus, the scope of the invention should be determined based upon the appended claims and their legal equivalents, rather than the specific embodiments described above.

We claim:

1. A method for defining a dynamic view in a modeling of an automation system via a modeling tool, comprising:

displaying a first sequence description of a model of the automation system, the first sequence description including a first sequence flow, the first sequence description contained in a first file;

displaying a second sequence description of the model of the automation system, the second sequence description including a second sequence flow of the automation system, the second, sequence description contained in a second file;

identifying a first object from the displayed first sequence flow;

identifying a second object from the displayed second sequence flow;

linking the first sequence description to the second sequence description via a first external link in the first file, the linking after the identifying the second object; and linking the second sequence description to the first sequence description via a second external link in the second file, the linking after the identifying the first object, wherein the displaying the model is on an electronic display device, the identified first object is identified as an external transition in and the identified second object is identified as an external transition out such that an external transition is added from the identified first object to the identified second object.

2. The method as claimed in claim 1, further comprising:

visually representing at least the external transition in or external transition out on the display.

3. The method as claimed in claim 1, wherein the first and second sequence flows are electrical sequence flows each having a plurality of electrical steps.

4. The method as claimed in claim 3, wherein the first object is a beginning of one of the plurality of electrical steps in the first sequence flow or an ending of one of the plurality of electrical steps in the first sequence flow, and the identified second object is a beginning of one of the plurality of electrical steps in the second sequence flow or an ending of one of the plurality of electrical steps in the second sequence flow.

5. The method as claimed in claim 4, further comprising:

adding an external transition between the identified first object and the identified second object.

6. The method as claimed in claim 3, wherein the first object is a one of the plurality of electrical steps, and the identified second object is electrical signal line.

7. The method as claimed in claim 3, wherein the first object is an electrical transition starting from the first sequence flow, and the identified second object is electrical signal line, and adding a condition for the electrical transition.

8. The method as claimed in claim 1, wherein the display of the first sequence description is not concurrent with the display of the second sequence description.

9. The method as claimed in claim 1, wherein the first sequence description is displayed concurrently with the second sequence description display.

10. The method as claimed in claim 1, further comprising providing a visual representation of the first external link and/or the second external link.

11. The method as claimed in claim 10, wherein the visual representation of the first external link and/or the second external link is an external transition, a condition, an input signal or an output signal.

12. The method as claimed in claim 10, wherein:

the visual representation includes a line drawn from the identified first object to the identified second object.

13. The method as claimed in claim 1, further comprising:

providing a user interface effective to receive input from a user, wherein the identifying the first object includes receiving input from the user which indicates the first object, and the identifying the second object includes receiving input from the user which indicates the second object.

14. The method as claimed in claim 13, wherein the receiving input from the user is a result of the user placing a cursor pointer over the first or the second identified object and clicking a mouse or the user pressing a predefined keyboard key or the user touching the first or the second identified object.

15. The method as claimed in claim 1, wherein code for a programmable logic controller is produced from the model.

16. The method as claimed in claim 1, wherein the first and second sequence flows are mechanical sequence flows each having a plurality of mechanical steps.

17. The method as claimed in claim 16, wherein the identified first object is a beginning of one of the plurality of mechanical steps in the first sequence flow or an ending of one of the plurality of mechanical steps in the first sequence flow, and the identified second object is a beginning of one of the plurality of mechanical steps in the second sequence flow or an ending of one of the plurality of mechanical steps in the second sequence flow.

18. A non-transitory computer-usable medium including computer readable instructions stored thereon for execution by a processor to perform a method for defining a dynamic view in a modeling of an automation system via a modeling tool, the method comprising:

displaying a first sequence description of a model of the automation system, the first sequence description including a first sequence flow, the first sequence description contained in a first file;

displaying a second sequence description of the model of the automation system, the second sequence description including a second sequence flow of the automation system, the second sequence description contained in a second file;

identifying a first object from the displayed first sequence flow;

identifying a second object from the displayed second sequence flow;

linking the first sequence description to the second sequence description via a first external link in the first file, the linking after the identifying the second object, and linking the second sequence description to the first sequence description via a second external link in the second file, the linking after the identifying the first object, wherein the displaying the model is on an electronic display device, the identified first object is identified as an external transition in and the identified second object is identified as an external transition out such that an external transition is added from the identified first object to the identified second object.

* * * * *